(12) United States Patent
Nag et al.

(10) Patent No.: US 12,040,954 B2
(45) Date of Patent: Jul. 16, 2024

(54) ALTERNATIVE CONTROL INTERFACE PROVIDED TO INFRASTRUCTURE-AS-A-SERVICE CLIENTS

(71) Applicant: CtrlStack, Inc., Larkspur, CA (US)

(72) Inventors: Dev Ayan Nag, Larkspur, CA (US); Yanislav Genkov Yankov, Larkspur, CA (US); Gurkanwal Singh Brar, Larkspur, CA (US); Christopher Jay Shellenbarger, Larkspur, CA (US); Michael Marlin McMahon, Larkspur, CA (US)

(73) Assignee: CtrlStack, Inc., Larkspur, CA (US)

( * ) Notice: Subject to any disclaimer, the term of this patent is extended or adjusted under 35 U.S.C. 154(b) by 346 days.

(21) Appl. No.: 17/676,521

(22) Filed: Feb. 21, 2022

(65) Prior Publication Data
US 2022/0270014 A1    Aug. 25, 2022

Related U.S. Application Data

(60) Provisional application No. 63/151,566, filed on Feb. 19, 2021.

(51) Int. Cl.
*H04L 43/045* (2022.01)
*H04L 41/22* (2022.01)
(Continued)

(52) U.S. Cl.
CPC ............ *H04L 41/22* (2013.01); *H04L 43/045* (2013.01); *G06F 9/451* (2018.02); *H04L 43/062* (2013.01)

(58) Field of Classification Search
CPC ..... H04L 41/22; H04L 43/045; H04L 43/062; H04L 43/065; H04L 63/0805; H04L 63/0811; H04L 43/0876
(Continued)

(56) References Cited

U.S. PATENT DOCUMENTS 10,552,176 B1 * 2/2020 Putney ...................... G06F 8/71
11,159,387 B1 * 10/2021 Klinger .................. H04L 41/22
(Continued)

FOREIGN PATENT DOCUMENTS

CA       2486103 A1 * 4/2006 ................ G06F 8/63
CA       3000767 C  * 4/2021 ......... H04L 41/0806

*Primary Examiner* — Khanh Q Dinh
(74) *Attorney, Agent, or Firm* — Olympic Patent Works PLLC

(57) ABSTRACT

The current document is directed to an alternative control interface provided to infrastructure-as-a-service ("IaaS") clients that provides a comprehensive collection of monitoring and control features to allow IaaS clients to monitor their distributed applications running within execution environments provided by an IaaS and to optimize execution of their distributed applications using the control features provided by the alternative control interface. In addition, the alternative control interface provides process-automation features and services that allow IaaS clients to automate monitoring and control tasks. In the described implementations, the currently disclosed alternative control interface is based on a graph database and a metrics database. The graph database stores a current representation of the infrastructure leased from an IaaS system by an IaaS client and the metrics database continuously collects and stores metric values scraped from components of the infrastructure leased by the IaaS client.

18 Claims, 55 Drawing Sheets

(51) Int. Cl.
*G06F 9/451* (2018.01)
*H04L 43/062* (2022.01)

(58) Field of Classification Search
USPC .............................. 709/220, 224, 226, 228
See application file for complete search history.

(56) References Cited

U.S. PATENT DOCUMENTS

| | | | |
|---|---|---|---|
| 11,265,292 B1* | 3/2022 | Leviseur | H04L 63/0263 |
| 2015/0124645 A1* | 5/2015 | Yadav | H04L 41/34 |
| | | | 370/254 |
| 2016/0012465 A1* | 1/2016 | Sharp | G06Q 20/321 |
| | | | 705/14.17 |
| 2018/0349482 A1* | 12/2018 | Oliner | G06F 16/38 |
| 2019/0042988 A1* | 2/2019 | Brown | G06F 16/9535 |
| 2019/0084288 A1* | 3/2019 | Städele | B32B 38/0004 |
| 2019/0222597 A1* | 7/2019 | Crabtree | H04L 63/1425 |
| 2021/0160288 A1* | 5/2021 | Crabtree | H04L 63/20 |
| 2022/0019451 A1* | 1/2022 | Crabtree | H04L 67/10 |
| 2022/0060497 A1* | 2/2022 | Crabtree | G06N 20/00 |
| 2022/0255926 A1* | 8/2022 | Crabtree | H04L 63/1425 |

\* cited by examiner

QUERY:
MATCH (:ORGANIZATION{name:'Acme'})—[ ]→(fac:FACILITY{location : 'NYC'})
WITH fac ⎯⎯ 1450                                                            ⎫
MATCH (fac)—[ ]→(e)                                                          ⎬ 1446
RETURN e.name                                                                ⎭

RETURNS:  ┌─────────────┐
          │ e.name      │ ⎯⎯ 1448
          │ Linda Jones │
          │ Bob Black   │
          │ Karen Anders│
          └─────────────┘

Query Type : add new node and relationship to database

Query Form : CREATE ( )                    ⎫
             MATCH (a:), (b:)              ⎬ 1452
             CREATE (a)—[:TYPE]→(b)        ⎭
                                   ⎯⎯ 1458

⎧ CREATE (n:EMPLOYEE{name : 'Mary Hood', sales : [62000, 120500, 110750], returns : [10900, 5500, 15600]})
        │ MATCH (fac:FACILITY {name : 'West Center'})←[ ]—(:ORGANIZATION {name : 'Acme'}), (m : EMPLOYEE {name : 'Fred Haas'}) ⎯⎯ 1460
Query: ⎨                                                                                                    ⎯⎯ 1456
  1454  │ CREATE (n)←[r1 : Employs]—(fac)   ⎯⎯ 1462
        ⎩ CREATE (n)←[r2 : Manages]—(m)   ⎯⎯ 1464

FIG. 14B

1502 {
MATCH (:ORGANIZATION {name: 'Acme'}) -- [*2] → (e)  —— 1504
UNWIND tail(e.sales) AS yearly  —— 1506
WITH e, avg(yearly) AS average  —— 1508
RETURN e.name AS name, e.sales[0] AS current-sales, average AS average_sales_for_previous_years  —— 1510
ORDER BY current_sales  —— 1512

| name | current_sales | average_sales_for_previous_years |
|---|---|---|
| Linda Jones | 101900 | 230600 |
| Fred Haas | 96500 | 210000 |
| Bob Black | 84320 | 181900 |
| Mary Hood | 62000 | 115625 |
| Jill May | 61000 | 130000 |
| Karen Anders | 52000 | 125700 |
| Sam Kahn | 51000 | 190000 |

┌─ 2802
2804 ─╮         2805 ─╮                                      2806 ─╮
      ┌ 02/12-08:30  graph query: getValue (node: "backend", property: avgCPU)      95
      │ 02/12-08:31  graph query: getValue (node: "backend", property: maxCPU)     120
      │ 02/12-16:30  graph query: getValue (node: "backend", property: avgCPU)      87
      │ 02/12-16:30  graph query: getValue (node: "backend", property: maxCPU)     120
      │ 02/13-08:31  graph query: getValue (node: "backend", property: avgCPU)     130
      │ 02/13-08:32  graph query: getValue (node: "backend", property: maxCPU)     150
      ┤ 02/13-08:32  graph query: getValue (node: "backend", property: avgCPU)     120
      │ 02/13-16:27  graph query: getValue (node: "backend", property: maxCPU)     150
      │ 02/14-16:27  graph query: getValue (node: "backend", property: avgCPU)     103
      │ 02/14-08:30  graph query: getValue (node: "backend", property: maxCPU)     150
      │ 02/14-08:30  graph query: getValue (node: "backend", property: avgCPU)      90
      └ 02/14-08:30  graph query: getValue (node: "backend", property: maxCPU)     150
2807 ── 02/14-08:32  graph query: getChildren (node: "backend")
      ┌ 02/14-08:32  graph query: getValue (node: "VM8", property: avgCPU)          25
      │ 02/14-08:32  graph query: getValue (node: "VM8", property: maxCPU)          35
      │ 02/14-08:33  graph query: getValue (node: "VM9", property: avgCPU)          38
      ┤ 02/14-08:33  graph query: getValue (node: "VM9", property: maxCPU)          45
      │ 02/14-08:33  graph query: getValue (node: "VM10", property: avgCPU)         25
      │ 02/14-08:34  graph query: getValue (node: "VM10", property: maxCPU)         40
      │ 02/14-08:34  graph query: getValue (node: "VM11", property: avgCPU)         02
      └ 02/14-08:34  graph query: getValue (node: "VM11", property: maxCPU)         30
2808 ┌ 02/14-08:35  graph query: getNodeID (node: "VM11"-(includes)-node: (label: "actions")-
     └ (includes)-node: (label:"terminate", label: "plimux")                   0a3677051
      ┌ 02/14-08:35  graph query: getValue ("VM11", property: "HA address")    36-9000.01
2809 ┤ 02/14-08:35  graph query: getValue ("VM11", property: "ID")                 VM611
      └ 02/14-08:36  graph query: getValue (nodeID: 0a3677051, property: "name")  "shutdown"
2810 ── 02/14-08:37  command ("36-9000.01," "VM611", "shutdown")
      ┌ 02/14-08:37  graph query: getValue (node: "VM11", property: numProc)        73
      │ 02/14-08:39  graph query: getValue (node: "VM11", property: numProc)        51
      │ 02/14-08:41  graph query: getValue (node: "VM11", property: numProc)        29
2811 ┤ 02/14-08:43  graph query: getValue (node: "VM11", property: numProc)        13
      │ 02/14-08:45  graph query: getValue (node: "VM11", property: numProc)         7
      └ 02/14-08:47  graph query: getValue (node: "VM11", property: numProc)         0
2812 ┌ 02/14-08:37  graph query: getNodeID (node: "client infrastructure"-(includes)-node: (label:
     └ "actions")-(includes)-node: (label:"terminate")                          0a3676603
2813 ── 02/14-08:38  graph query: getValue ("client infrastructure", property: "client-interface
                     address")                                                  36-8000.02
2814 ── 02/14-08:38  graph query: getValue (nodeID: 0a3676603, property: "name")  "terminate"
       02/14-08:38  command (36-8000.02, " VM611", "terminate")
2815 ─╯

FIG. 28A

| | | |
|---|---|---|
| 02/12-08:30 | graph query: getValue (node: "backend", property: avgCPU) | 95 |
| 02/12-08:31 | graph query: getValue (node: "backend", property: maxCPU) | 120 |
| 02/12-16:30 | graph query: getValue (node: "backend", property: avgCPU) | 87 |
| 02/12-16:30 | graph query: getValue (node: "backend", property: maxCPU) | 120 |
| 02/13-08:31 | graph query: getValue (node: "backend", property: avgCPU) | 130 |
| 02/13-08:32 | graph query: getValue (node: "backend", property: maxCPU) | 150 |
| 02/13-08:32 | graph query: getValue (node: "backend", property: avgCPU) | 120 |
| 02/13-16:27 | graph query: getValue (node: "backend", property: maxCPU) | 150 |
| 02/14-16:27 | graph query: getValue (node: "backend", property: avgCPU) | 103 |
| 02/14-08:30 | graph query: getValue (node: "backend", property: maxCPU) | 150 |
| 02/14-08:30 | graph query: getValue (node: "backend", property: avgCPU) | 90 |
| 02/14-08:30 | graph query: getValue (node: "backend", property: maxCPU) | 150 |
| 02/14-08:32 | graph query: getChildren (node: "backend") | |
| 02/14-08:32 | graph query: getValue (node: "VM8", property: avgCPU) | 25 |
| 02/14-08:32 | graph query: getValue (node: "VM8", property: maxCPU) | 35 |
| 02/14-08:33 | graph query: getValue (node: "VM9", property: avgCPU) | 38 |
| 02/14-08:33 | graph query: getValue (node: "VM9", property: maxCPU) | 45 |
| 02/14-08:33 | graph query: getValue (node: "VM10", property: avgCPU) | 25 |
| 02/14-08:34 | graph query: getValue (node: "VM10", property: maxCPU) | 40 |
| 02/14-08:34 | graph query: getValue (node: "VM11", property: avgCPU) | 02 |
| 02/14-08:34 | graph query: getValue (node: "VM11", property: maxCPU) | 30 |
| 02/14-08:35 | graph query: getNodeID (node: "VM11"-(includes)-node: (label: "actions")-(includes)-node: (label:"terminate", label: "plimux") | 0a3677051 |
| 02/14-08:35 | graph query: getValue ("VM11", property: "HA address") | 36-9000.01 |
| 02/14-08:35 | graph query: getValue ("VM11", property: "ID") | VM611 |
| 02/14-08:36 | graph query: getValue (nodeID: 0a3677051, property: "name") | "shutdown" |
| 02/14-08:37 | command ("36-9000.01," "VM611", "shutdown") | |
| 02/14-08:37 | graph query: getValue (node: "VM11", property: numProc) | 73 |
| 02/14-08:39 | graph query: getValue (node: "VM11", property: numProc) | 51 |
| 02/14-08:41 | graph query: getValue (node: "VM11", property: numProc) | 29 |
| 02/14-08:43 | graph query: getValue (node: "VM11", property: numProc) | 13 |
| 02/14-08:45 | graph query: getValue (node: "VM11", property: numProc) | 7 |
| 02/14-08:47 | graph query: getValue (node: "VM11", property: numProc) | 0 |
| 02/14-08:37 | graph query: getNodeID (node: "client infrastructure"-(includes)-node: (label: "actions")-(includes)-node: (label:"terminate") | 0a3676603 |
| 02/14-08:38 | graph query: getValue ("client infrastructure ", property: "client-interface address") | 36-8000.02 |
| 02/14-08:38 | graph query: getValue (nodeID: 0a3676603, property: "name") | "terminate" |
| 02/14-08:38 | command (36-8000.02, " VM611", "terminate") | |

FIG. 28B

| | | |
|---|---|---|
| 02/12-08:30 | graph query: getValue (node: "backend", property: avgCPU) | 95 |
| 02/12-08:31 | graph query: getValue (node: "backend", property: maxCPU) | 120 |
| 02/12-16:30 | graph query: getValue (node: "backend", property: avgCPU) | 87 |
| 02/12-16:30 | graph query: getValue (node: "backend", property: maxCPU) | 120 |
| 02/13-08:31 | graph query: getValue (node: "backend", property: avgCPU) | 130 |
| 02/13-08:32 | graph query: getValue (node: "backend", property: maxCPU) | 150 |
| 02/13-08:32 | graph query: getValue (node: "backend", property: avgCPU) | 120 |
| 02/13-16:27 | graph query: getValue (node: "backend", property: maxCPU) | 150 |
| 02/14-16:27 | graph query: getValue (node: "backend", property: avgCPU) | 103 |
| 02/14-08:30 | graph query: getValue (node: "backend", property: maxCPU) | 150 |
| 02/14-08:30 | graph query: getValue (node: "backend", property: avgCPU) | 90 |
| 02/14-08:30 | graph query: getValue (node: "backend", property: maxCPU) | 150 |
| 02/14-08:32 | graph query: getChildren (node: "backend") | |
| 02/14-08:32 | graph query: getValue (node: "VM8", property: avgCPU) | 25 |
| 02/14-08:32 | graph query: getValue (node: "VM8", property: maxCPU) | 35 |
| 02/14-08:33 | graph query: getValue (node: "VM9", property: avgCPU) | 38 |
| 02/14-08:33 | graph query: getValue (node: "VM9", property: maxCPU) | 45 |
| 02/14-08:33 | graph query: getValue (node: "VM10", property: avgCPU) | 25 |
| 02/14-08:34 | graph query: getValue (node: "VM10", property: maxCPU) | 40 |
| 02/14-08:34 | graph query: getValue (node: "VM11", property: avgCPU) | 02 |
| 02/14-08:34 | graph query: getValue (node: "VM11", property: maxCPU) | 30 |
| 02/14-08:35 | graph query: getNodeID (node: "VM11"-(includes)-node: (label: "actions")-(includes)-node: (label:"terminate", label: "plimux") | 0a3677051 |
| 02/14-08:35 | graph query: getValue ("VM11", property: "HA address") | 36-9000.01 |
| 02/14-08:35 | graph query: getValue ("VM11", property: "ID") | VM611 |
| 02/14-08:36 | graph query: getValue (nodeID: 0a3677051, property: "name") | "shutdown" |
| 02/14-08:37 | command ("36-9000.01," "VM611", "shutdown") | |
| 02/14-08:37 | graph query: getValue (node: "VM11", property: numProc) | 73 |
| 02/14-08:39 | graph query: getValue (node: "VM11", property: numProc) | 51 |
| 02/14-08:41 | graph query: getValue (node: "VM11", property: numProc) | 29 |
| 02/14-08:43 | graph query: getValue (node: "VM11", property: numProc) | 13 |
| 02/14-08:45 | graph query: getValue (node: "VM11", property: numProc) | 7 |
| 02/14-08:47 | graph query: getValue (node: "VM11", property: numProc) | 0 |
| 02/14-08:37 | graph query: getNodeID (node: "client infrastructure"-(includes)-node: (label: "actions")-(includes)-node: (label:"terminate") | 0a3676603 |
| 02/14-08:38 | graph query: getValue ("client infrastructure ", property: "client-interface address") | 36-8000.02 |
| 02/14-08:38 | graph query: getValue (nodeID: 0a3676603, property: "name") | "terminate" |
| 02/14-08:38 | command (36-8000.02, " VM611", "terminate") | |

FIG. 28C

```
result avgCPU_maxCPU ( )
{
    avg = gq_getValue (node: "backend", property: avgCPU)          — 2824
    max = gq_getValue (node: "backend", property: maxCPU)
    return func(avg, max)
} result avgCPU_maxCPU (node)
{
    avg = gq_getValue (node: node, property: avgCPU)               — 2825
    max = gq_getValue (node: node, property: maxCPU)
    return func(avg, max)
} result numProce (node)
{
    return gq_getValue (node: node, property: numProc)             — 2826
}
```

FIG. 28D

02/12-08:31    result = avgCPU_maxCPU ( )
02/12-16:30    result = avgCPU_maxCPU ( )
02/13-08:32    result = avgCPU_maxCPU ( )       } 2827
02/13-16:27    result = avgCPU_maxCPU ( )
02/14-08:30    result = avgCPU_maxCPU ( )
02/14-08:30    result = avgCPU_maxCPU ( )

02/14-08:32    graph query: getChildren (node: "backend")  —— 2807
02/14-08:32    result = avgCPU_maxCPU (node)
02/14-08:33    result = avgCPU_maxCPU (node)
02/14-08:34    result = avgCPU_maxCPU (node)
02/14-08:34    result = avgCPU_maxCPU (node)

02/14-08:35    graph query: getNodeID (node: "VM11"-(includes)-node: (label: "actions")-(includes)-node: (label:"terminate", label: "plimux")                                    0a3677051
02/14-08:35    graph query: getValue ("VM11", property: "HA address")                 36-9000.01
02/14-08:35    graph query: getValue ("VM11", property: "ID")                         VM611
02/14-08:36    graph query: getValue (nodeID: 0a3677051, property: "name")            "shutdown"
02/14-08:37    command ("36-9000.01," "VM611", "shutdown")

02/14-08:37    result = numProc (node)
02/14-08:39    result = numProc (node)
02/14-08:41    result = numProc (node)
02/14-08:43    result = numProc (node)
02/14-08:45    result = numProc (node)
02/14-08:47    result = numProc (node)

02/14-08:37    graph query: getNodeID (node: "client infrastructure"-(includes)-node: (label: "actions")-(includes)-node: (label:"terminate")                                    0a3676603
02/14-08:38    graph query: getValue ("client infrastructure ", property: "client-interface address")                                                                            36-8000.02
02/14-08:38    graph query: getValue (nodeID: 0a3676603, property: "name")            "terminate"

FIG. 28E

```
cTime = sys.time();
if (cTime > 8:32 AND cTime < 16:27)
    waitTo (16:27)
else if (cTime > 16:30 OR cTime < 8:30)
    waitTo (8:30)
do
{
    result = avgCPU_maxCPU ()
} while (result > threshold)
```
⎫ 2828

02/14-08:32  graph query: getChildren (node: "backend")
02/14-08:32  result = avgCPU_maxCPU (node)
02/14-08:33  result = avgCPU_maxCPU (node)
02/14-08:34  result = avgCPU_maxCPU (node)
02/14-08:34  result = avgCPU_maxCPU (node)

02/14-08:35  graph query: getNodeID (node: "VM11"-(includes)-node: (label: "actions")-(includes)-node: (label:"terminate", label: "plimux")                    0a3677051
02/14-08:35  graph query: getValue ("VM11", property: "HA address")              36-9000.01
02/14-08:35  graph query: getValue ("VM11", property: "ID")                          VM611
02/14-08:36  graph query: getValue (nodeID: 0a3677051, property: "name")      "shutdown"
02/14-08:37  command ("36-9000.01," "VM611", "shutdown")

```
while (TRUE)
{
    result = numProc (node)
    if (result == 0) break
    waitMinutes (2)
}
```
⎫ 2829

02/14-08:37  graph query: getNodeID (node: "client infrastructure"-(includes)-node: (label: "actions")-(includes)-node: (label:"terminate")                     0a3676603
02/14-08:38  graph query: getValue ("client infrastructure ", property: "client-interface address")
                                                                                 36-8000.02
02/14-08:38  graph query: getValue (nodeID: 0a3676603, property: "name")      "terminate"
02/14-08:38  command (36-8000.02, " VM611", "terminate")

FIG. 28F

```
cTime = sys.time();
if (cTime > 8:32 AND cTime < 16:27)
   waitTo (16:27)
else if (cTime > 16:30 OR cTime < 8:30)
   waitTo (8:30)
do
{
   result = avgCPU_maxCPU ()
} while (result > threshold)

nodes[] = graph query: getChildren (node: "backend")
sNode = ""
sResult = smallInt;
for (i = 0; i > nodes.length(); i++)
{
        result = avgCPU_maxCPU (nodes[i])
        if (result < sResult)
        {
                sNode = nodes[i]
                sResult = result
        }
}
```
⎫
⎬ 2830
⎭

02/14-08:35   graph query: getNodeID (node: "VM11"-(includes)-node: (label: "actions")-
(includes)-node: (label:"terminate", label: "plimux")                            0a3677051
02/14-08:35   graph query: getValue ("VM11", property: "HA address")             36-9000.01
02/14-08:35   graph query: getValue ("VM11", property: "ID")                     VM611
02/14-08:36   graph query: getValue (nodeID: 0a3677051, property: "name")        "shutdown"
02/14-08:37   command ("36-9000.01," "VM611", "shutdown")

```
while (TRUE)
{
   result = numProc (node)
   if (result == 0) break
   waitMinutes (2)
}
```

02/14-08:37   graph query: getNodeID (node: "client infrastructure"-(includes)-node: (label:
"actions")-(includes)-node: (label:"terminate")                                  0a3676603
02/14-08:38   graph query: getValue ("client infrastructure ", property: "client-interface
address")                                                                        36-8000.02
02/14-08:38   graph query: getValue (nodeID: 0a3676603, property: "name")        "terminate"
02/14-08:38   command (36-8000.02, " VM611", "terminate")

FIG. 28G

```
cTime = sys.time();
if (cTime > 8:32 AND cTime < 16:27)
    waitTo (16:27)
else if (cTime > 16:30 OR cTime < 8:30)
    waitTo (8:30)
do
{
    result = avgCPU_maxCPU ()
} while (result > threshold)                    — 2833 nodes[] = graph query: getChildren (node: "backend")
sNode = ""
sResult = smallInt;
for (i = 0; i > nodes.length(); i++)
{
    result = avgCPU_maxCPU (nodes[i])
    if (result < sResult)
    {
        sNode = nodes[i]
        sResult = result
    }
} nID = graph query: getNodeID (node: sNode-(includes)-node: (label: "actions")-(includes)-node:
(label:"terminate", label: "plimux")
HA = graph query: getValue (sNode, property: "HA address")
vmID = graph query: getValue (sNode, property: "ID")
actionName = graph query: getValue (nodeID: nID, property: "name")
command (HA, vmID, actionName)                                                    ⟋ 2831 while (TRUE)
{
    result = numProc (sNode)
    if (result == 0) break
    waitMinutes (2)
} nID = graph query: getNodeID (node: "client infrastructure"-(includes)-node: (label: "actions")-
(includes)-node: (label:"terminate")
HA = graph query: getValue ("client infrastructure ", property: "client-interface address")
actionName = graph query: getValue (nodeID: nID, property: "name")
command (HA, vmID, actionName)                                                    ⟋ 2832
```

FIG. 28H

```
result avgCPU_maxCPU ( )
{
        avg = gq_getValue (node: "backend", property: avgCPU)
        max = gq_getValue (node: "backend", property: maxCPU)
        return avg / max
} result avgCPU_maxCPU (node)
{
        avg = gq_getValue (node: node, property: avgCPU)
        max = gq_getValue (node: node, property: maxCPU)
        return avg / max
} result numProce (node)
{
        return gq_getValue (node: node, property: numProc)
}
```

FIG. 28I

```
cTime = sys.time();                    ─── 2837
if (cTime > 8:32 AND cTime < 16:27)
    waitTo (16:27)
else if (cTime > 16:30 OR cTime < 8:30)
    waitTo (8:30)
do
{
    result = avgCPU_maxCPU ()
} while (result > 0.6) ───────
                              ─── 2834
nodes[] = graph query: getChildren (node: "backend")
sNode = ""
sResult = smallInt;
for (i = 0; i > nodes.length(); i++)
{
    result = avgCPU_maxCPU (nodes[i])
    if (result < sResult)
    {
        sNode = nodes[i]
        sResult = result
    }
}
```

2836 {
```
OS = graph query: getValue (sNode, property: "OS")
nID = graph query: getNodeID (node: sNode-(includes)-node: (label: "actions")-(includes)-node:
(label:"terminate", label: OS)
HA = graph query: getValue (sNode, property: "HA address")
vmID = graph query: getValue (sNode, property: "ID")
actionName = graph query: getValue (nodeID: nID, property: "name")
command (HA, vmID, actionName)

while (TRUE)
{
    result = numProc (sNode)
    if (result == 0) break
    waitMinutes (2)
} nID = graph query: getNodeID (node: "client infrastructure"-(includes)-node: (label: "actions")-
(includes)-node: (label:"terminate")
HA = graph query: getValue ("client infrastructure ", property: "client-interface address")
actionName = graph query: getValue (nodeID: nID, property: "name")
command (HA, vmID, actionName)
```

FIG. 28J

ALTERNATIVE CONTROL INTERFACE PROVIDED TO INFRASTRUCTURE-AS-A-SERVICE CLIENTS

CROSS-REFERENCE TO RELATED APPLICATIONS

This application claims the benefit of Provisional Application No. 63/151,566, filed Feb. 19, 2021, which is incorporated herein by reference in its entirety.

TECHNICAL FIELD

The current document is directed to distributed computer systems and, in particular, to an alternative control interface, based on graph and metric databases and providing process-automation for automating control tasks, provided to Infrastructure-as-a-Service ("IaaS") clients.

BACKGROUND

During the past seven decades, electronic computing has evolved from primitive, vacuum-tube-based computer systems, initially developed during the 1940s, to modern electronic computing systems in which large numbers of multi-processor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. The capabilities of modern computer systems have provided an environment in which many different types of computer-implemented technologies, services, applications, and platforms have been developed and have rapidly advanced in functionalities and capacities. One type of service now provided as a result of the above-mentioned advancements is referred to as "Infrastructure as a Service" ("IaaS"). IaaS provides leased computational infrastructure to IaaS clients, often based on large numbers of virtual machines, containers, and other computational entities that provide execution environment for clients' distributed applications. While IaaS systems generally provide user interfaces to clients to allow clients to monitor, and apply various control operations to, their distributed applications, the IaaS-stem-provided user interfaces often lack comprehensive information-presentation features, diagnostic tools, and a comprehensive control interface needed by clients to monitor, understand, maintain, and optimize execution of their distributed applications.

SUMMARY

The current document is directed to an alternative control interface provided to infrastructure-as-a-service ("IaaS") clients that provides a comprehensive collection of monitoring and control features to allow IaaS clients to monitor their distributed applications running within execution environments provided by an IaaS and to optimize execution of their distributed applications using the control features provided by the alternative control interface. In addition, the alternative control interface provides process-automation features and services that allow IaaS clients to automate monitoring and control tasks. In the described implementations, the currently disclosed alternative control interface is based on a graph database and a metrics database. The graph database stores a current representation of the infrastructure leased from an IaaS system by an IaaS client and the metrics database continuously collects and stores metric values scraped from components of the infrastructure leased by the IaaS client.

BRIEF DESCRIPTION OF THE DRAWINGS

FIGS. 14A-B illustrate a number of example queries that, when executed, retrieve data from the example graph database discussed with reference to FIG. 13 and that add data to the example graph database.

FIG. 15 illustrates a query used to determine the current sales totals, and the average of the sales for previous years, for all the employees of the Acme corporation.

FIGS. 28A-J provide an example of generation of a complex command from a set of actions, as introduced above with reference to FIGS. 27K-N.

DETAILED DESCRIPTION

Figure 1:
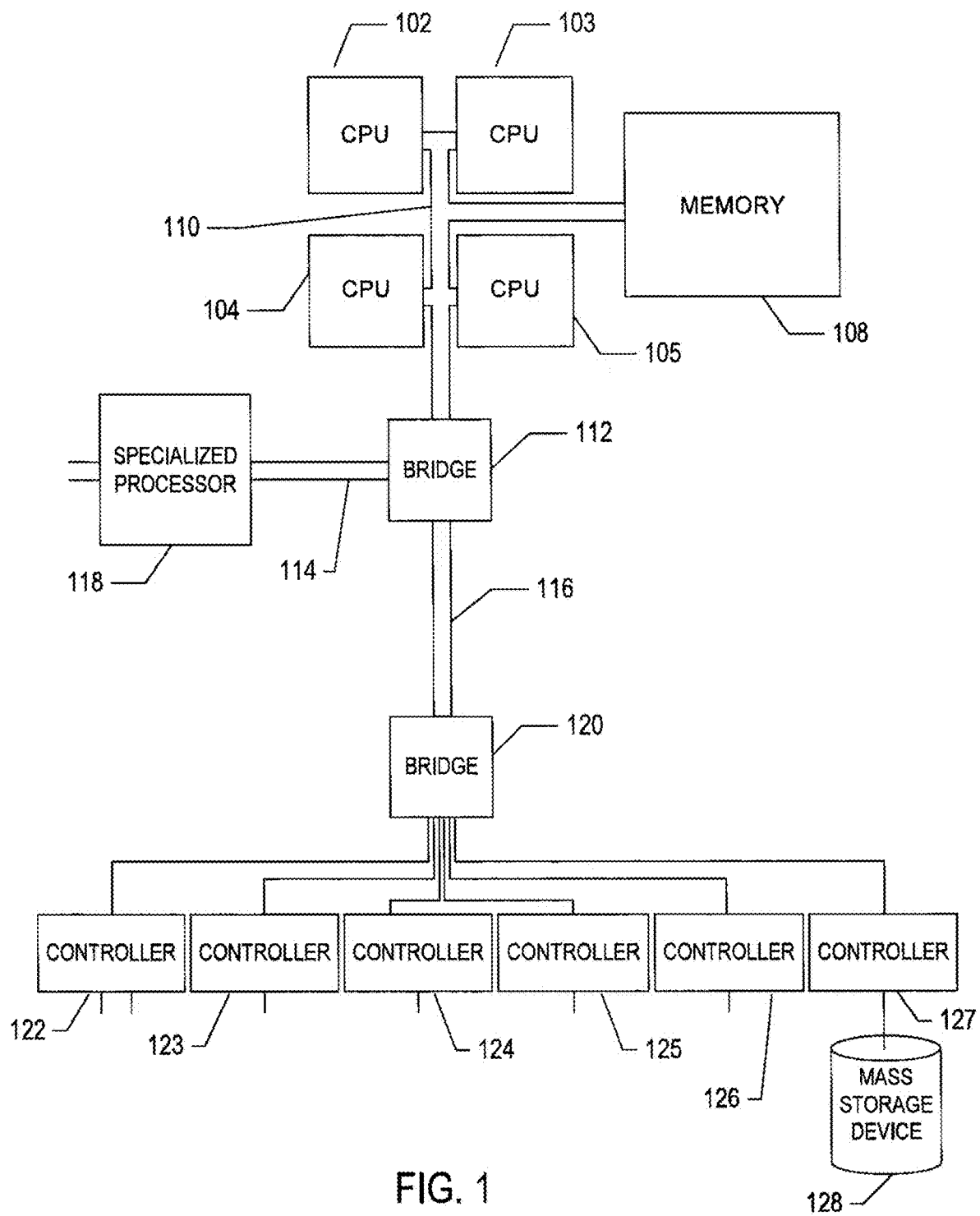
FIG. 1 provides a general architectural diagram for various types of computers.

The current document is directed to a comprehensive control interface provided to Infrastructure-as-a-Service ("IaaS") clients. In a first subsection, below, a detailed description of computer hardware, complex computational systems, and virtualization is provided with reference to FIGS. 1-5. In a second subsection, an overview of IaaS is provided and the currently disclosed control interface is introduced, with reference to FIGS. 6A-9. In a third subsection, graph databases are discussed with reference to FIGS. 10-15B. In a fourth subsection, metric databases are discussed with reference to FIGS. 16-19. In a fifth subsection, the currently disclosed control interface is discussed with reference to FIGS. 10-29B.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
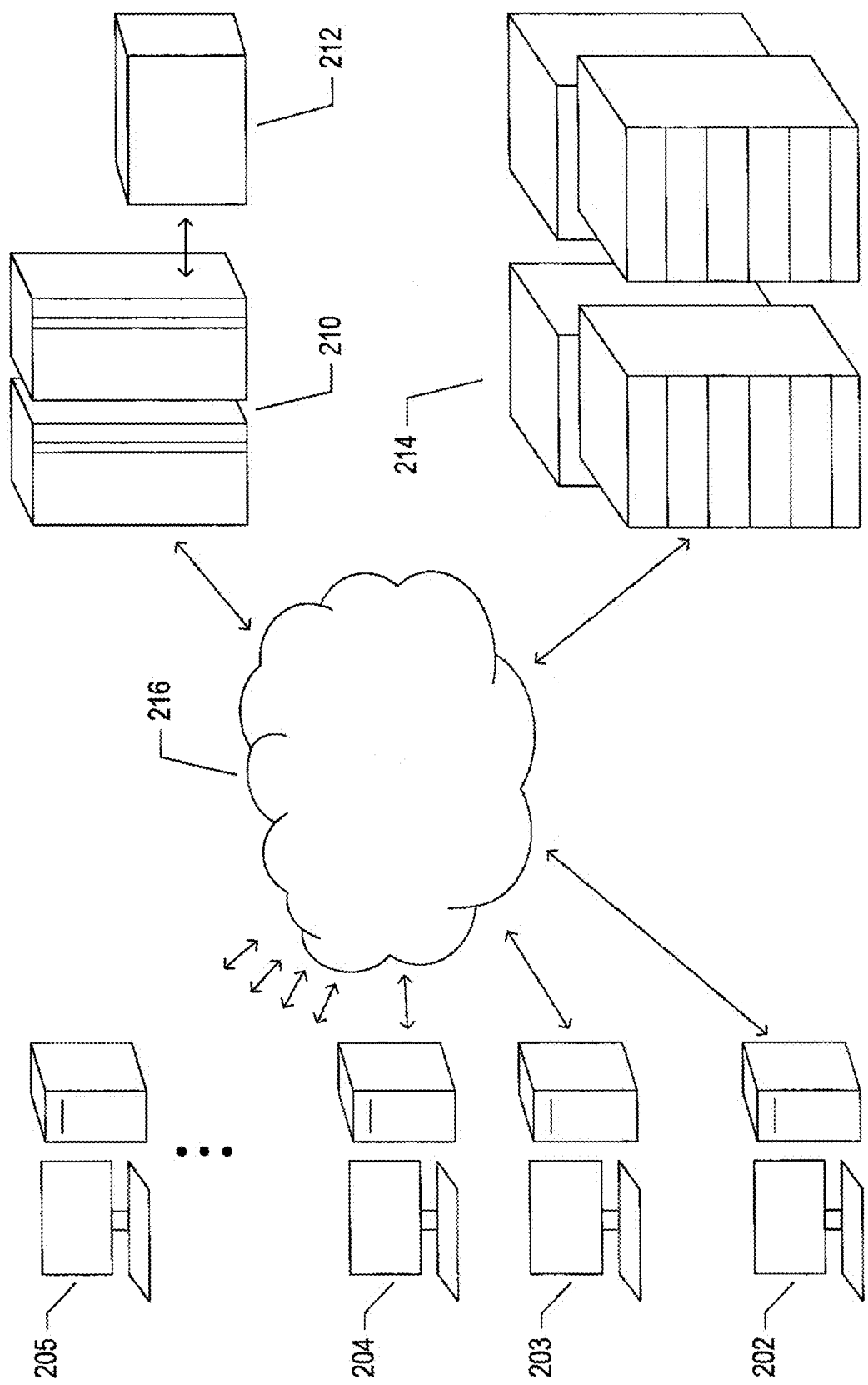
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
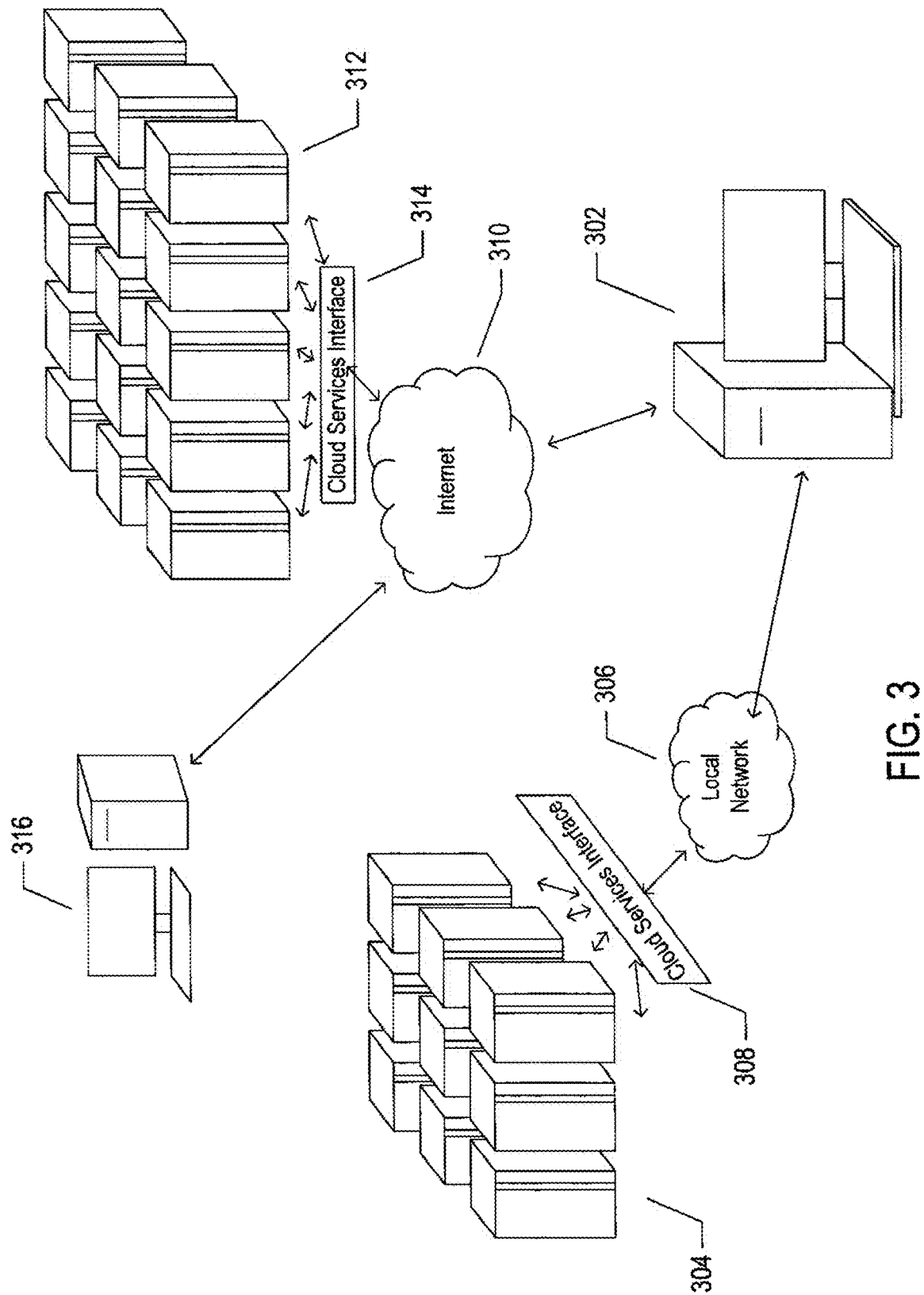
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
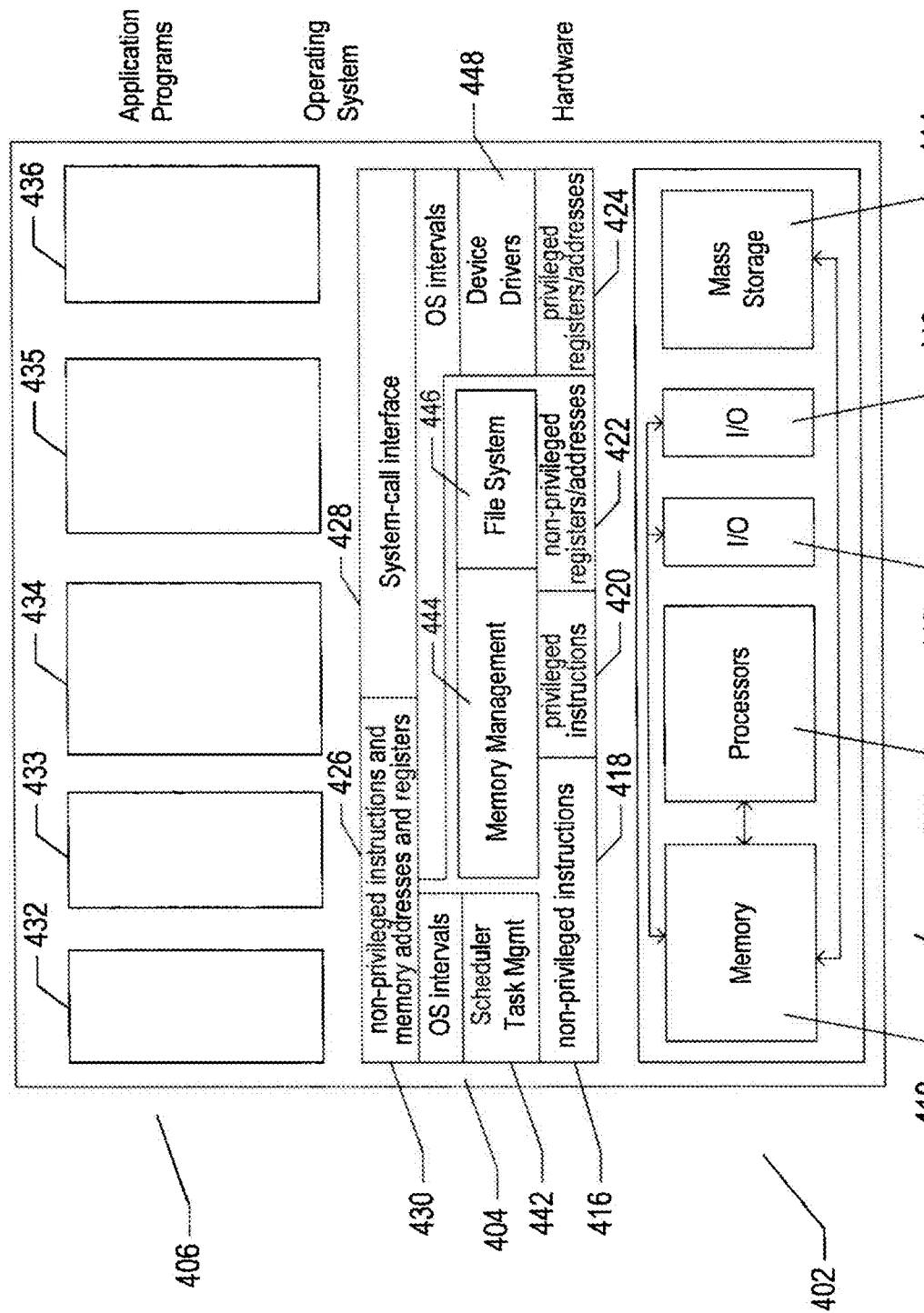
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
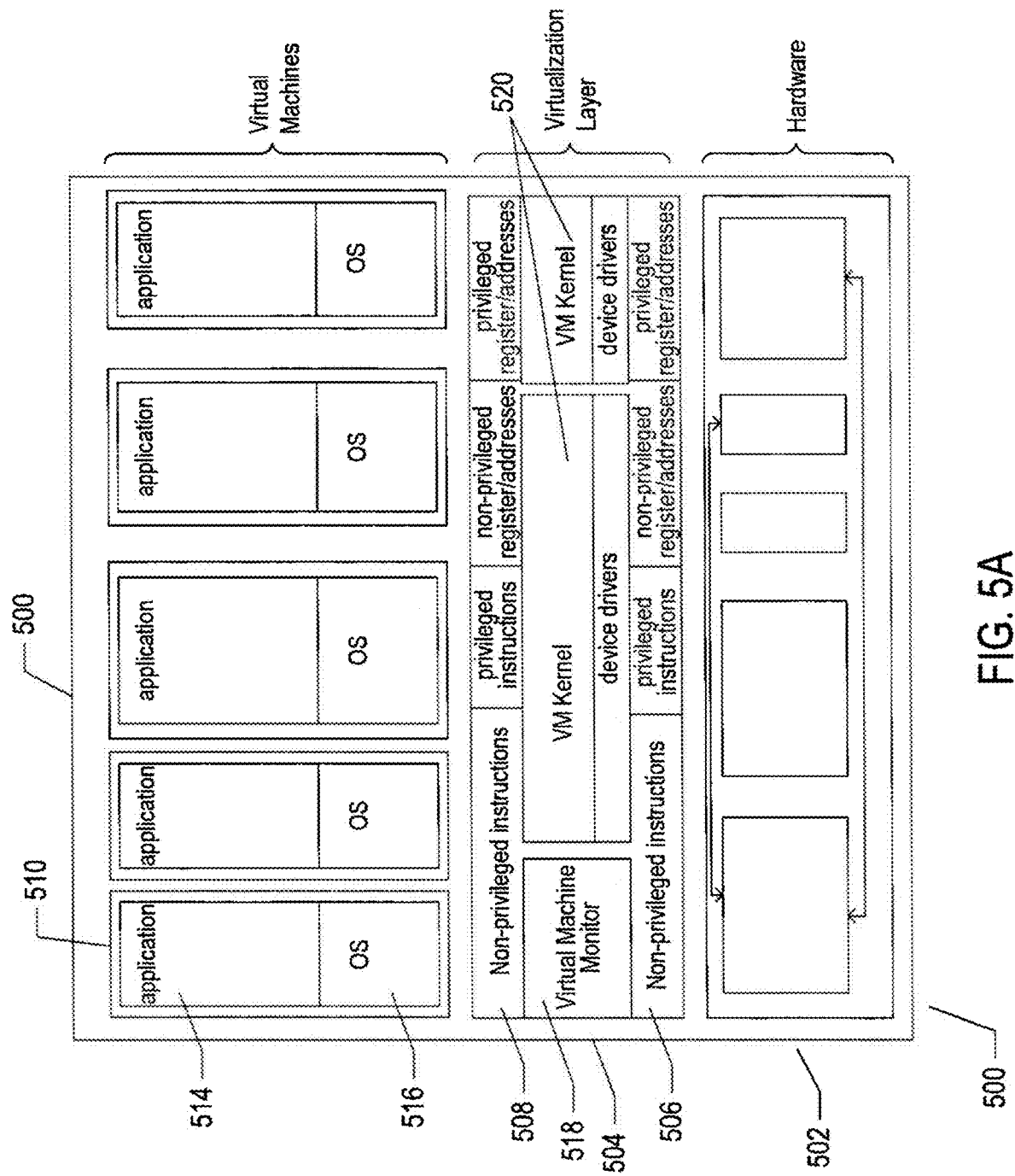
FIGS. 5A-B illustrate two types of virtual machine and virtual-machine execution environments.
Figure 5B:
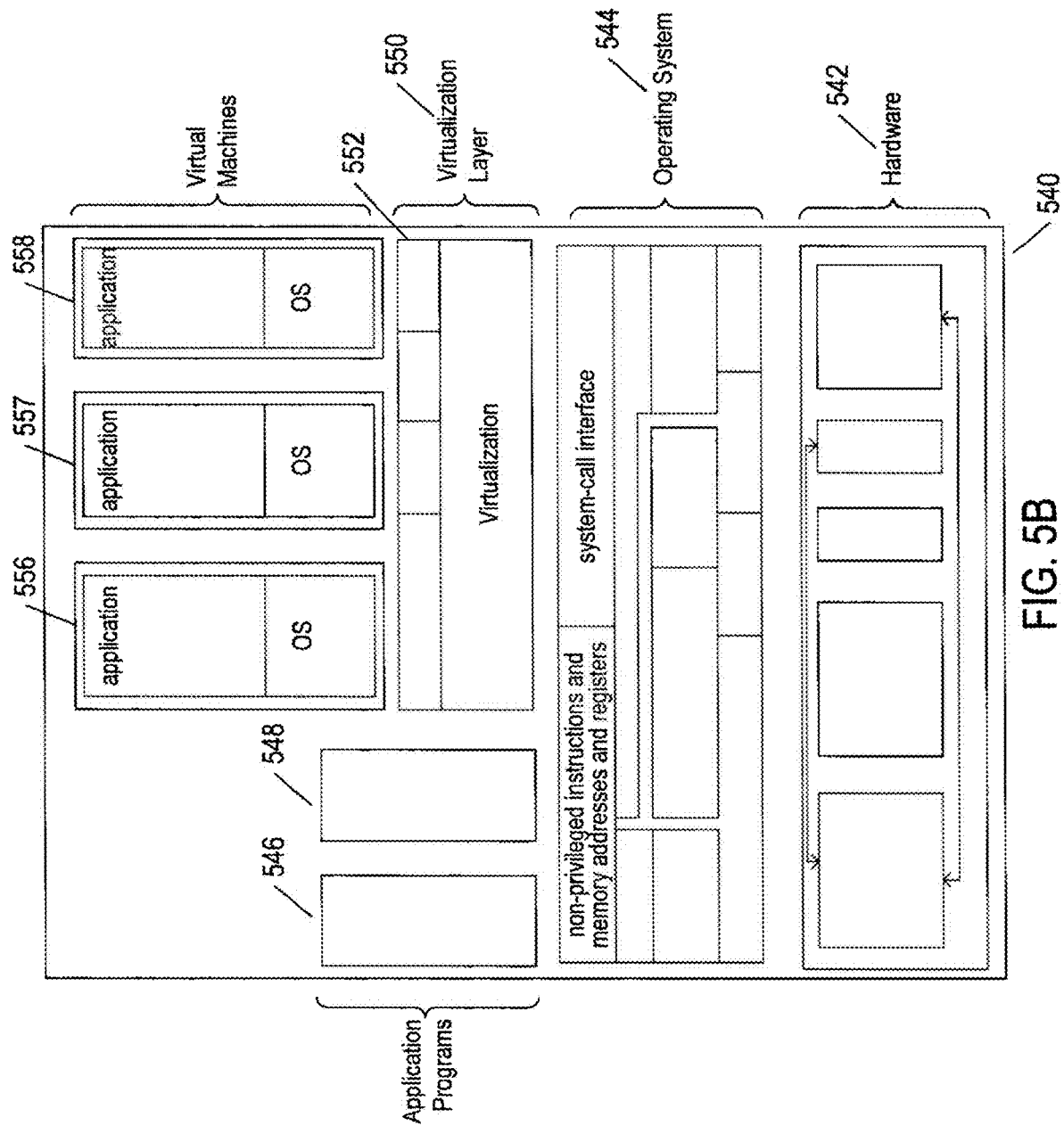

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interface. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6A:
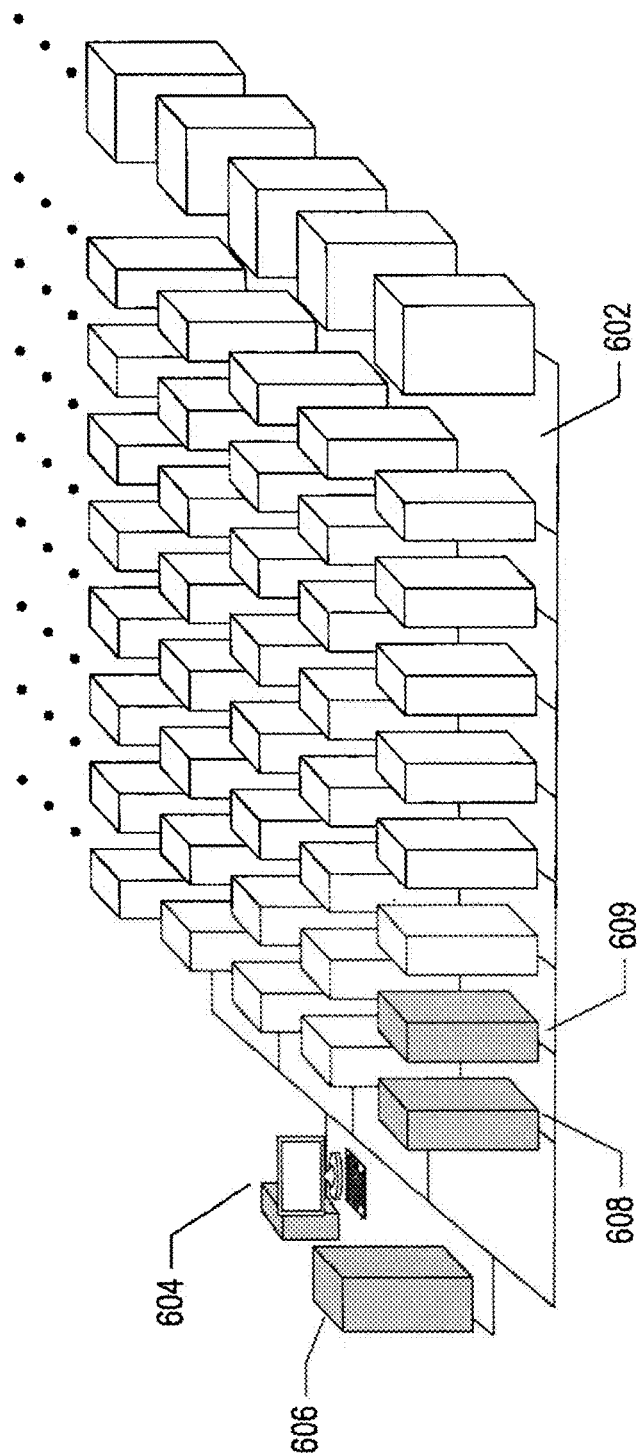
FIGS. 6A-B illustrate an IaaS system.
Figure 6B:
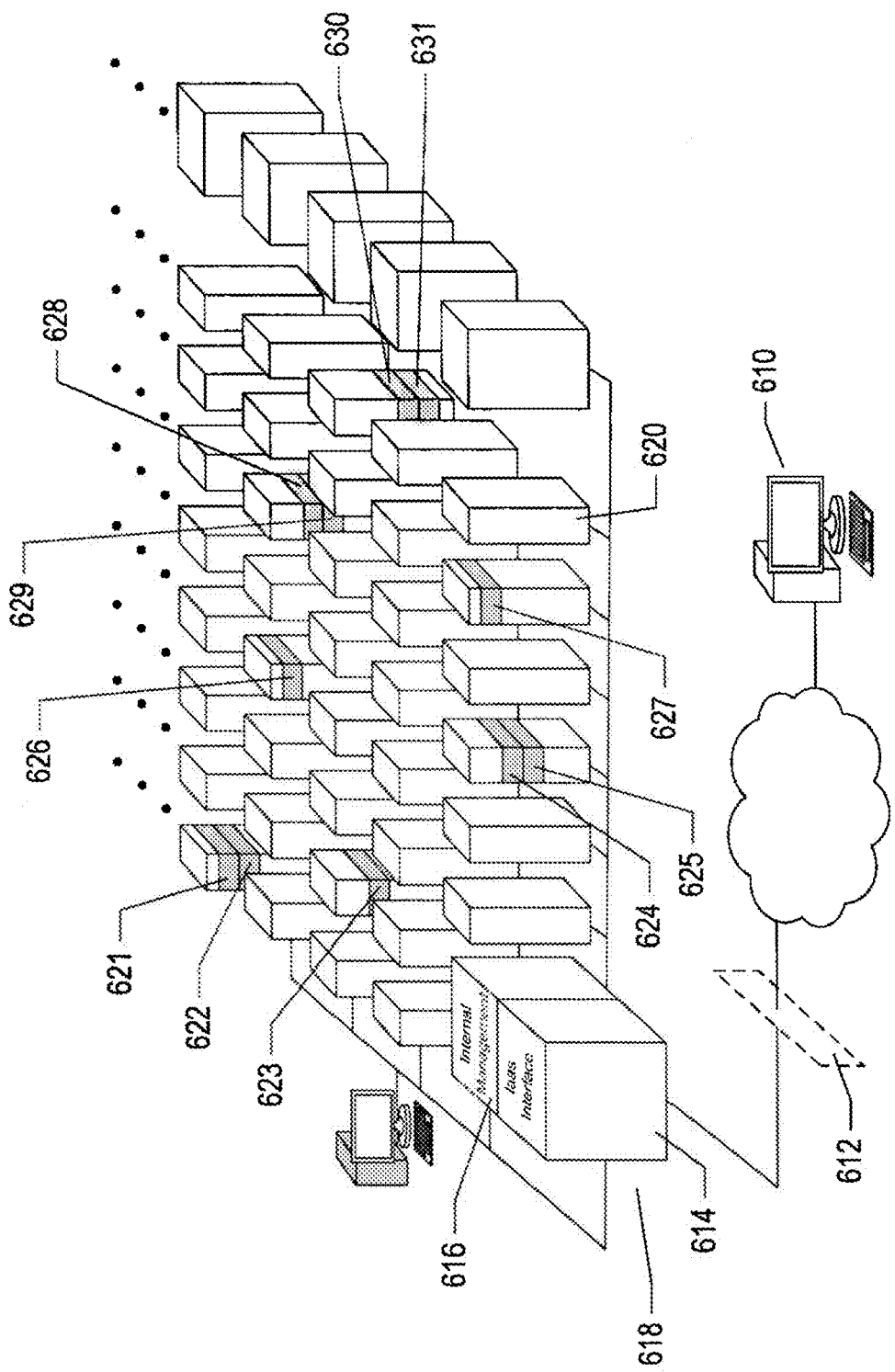

Infrastructure as a Service ("IaaS") and Introduction to the Currently Disclosed Comprehensive Control Interface Provided to IaaS Clients FIGS. 6A-B illustrate an IaaS system. IaaS is essentially synonymous with cloud computing. An IaaS provider generally owns or leases a large, distributed computer system that may comprise multiple different data centers located in different geographical areas. In FIG. 6A, an IaaS provider's distributed computer system is represented by a large number of network-connected servers and data-storage appliances 602. The distributed computer system includes one or more management consoles 604 and the one or more management servers 606 that provide management tools that the IaaS provider uses to manage and maintain the distributed computer system. In addition, one or more servers 608-609 host one or more IaaS applications and services that provide IaaS-client interfaces to clients of the IaaS and that facilitate allocation, management, and deallocation of computational resources within the distributed computer system by IaaS clients and that provides limited operational-status information with regard to leased infrastructure components. As shown in FIG. 6B, an IaaS client uses a client computer system 610 to access an IaaS-client interface 612 provided by IaaS applications and services 614 and management components 616 of the distributed computer system 602. Note that, in FIG. 6B, the servers that hosts the IaaS applications and services (608-609 in FIG. 6A) and the management server (606 in FIG. 6A) are abstracted as a single management-and-IaaS-services component 618 representing that portion of the distributed computer system allocated to management and IaaS services. The remaining servers and a distributed computer system, such as server 620, are available for providing infrastructure to IaaS clients. As shown in FIG. 6B by shaded portions of servers, the IaaS client accessing the IaaS-client interface 612 using client computer system 610 has been allocated numerous virtual machines 621-631 executing within the distributed computer system. These virtual machines host components of one or more IaaS-client distributed applications that execute within a distributed computer system.

While it is common to view the infrastructure provided to IaaS clients by an IaaS provider as a set of virtual machines, many other types of infrastructure can be provided, including data-storage capacity in data-storage appliances, virtual networks and edge routers, containers, which are essentially virtual machines provided by operating systems, rather than virtualization layers, and many other types of infrastructure, including access to the third-party services. The current document does not repeatedly point this out, in the following discussion, but it should be understood that virtual machines are only one type of infrastructure that is made available to IaaS clients through the IaaS-client interface 612. In general, the total numbers of infrastructure components and infrastructure-component-provided capacities, including computational bandwidth, data-storage capacity, and networking bandwidth, are dynamic. One of the benefits of using an IaaS is that the leased infrastructure can be quickly expanded and contracted in response to increases and decreases in workload in order to optimize a client's expenditures on leased computational resources. Furthermore, workload may be dynamically shifted among different leased infrastructure components and the infrastructure components may be shifted among different physical distributed-computer-system components and data centers in order to optimize the execution of an IaaS client's distributed applications. Dynamic, continuous configuration involves monitoring the operational characteristics of leased infrastructure components and distributed applications to detect problems and opportunities for optimization and then employing control features provided to clients through the IaaS-client interface in order to redistribute workload, allocate additional resources, deallocate resources, and carry out other such operations to improve the efficiency of the client's distributed applications.

Figure 7:
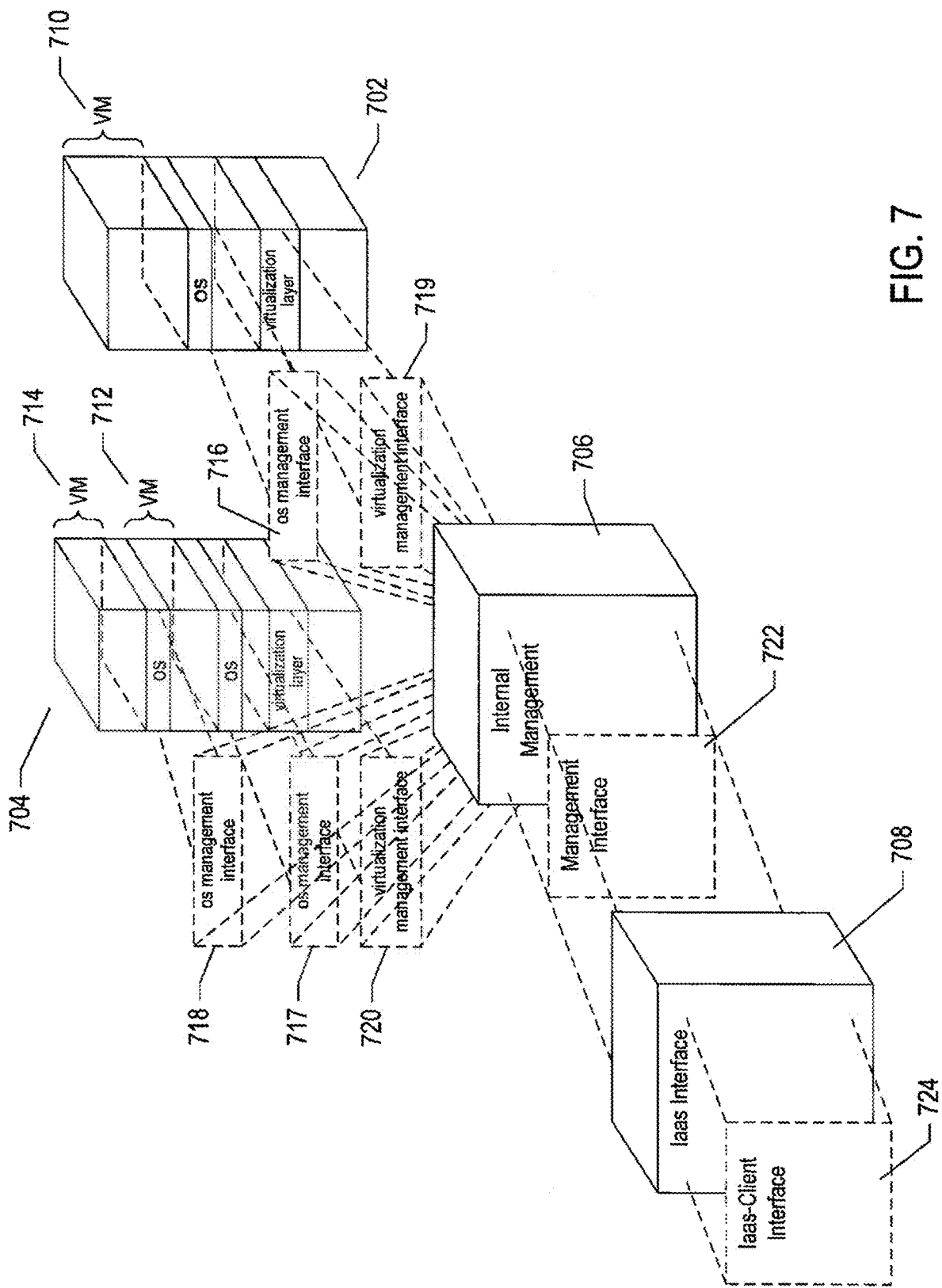
FIG. 7 illustrates the sources of functionalities and information offered to an IaaS client through an IaaS-client interface.

FIG. 7 illustrates the sources of functionalities and information offered to an IaaS client through an IaaS-client interface. FIG. 7 shows several physical servers 702 and 704 within an IaaS distributed computer system, the distributed-computer-system management component 706 of the IaaS system, and the IaaS applications-and-services component 708 of the IaaS system. Server 702 includes a virtual machine 710 and server 704 includes two virtual machines 712 and 714. The guest operating systems in these virtual machines provide management interfaces 716-718 through which an external entity can carry out various management operations, such as instantiating new processes, and obtain information about the virtual machine, including current CPU usage, current storage-capacity usage, and currently used networking bandwidth, and the number of processes currently executing on the virtual machine. The virtualization layers that support execution of the virtual machines also provide management interfaces 719-720 that provide similar information as provided by the guest-operatingsystem management interfaces along with additional, virtualization-layer-specific information.

The management component of the distributed computer system 706 accesses the virtualization management interfaces and operating-system management interfaces, and may access additional information provided by additional components within the distributed computer system, in order to control component operation as well as to gather information needed to facilitate monitoring and control operations. The management component 706, in turn, provides a management interface 722 through which an IaaS administrator or manager accesses management features and services via the management console, an administrator or manager computer system, laptop, or another processor-controlled device. In addition, the management interface may be accessed by the IaaS applications-and-services component 708 of the distributed computer system. The IaaS applications-and-services component, in turn, provides an IaaS-client interface 724 to each IaaS client through which an IaaS client can access various services and features provided by the IaaS applications and services running within the IaaS applications-and-services component as well as various management features and services provided through the management interface 722 by the management component 706. However, the IaaS applications-and-services component may only access a small subset of the management services and features provided by the management interface 722 and may only expose a small subset of the small subset of accessed management services and features to IaaS clients through the IaaS-client interface 724. In general, the IaaS-client interface provided to IaaS clients by an IaaS system provides very limited and constrained access to the information sources and control features within the IaaS distributed computer system. Many of these constraints are required to ensure that each IaaS client's information and leased resources are secure from access and use by other IaaS clients and external entities. Other of these constraints are required to ensure that IaaS clients cannot use computational resources that have not been specifically allocated to them by the IaaS system. However, in many other cases, useful information and control features that would not be associated with security concerns or unpaid-access concerns are nonetheless unavailable to IaaS clients.

Figure 8:
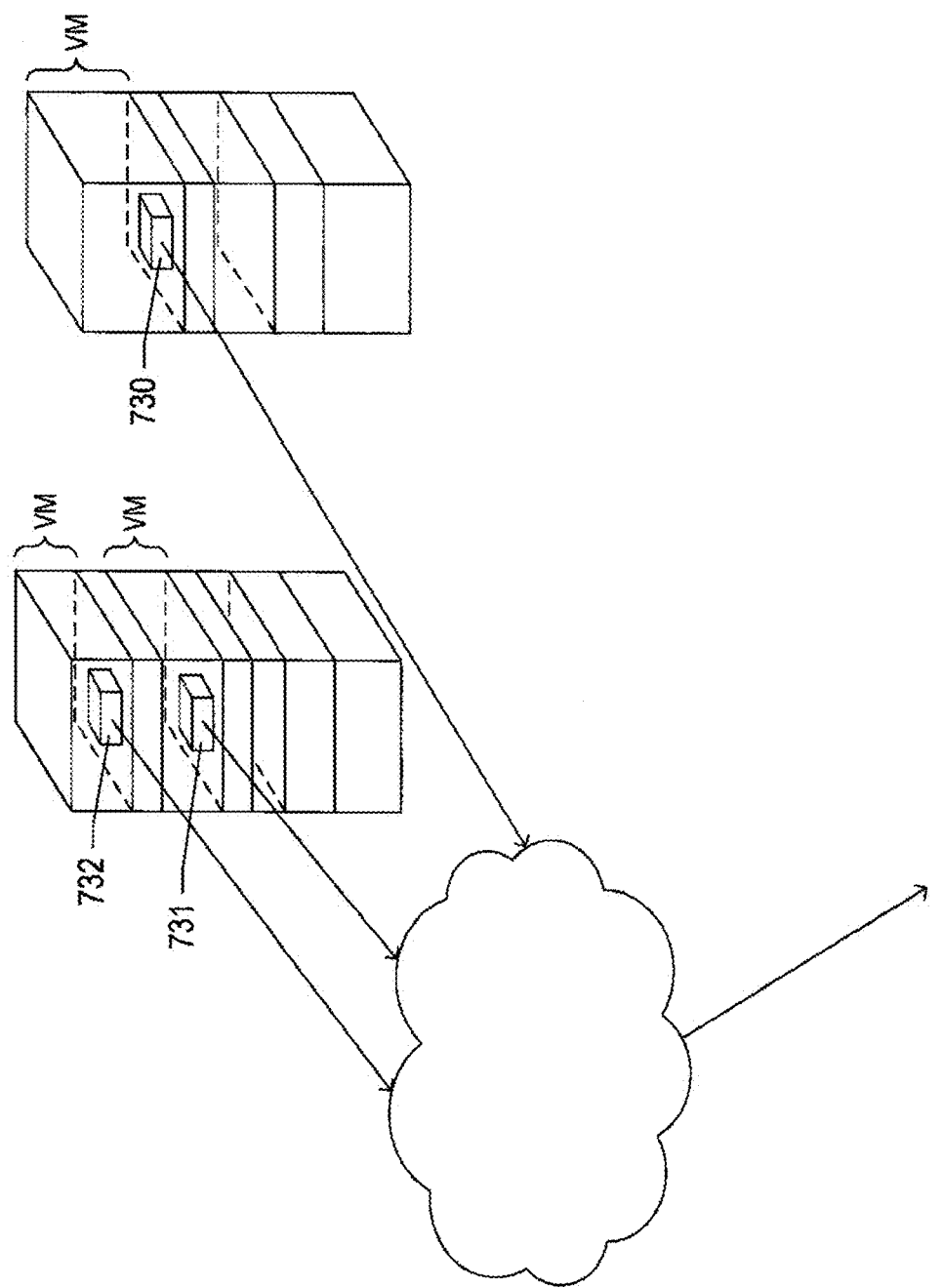
FIG. 8 illustrates IaaS-system-resident agents installed within virtual machines leased to an IaaS client.

FIG. 8 illustrates IaaS-system-resident agents installed within virtual machines leased to an IaaS client. The IaaS-system-resident agents 730-732 are executables that execute within the execution environments provided by the virtual machines. They are installed through services provided by the IaaS-client interface to provide direct access to information obtained by the agents within guest operating system, and, when possible, virtualization layers controlling the virtual machines. These IaaS-system-resident agents, referred to as "host agents" in the following discussion, provide access, by the currently disclosed control-interface system, to the information and control features that can be securely used by an IaaS client but that are not available through the IaaS-client interface provided by the IaaS system. Host agents can be installed in different types of infrastructure components in addition to virtual machines.

Figure 9:
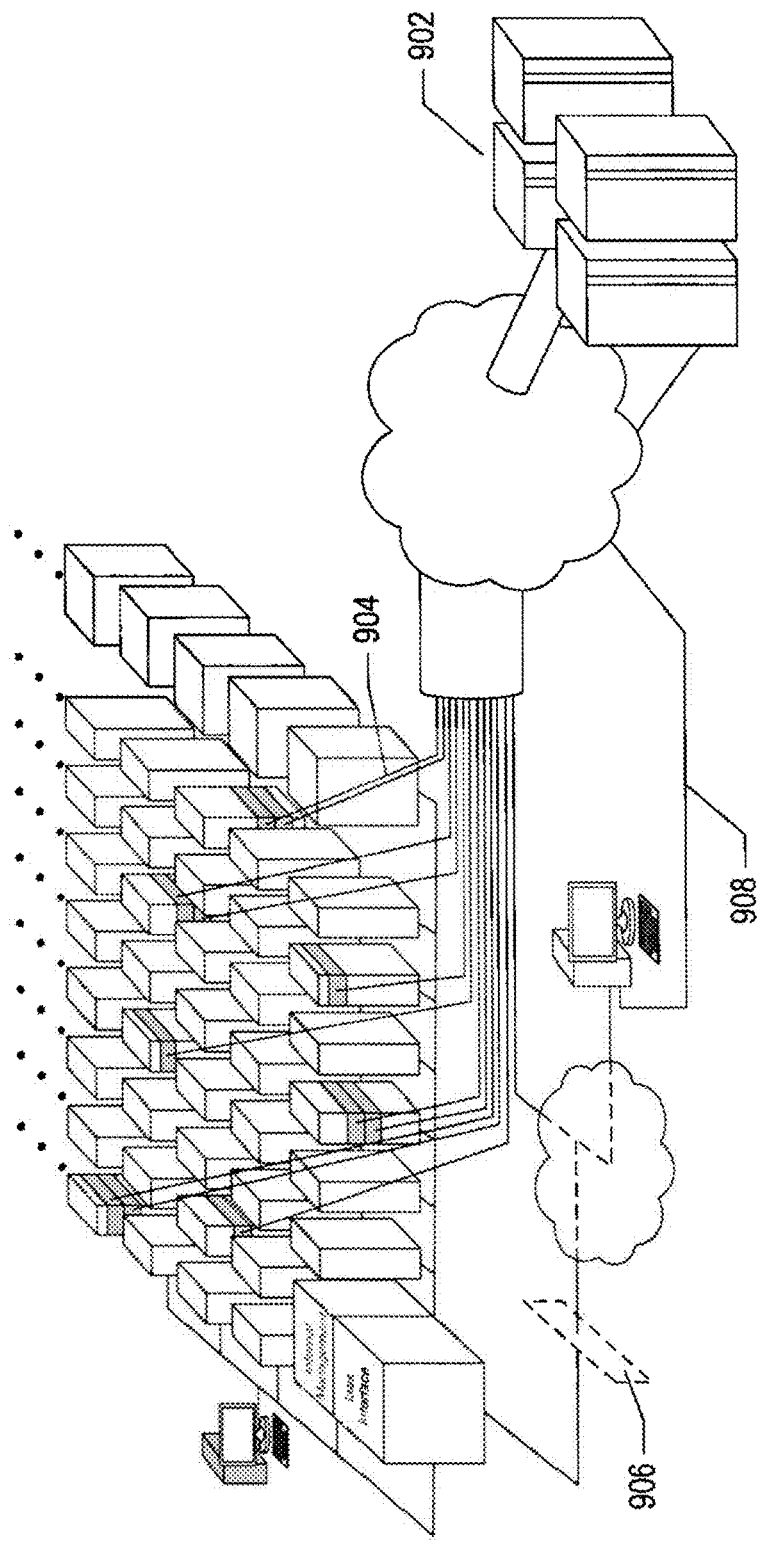
FIG. 9 illustrates an overview of the currently disclosed control-interface system.

FIG. 9 illustrates an overview of the currently disclosed control-interface system. The control-interface system is, in one implementation, a distributed application running within an external data center or cloud-computing facility 902. The control-interface system collects information from, and directs control actions to, infrastructure components currently leased by an IaaS client, the information collection represented in FIG. 9 by communications paths, such as communication path 904, from the IaaS client's leased virtual machines to the control-interface system. In addition, the control-interface system is provided authorization credentials to access the IaaS-client interface 906 on behalf of the IaaS client. Thus, the control-interface system can access all of the information and control features that are accessible to the IaaS client through the IaaS-client interface 906, but can also access much additional information and many additional control features through host agents residing within the virtual machines leased by the IaaS client. In addition, the control-interface system can access information and control features in other types of components and computational resources leased by the IaaS client as well as information and control features provided to the IaaS client by third-party entities, such as third-party computational services. The control-interface system, in turn, provides a much more comprehensive and capable control interface to the IaaS client, as represented by communication path 908. Thus, the currently disclosed control-interface system provides an alternative control interface to the IaaS-client interface provided by the IaaS system. The alternative control interface provides far more information, much greater flexibility in information display and access, far more control features, and additionally provides for process automation to greatly increase the ability of an IaaS client to efficiently monitor, control, and optimize the IaaS client's distributed applications running within, and using, leased infrastructure within the IaaS system.

Graph Databases

Figure 10:
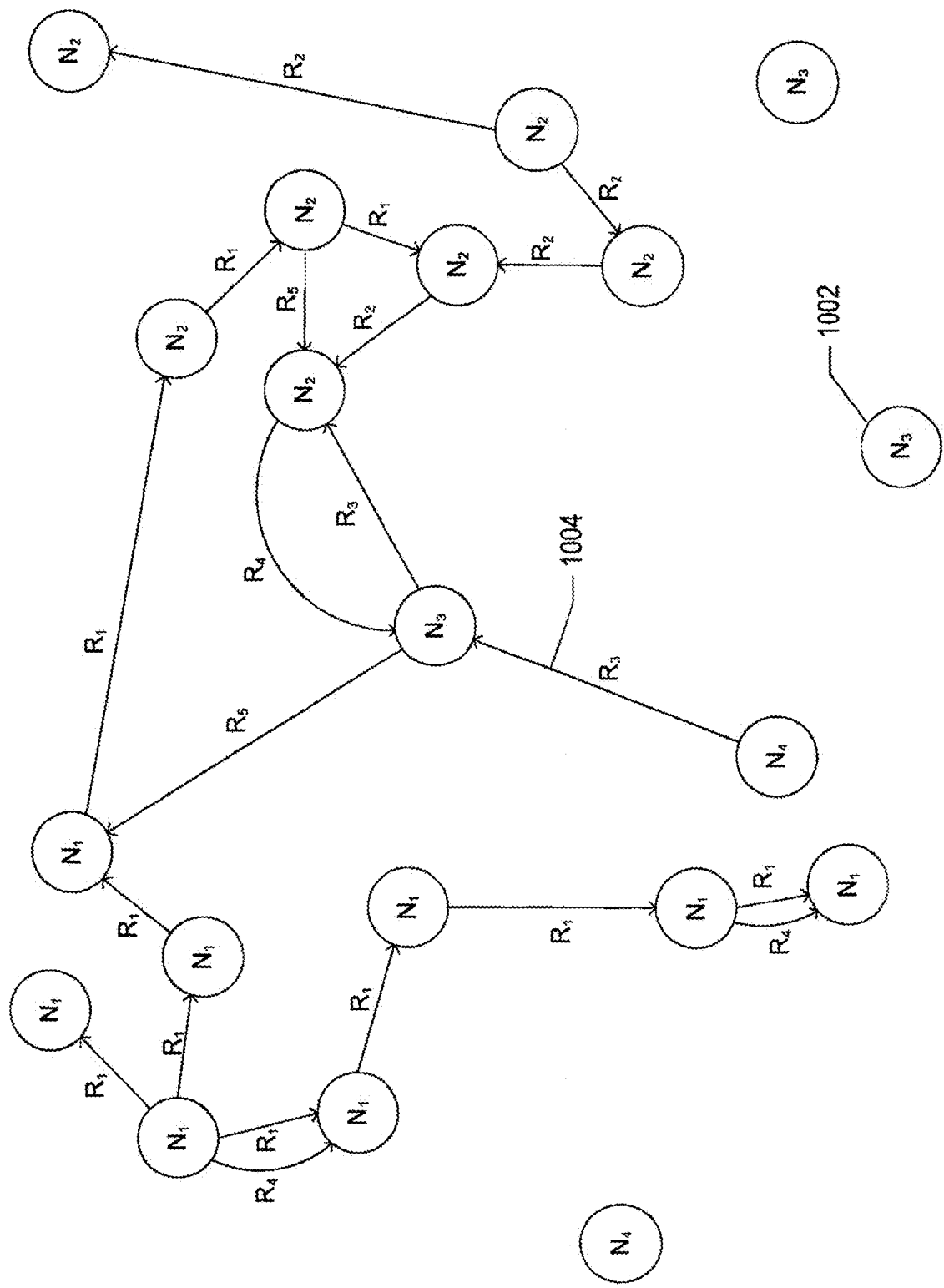
FIG. 10 illustrates a data model used by many graphic databases.

FIG. 10 illustrates a data model used by many graphic databases. The model is related to the mathematical concept of a graph that underlies the field of graph theory. The current document provides examples related to a particular type of graph model referred to as a "labeled property graph" ("LPG"). This is only one of many different possible types of graph models on which graph databases may be based. The currently disclosed improvements are applicable to a wide range of different graph models, but LPGs are used in the examples for clarity and brevity of the following discussion. Similarly, one particular type of graph-database query language is used in the following discussion and examples, although many different types of graph-database query languages have been developed and are currently in use. The currently disclosed improvements are applicable to a wide range of different graph-database query languages.

As shown in FIG. 10, an LPG is a collection of nodes, such as node 1002 labeled "N2," and edges or relationships, such as relationship 1004 labeled "R3." In FIG. 10, nodes are represented by discs and relationships are represented by directed straight lines or curves that each connects two nodes. A directed straight line or curve can be thought of as an arrow pointing from a source node to a destination node. In the type of graph database used in the examples discussed in this document, the LPG stored by the graph database is not required to be fully connected. For example, node 1002 is not connected to any other nodes by relationships. However, a relationship is required to connect two nodes or a given node to itself. A given node may have multiple outgoing and incoming relationships. Graph databases are particularly useful for representing social networks, organizations, complex systems, distribution networks, and other types of real-world entities that can be abstracted as a group of entities of different types interrelated by various types of relationships.

Figure 11:
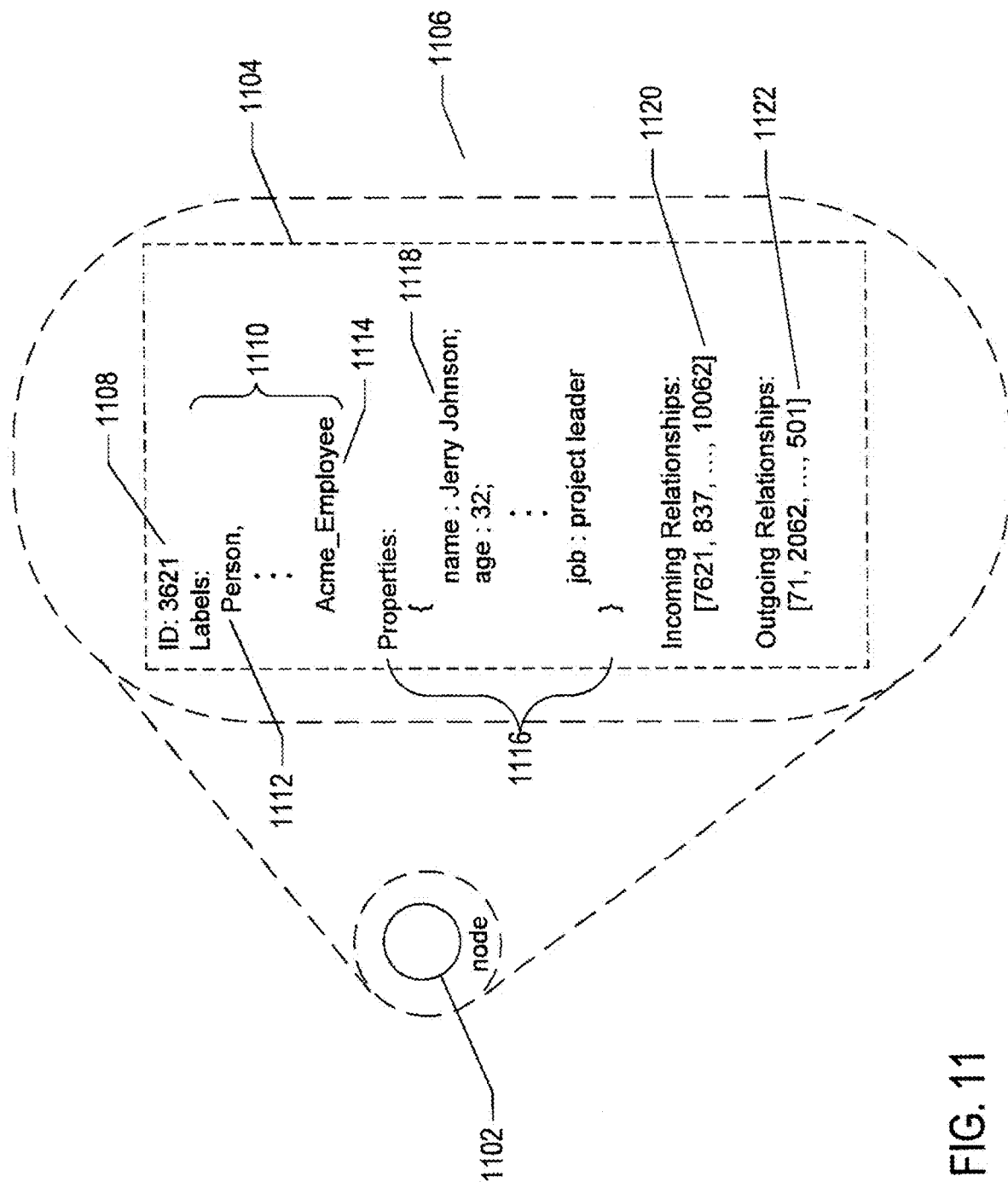
FIG. 11 illustrates the data contents of a node in one implementation of an LPG.

FIG. 11 illustrates the data contents of a node in one implementation of an LPG. The node 1102, represented by a disk as in FIG. 10, can be considered to be a data record 1104, as shown in inset 1106. A node contains a unique numerical identifier 1108. A node may contain 0, 1, or more labels 1110. Labels may be used for a variety of different purposes. In the examples, discussed below, labels are used to indicate different types and subtypes used to characterize nodes. In the example shown in FIG. 11, the node 1102 represents a person 1112 but also represents the Acme-employee subtype of persons 1114. A node may include 0, 1, or more properties 1116. Each property is a key/value pair, such as the property 1118 for which the key is name and the value is "Jerry Johnson." In general, names are alphanumeric character strings that may be further constrained to include only certain characters and may be further constrained to start with a letter, depending on the implementation. Values may be of any of various different fundamental types, such as integers, floating-point values. Unicode-character strings, and homogeneous lists, where the allowable types depend on the particular implementation. A node may contain a list of relationship identifiers 1120 representing the incoming relationships, or, in other words, the relationships directed to the node, and may contain a list of relationship identifiers 1122 representing the outgoing relationships, or, in other words, the relationships directed from the node to other nodes or to itself.

Figure 12:
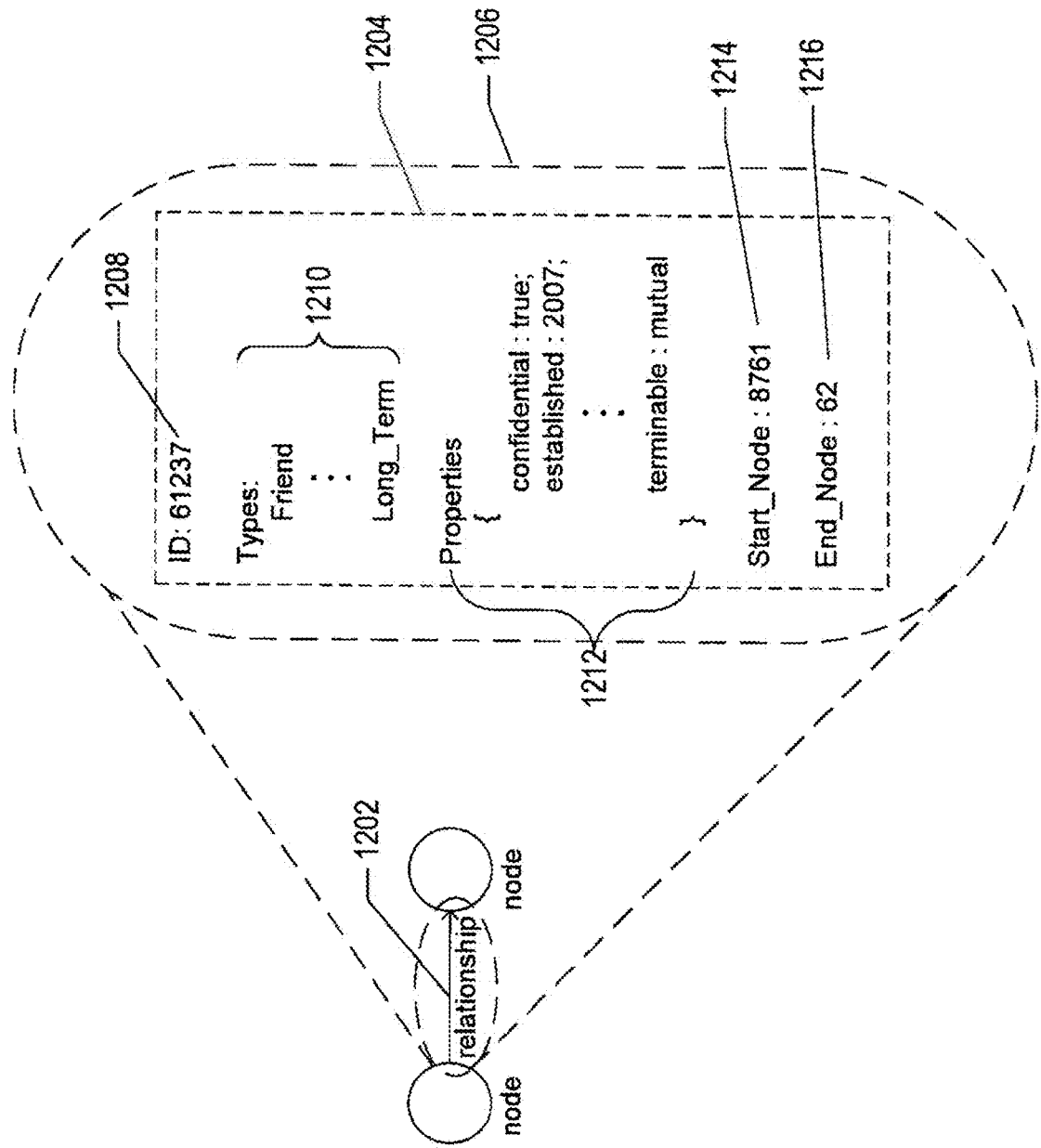
FIG. 12 illustrates the data contents of a relationship in one implementation of an LPG.

FIG. 12 illustrates the data contents of a relationship in one implementation of an LPG. The relationship 1202, represented by a straight-line arrow, as in FIG. 10, can also be thought of as a data record 1204, as shown in inset 1206. A relationship, like a node, contains a unique numerical identifier 1208. A relationship contains 0, 1, or more types 1210, similar to the labels that may be contained in a node. Like a node, a relationship may contain 0, 1, or more properties 1212. A relationship contains a node identifier for the source node, or start node, 1214 and a node identifier for the destination node, or end node, 1216 connected by the relationship.

Figure 13:
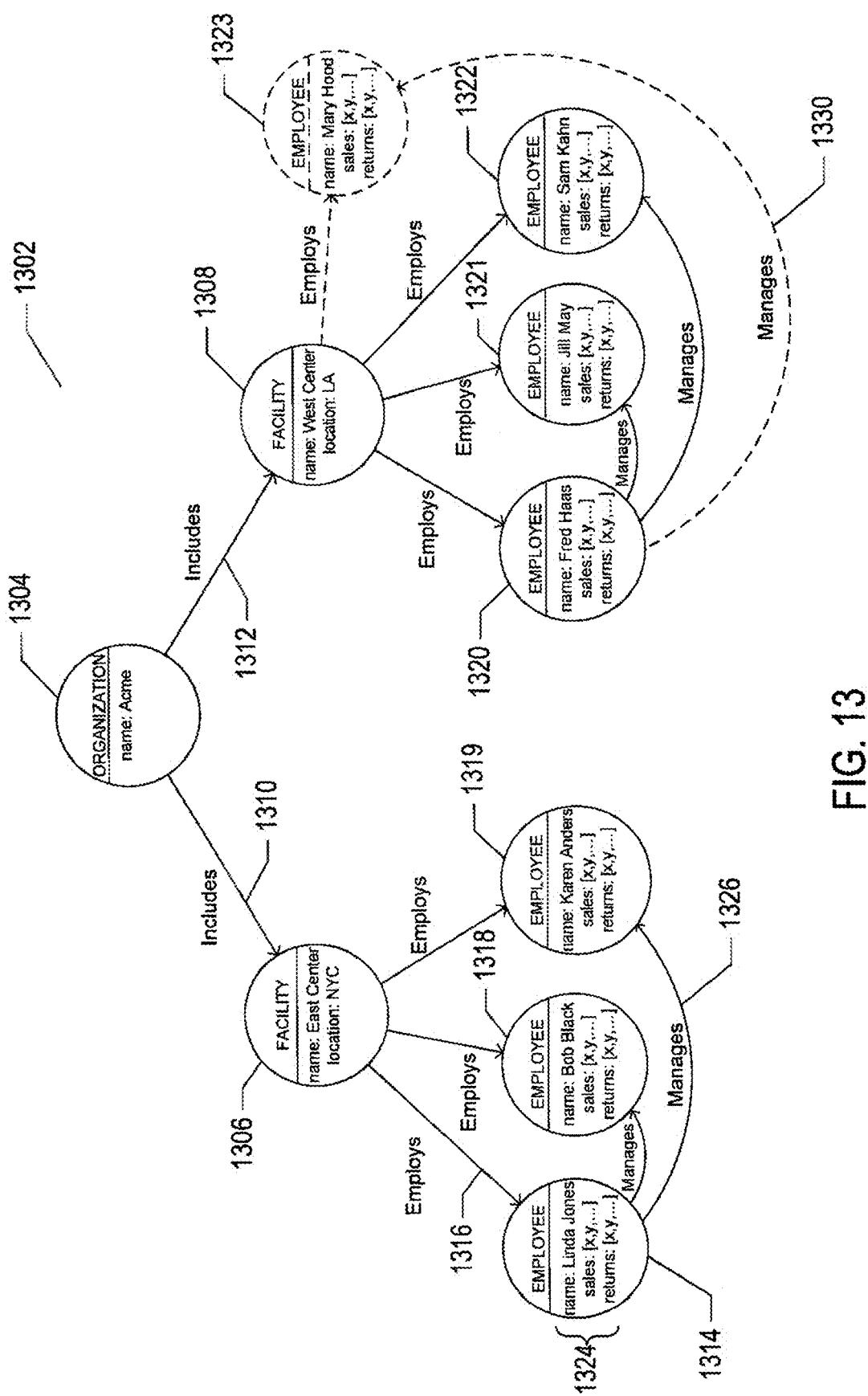
FIG. 13 shows a very small example LPG representing the contents of a graph database that is used in the discussion and examples that follow.

FIG. 13 shows a very small example LPG representing the contents of a graph database that is used in the discussion and examples that follow. The LPG 1302 shown in FIG. 13 includes a single node 1304 with label ORGANIZATION that represents the Acme organization. This node includes a single property: name/Acme. Node 1304 is connected to two nodes 1306 and 1308 with labels FACILITY that represent two different facilities within the Acme organization. The connections are relationships 1310 and 1312 with type Includes. Node 1306 includes two properties: name-East Center and location/NYC. Node 1308 includes two properties: name/West Center and location/LA. Each of nodes 1306 and 1308 are connected with multiple nodes, such as node 1314, by relationships, such as relationship 1316, of type Employs. The multiple nodes, including node 1314, have labels Employee. These nodes 1314 and 1318-1323 each have three properties, such as properties 1324 contained in node 1314, with keys: name, sales, and returns. The value of a property with key name is a character string that includes the first and last name of the employee represented by the node that includes the property. The value of a property with key sales is a list of the yearly sales totals for the employee represented by the node that includes the property. The first number, or entry, in the list represents the total sales, in dollars, for the current year, and additional entries in the list represent the total sales, in dollars, for preceding years. The value of a property with key returns is a list of the yearly total returns, in dollars, for the employee represented by the node that includes the property, with the first entry in the list representing the total returns for the current year and the remaining entries representing the terms for preceding years. Nodes 1314 and 1320 represent sales managers for each of the facilities, and are connected to the remaining employees at the facility by relationships of type Manages, such as relationship 1326 that connects the sales manager represented by node 1314 to the employee represented by node 1319. The dashed-line representations of node 1323 and relationships 1328 and 1330 are used to indicate that this node is not initially present in the LPG but is later added, using a CREATE operation, discussed below.

Figure 14A:
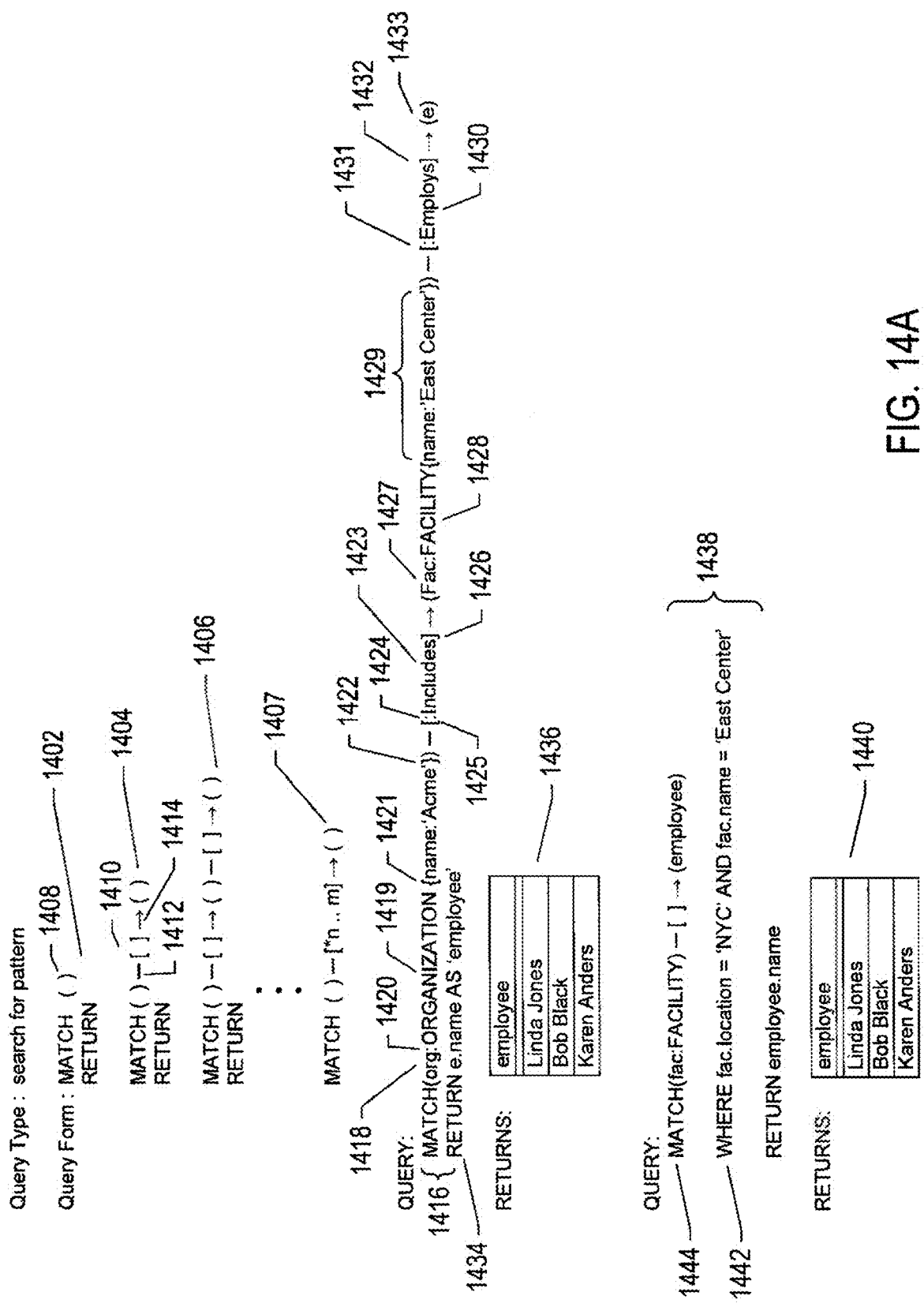

FIGS. 14A-B illustrate a number of example queries that, when executed, retrieve data from the example graph database discussed with reference to FIG. 13 and that add data to the example graph database. A first type of query illustrated in FIGS. 14A-B is a search of the graph database for a particular pattern, where the term "pattern" refers to a specification of one or more paths in the graph database. A path consists of a single node, two nodes connected by a single relationship, three nodes connected by two relationships, or longer paths of relationship-connected nodes. The search is specified by a clause beginning with the operation MATCH followed by a pattern specifying a type of path. All distinct paths in the graph database corresponding to the pattern are found in the search and are returned by a RETURN operation following the MATCH clause. Some example forms 1402-1407 of search queries are shown in the upper portion of FIG. 14A. Form 1402 is a search for one or more single nodes. A pair of complementary parentheses 1408 represents a node in a pattern. The parentheses may enclose additional information specifying constraints on the nodes in the paths that are searched for. Form 1404 specifies a search for paths comprising two nodes connected by a single relationship. The complementary brackets 1410 preceded by a hyphen 1412 and followed by a hyphen and an angle bracket that together comprise an arrow 1414 represent a relationship directed to the right. When the direction of a relationship is not important, the hyphen/angle-bracket combination can be replaced by a hyphen, with the result that the pattern matches two nodes connected in either direction by a relationship. Additional information may be included within the complementary brackets to specify constraints on the relationship in the paths that are searched for. Form 1406 specifies a search for three nodes connected by two relationships. Form 1407 specifies a search for two nodes connected by between n and m relationships and n-1 to m-1 interleaving nodes.

Next, a few example search queries are illustrated in FIGS. 14A-B. The first example query 1416 attempts to find the names of all of the employees at the East Center facility of the Acme organization. This query is of the form 1406 discussed above. The first node in the query pattern includes a query variable org 1418 to which the query successively binds the first node of the paths in the graph database during the search. The term "ORGANIZATION" 1419 following colon 1420 indicates that the first node of a matching path should contain the label ORGANIZATION, and the property within curly brackets 1421 and 1422 specify that the first node of a matching path must have the property and property value name/Acme. The term "Includes" 1423 following colon 1424 in the complementary brackets 1425 and 1426 specify that the first relationship in a matching path should have the type Includes. The second node in the query pattern includes a query variable fac 1427, and specifications of a label FACILITY 1428 and a property and property value name/East Center 1429 that the second node in a matching path must include the term "Employs" 1430 in the pair of brackets 1431-1432 indicates that the second relationship in a matching path needs to have the type Employee. The "e" 1433 in the parentheses indicating the final node of the pattern is yet another query variable. There are no constraints on the final node. The RETURN statement 1434 specifies that the value of the name property of the final node in each matching path should be returned under the heading "employee." Execution of this query by the example graph-database-management system returns the tabular results 1436. As expected, these results are the names of all the employees working in the East Center facility of the Acme corporation. The query found three matching paths in the graph database, each path beginning with node 1304, including node 1306 as the middle node of the path, and including one of the three nodes 1314 and 1318-1319 as the final node in the path.

A second example query 1438 is shown in the lower portion of FIG. 14A. This query returns the same results 1440 returned by query 1416, discussed above. However, the query has the form 1404 and uses constraints specified in a WHERE clause 1442 rather than including those constraints in the pattern specified in the MATCH clause 1444. Turning to FIG. 14B, yet a third different query 1446 also returns the same results 1448 returned by query 1438 and query 1416, discussed above. This query employs a WITH clause 1450 which acts as a pipe in a script command to funnel the results produced by a preceding clause as input to a following clause.

The lower portion of FIG. 14B shows an example query that adds a new node to the graph database. The form of the query 1452 is first illustrated. It includes an initial CREATE clause to create the new node, then a MATCH clause to set query variables to the new node and a node to connect the new node to, and, finally, a second CREATE clause to create the relationship between the new node and the node to which it is connected. Query 1454 is shown at the bottom of FIG. 14B. This query adds node 1323 to the graph database shown in FIG. 13. In the first CREATE clause 1456, the new node is created. A query variable n 1458 is bound to this new node in the first CREATE clause. Next, in a MATCH clause 1460, query variables fac and m are set to nodes 1308 and 1320 in FIG. 13, respectively. In a second CREATE clause 1462, relationship 1328 is created and, in a third CREATE clause 1464, relationship 1330 is created.

FIG. 15 illustrates a query used to determine the current sales totals, and the average of the sales for previous years, for all the employees of the Acme corporation. The query 1502 includes a MATCH clause 1504 that finds all paths in the graph database leading to the different employees of the Acme corporation. The UNWIND clause 1506 turns the list value of the sales property of the employee nodes in the paths identified by the MATCH clause into a set of values bound to the query variable yearly. The WITH clause 1508 funnels the results from the MATCH and UNWIND clauses, computing averages of the sets of values bound to the query variable yearly, into the RETURN clause 1510, which returns the employee names, current sales totals, and average sales totals for previous years, with the return value triplets ordered by the current sales totals by the final ORDER BY clause 1512. The tabular results 1514 show the current sales and average sales for previous years for each of the employees.

Metric Databases

Figure 16:
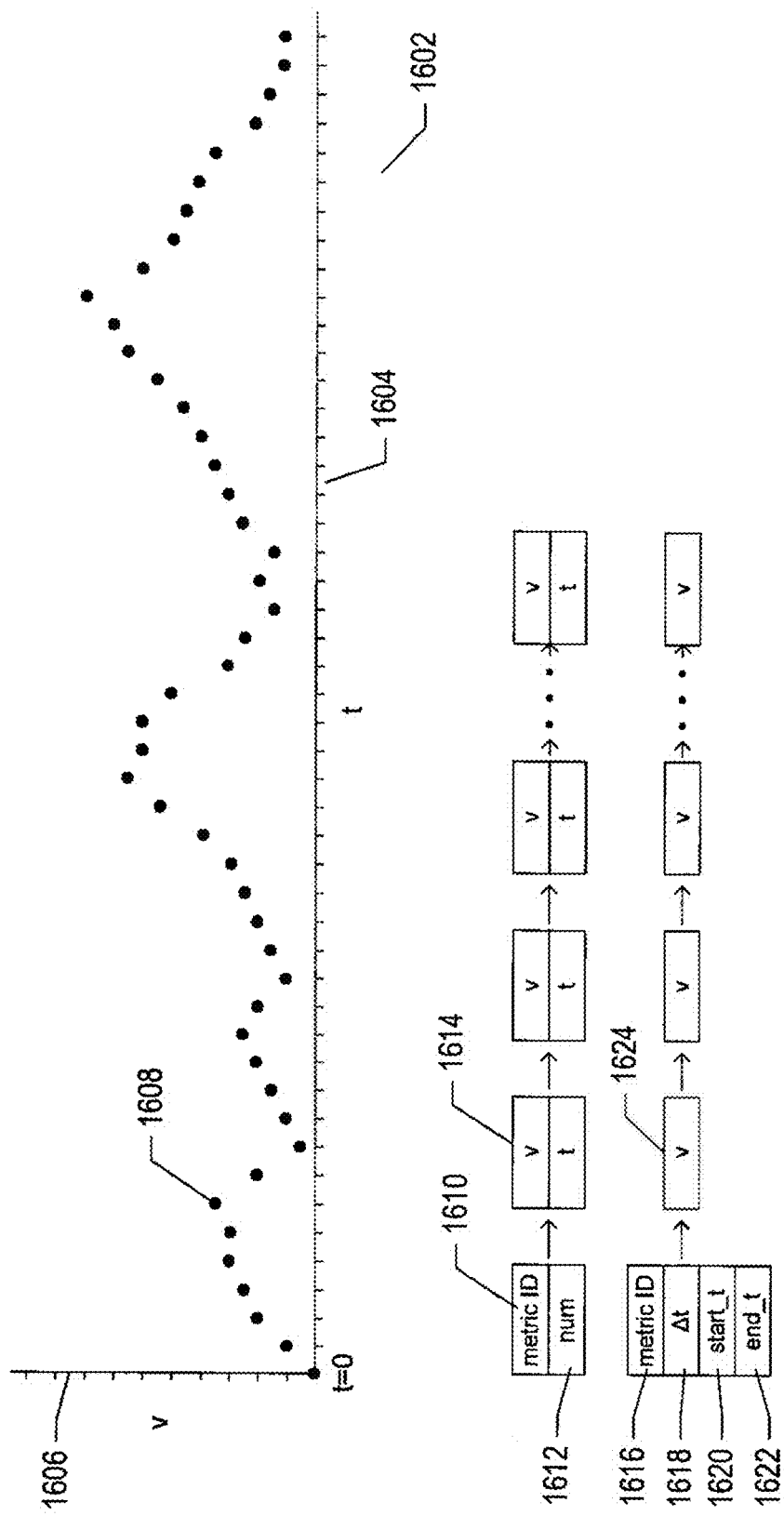
FIG. 16 illustrates a metric-data timeseries and two possible computational representations of the metric-data timeseries.

FIG. 16 illustrates a metric-data timeseries and two possible computational representations of the metric-data time-series. A plot of a portion of a metric-data timeseries 1602 is shown at the top of FIG. 16. The horizontal axis 1604 represents time and the vertical axis 1606 represents numerical metric values. In general, metric values are integers or floating-point numbers. Each data point in the plot, such as data point 1608, represents an observation of a particular metric value at a particular point in time. Metric-data timeseries are generated by many different components within a distributed computer system and used for monitoring and understanding the operational behaviors of the components as well as for detecting and diagnosing various problems and undesirable component states. The metric-data timeseries may be computationally represented as a metric-data-timeseries identifier 1610 and an indication of the number of data points 1612 along with an ordered sequence of value/timestamp pairs, such as value/timestamp pair 1614, that each represents a data point. Alternatively, a metric-data timeseries can be represented by a metric-data-timeseries identifier 1616, a fixed time interval $\Delta t$ 1618, a starting time 1620, an ending time 1622, and an ordered series of values, such as value 1624, that represent the metric values associated with each of the data points of the time series. There are, of course, many alternative representations. Such representations can be efficiently stored in arrays, in many implementations.

Figure 17:
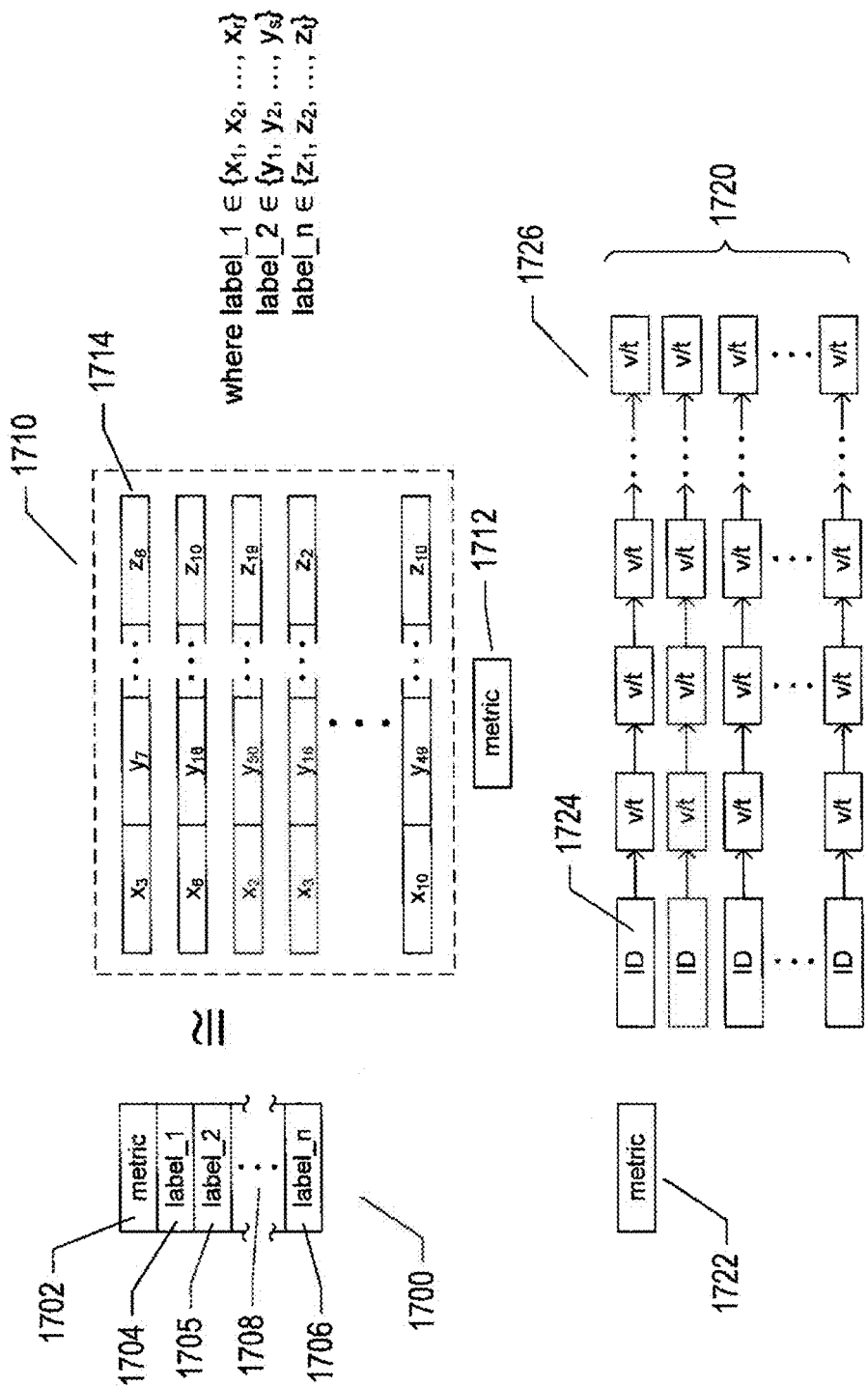
FIG. 17 illustrates a data-storage model used in one example of a metric-data collection-and-storage system.

FIG. 17 illustrates a data-storage model used in one example of a metric-data collection-and-storage system. The system is referred to as a "metrics database" in this document. The metrics database stores metric-data timeseries, all corresponding to a particular metric, in a metric data structure. Each metric-data timeseries is represented by a descriptor 1700 that includes the name of the metric 1702 to which the metric-data timeseries correspond along with a vector of 0, 1, or more label values 1704-1706, where ellipsis 1708 indicates the possibility for additional labels. When there is only a single metric-data timeseries for a particular metric, then no labels are needed. One or more labels are used, in addition to the metric name, in order to provide unique identifiers for multiple metric-data timeseries associated with the metric name. For example, a common metric for components of a distributed computer system is CPU_usage. There may be a CPU_usage metric-data timeseries for each virtual machine and each process running within each virtual machine. In order to uniquely identify all of these different metric-data timeseries, two labels may be used. The first label may correspond to virtual machines, with each label value associated with the first label corresponding to an identifier of a particular virtual machine, and the second label may correspond to processes, with each label value associated with the second label corresponding to a particular process identifier. The CPU_usage metric-data timeseries for each virtual machine can be identified by a particular first label value, with no label value indicated for the second label value, and the CPU_usage metric-data timeseries for each process can be identified by a particular first label value for the virtual machine containing the process and particular second label value corresponding to the identifier of the process. Thus, the descriptor 1700, in this example, represents all of the CPU_usage metric-data timeseries for all of the virtual machines and for all of the processes within all of the virtual machines. The descriptor is equivalent to a set of identifiers 1710 for all of the metric-data timeseries corresponding to a particular metric 1712, with each identifier, such as identifier 1714 in the set of identifiers 1710, comprising a unique set of label values for each of the labels in the descriptor, which may include an empty label value for one or more labels. The metrics database generally stores a set of metric-data timeseries 1720 for each different metric 1722, with each metric-data timeseries associated with a unique identifier, such as identifier 1724 for metric-data timeseries 1726.

Figure 18:
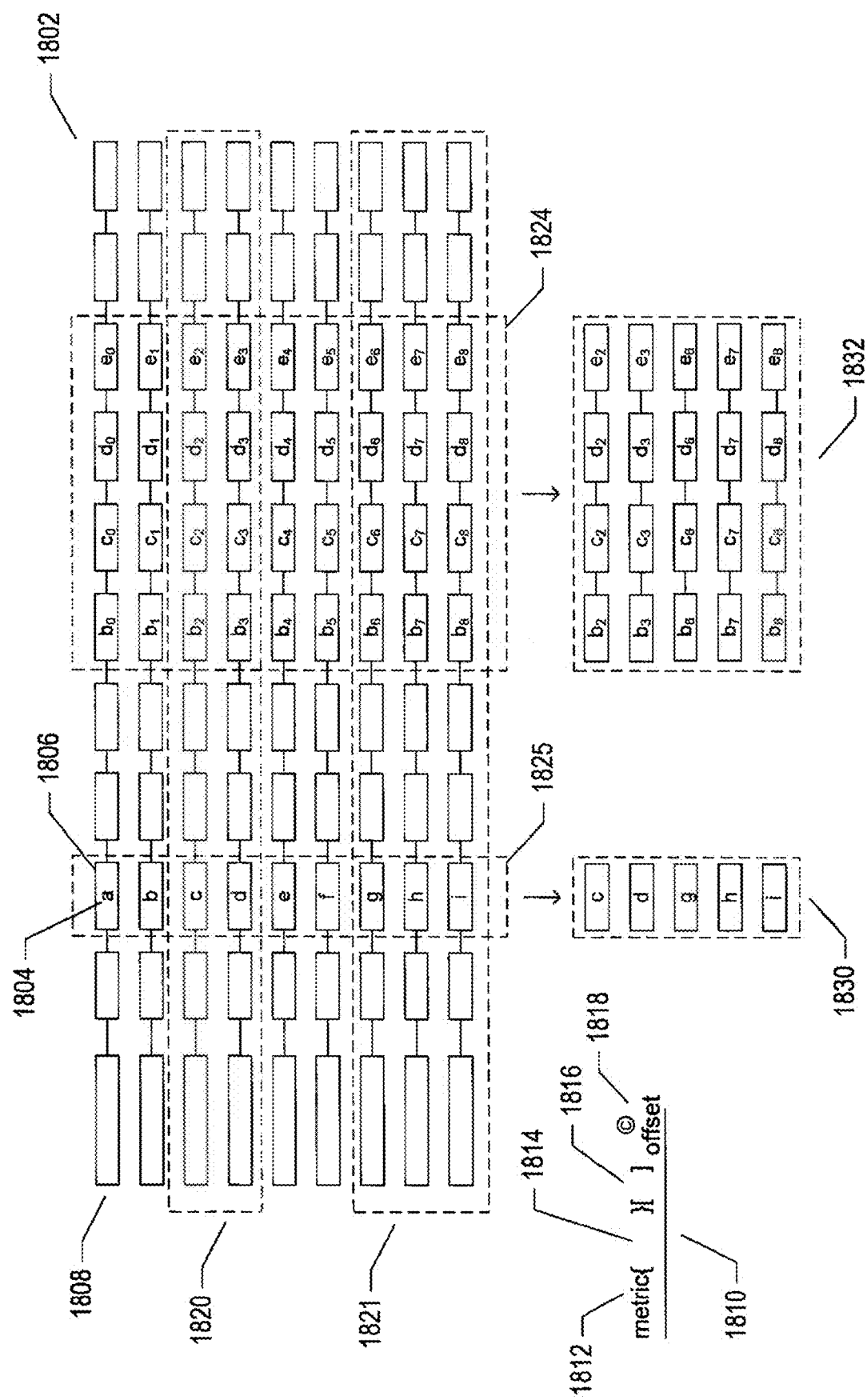
FIG. 18 illustrates certain query operations provided by a metrics database.

FIG. 18 illustrates certain query operations provided by a metrics database. At the top of FIG. 18, a set of metric-data timeseries 1802 are shown using the illustration conventions used in FIG. 17. Symbols are shown to represent metric values in certain of the value/timestamp representations of data points within the metric-data timeseries, such as the symbol "a" 1804 in the value/timestamp representation 1806 of the second data point in metric-data timeseries 1808. A query template 1810 is shown in the lower left-hand portion of FIG. 18. A query includes the name of a metric 1812, a matching pair of curly brackets that contain label/label-value pairs to select particular metric-data timeseries from the set of metric-data timeseries associated with the metric, a matching pair of brackets 1816 that can include an indication of a time span or time interval, used to select multi-time-point portions of metric-data timeseries, and two different time point selectors 1818, one of which can be used to a position a window of selected set of metric-data timeseries data points along the time axis. The type of query represented by the query template 1810 can be used to arbitrarily select data points from the set of metric-data timeseries associated with a metric or, more exactly, associated with a metric name. Thus, as shown in FIG. 18 by dashed rectangles, label/label-value pairs can be included within the curly brackets 1814 to select a subset 1820-1821 of the metric-data timeseries associated with the metric. An offset can be specified with respect to the most currently received set of data points for the set of time series in order to set the horizontal positions of selection windows 1824 and 1825 with respect to the time-aligned metric-data timeseries associated with the metric. When no matching brackets 1816 are included in the query, the selection window spans a single data point, as is the case for selection window 1825. When a time duration is included within the set of matching brackets 1816, the selection window has a width corresponding to the specified time duration. As shown in the lower portion of FIG. 18, a query specifying the subset of metric-data timeseries 1820 and 1821 and specifying selection window 1825 returns vector 1830 and a query specifying the subset of metric-data timeseries 1820 and 1821 and specifying selection window 1825 returns matrix 1832.

Figure 19:
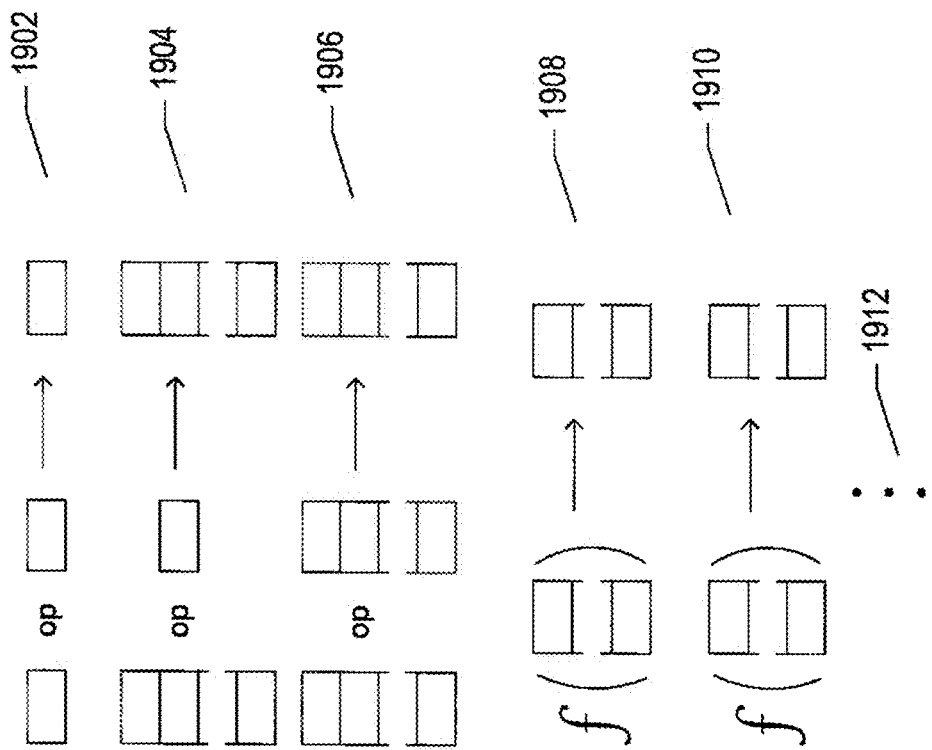
FIG. 19 illustrates various different types of operators and functions that can be included in queries.

FIG. 19 illustrates various different types of operators and functions that can be included in queries. There are binary operators that take, as arguments, two scalars and return a scalar 1902, take a vector or matrix and a scalar as arguments and return a vector or matrix 1904, and that take two vectors or matrices as arguments and returns a result vector or matrix 1906. There are functions that take a vector or matrix as an argument and return a result vector or matrix 1908 and functions that take a vector or matrix as an argument and return a scalar 1910. Ellipsis 1912 indicates that there are many additional types of operators and functions. Functions can be used, for example, to compute a vector of average values for an input matrix of metric-data-timeseries data points, a vector of variances for an input matrix of metric-data-timeseries data points, or a vector of standard deviations for an input matrix of metric-data-timeseries data points. The query language provided by a metrics database can therefore be used to select specific metric-data timeseries or specific sets of metric-data timeseries for display and to compute standard statistical parameters for specific metric-data timeseries or specific sets of metric-data timeseries, in addition to computing values such as current rates of change for timeseries.

Figure 20:
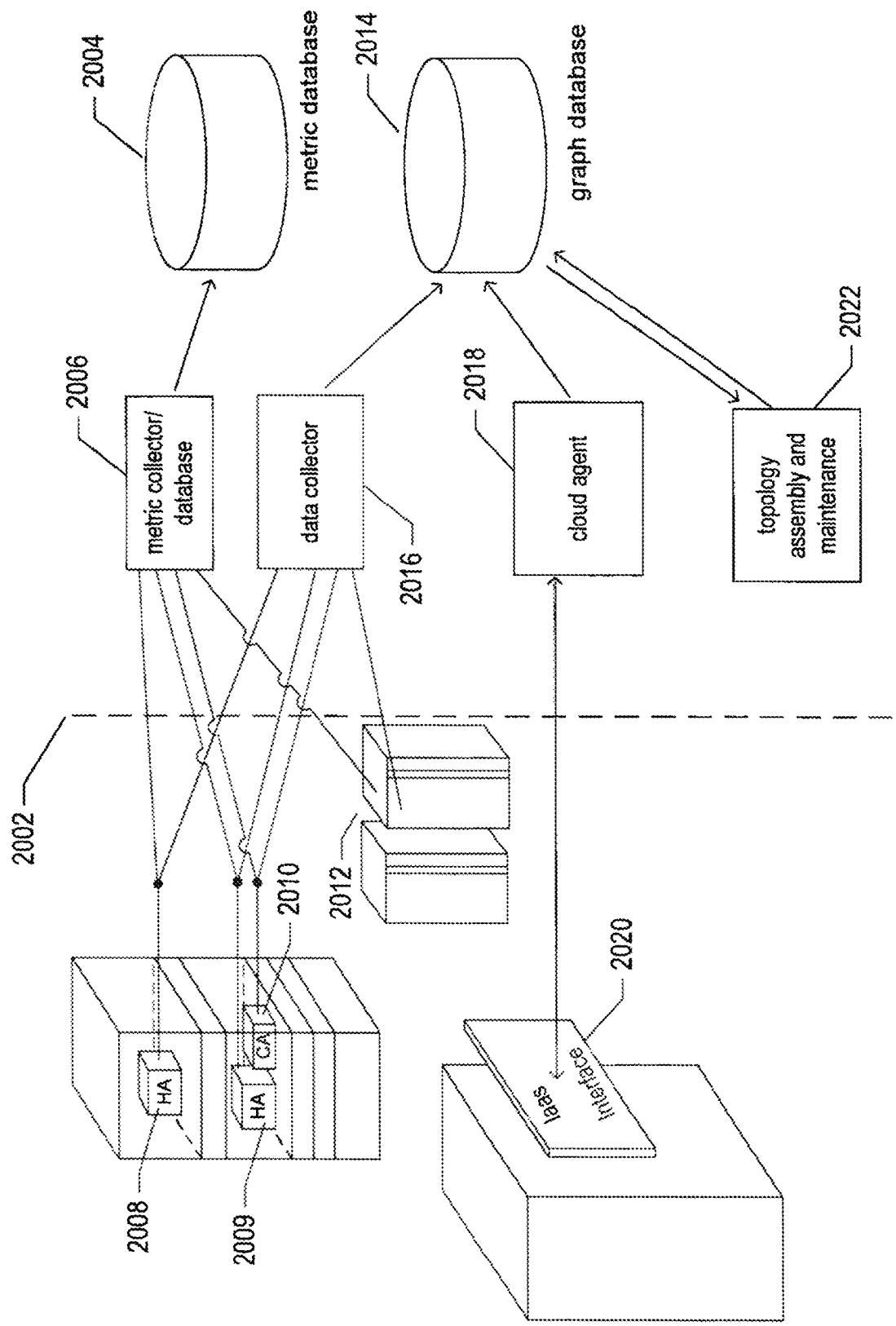
FIG. 20 illustrates data collection by the currently disclosed control-interface system.

Currently Disclosed Comprehensive Control Interface Provided to IaaS Clients FIG. 20 illustrates data collection by the currently disclosed control-interface system. Vertical dashed line 2002 separates the left-hand side of FIG. 20, representing an IaaS system, from the right-hand side of FIG. 20, representing the currently disclosed control-interface system. The control-interface system includes a metric database and a graph database. The metric database includes both data storage 2004 and a metric-collector-and-database controller 2006. The metric collector within the metric-collector-and-database controller continuously and independently scrapes metric data from metric-data sources, in certain implementations, but, in certain implementations, may also receive metric data from host agents and the client agent without specifically requesting the metric data. When an entity, such as the metric collector, requests information from an information source and receives the requested information in a reply message or signal, the entity pulls the information from the information sources. By contrast, when information sources send information to the entity on their own initiative, without having received a specific request for the information, the information sources push the information to the entity. In many implementations of the currently disclosed control-interface system, information is transferred from the IaaS system to the control-interface system by both push and pull operations. The metric sources include the previously discussed host agents 2008-2009 and cloud agent, but may also include client designed agents 2010 that are sources for specific client-determined metrics, and metric data exposed by third-party services 2012. The graph database 2014 stores information collected by a data collector 2016 that periodically pulls information from host agents, client agents, and third-party data sources, receives pushed information from host and client agents as well as other entities, and stores the information in graphs maintained within the graph database. The stored graphs include graph-based representations of leased components within IaaS systems, but such graph-based representations often include additional types of nodes and relationships. A cloud agent 2018 accesses information via an IaaS-client interface 2020. A topology-assembly-and-maintenance component 2022 monitors information stored within the graph database by the data collector and cloud agent and assembles the information into meaningful hierarchical graphs and networks, as discussed further below. In general, the hierarchical graphs and networks represent various different types of client infrastructure components and computational entities within the IaaS.

Figure 21:
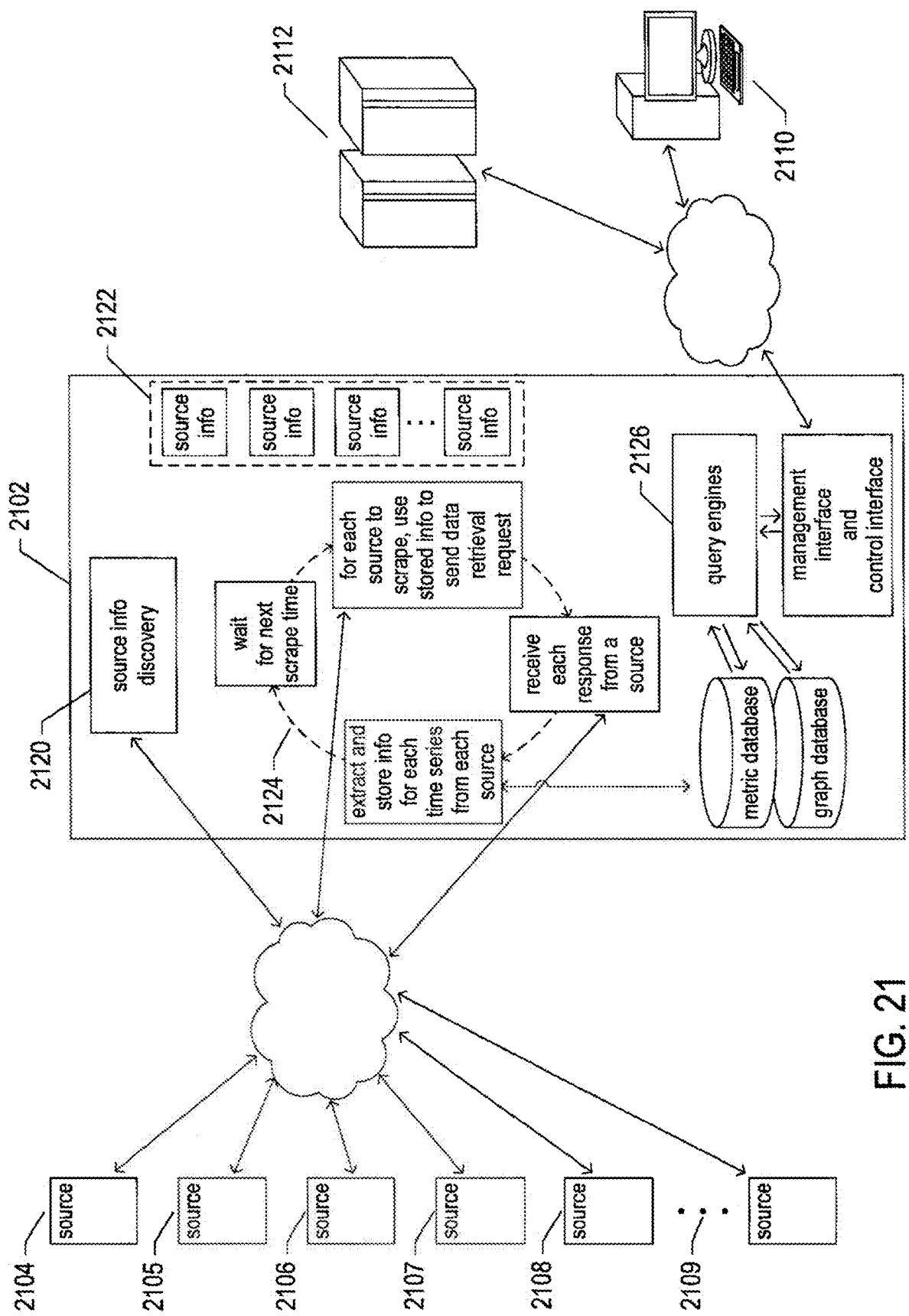
FIG. 21 provides an overview of the currently disclosed control-interface system.

FIG. 21 provides an overview of the currently disclosed control-interface system. The control-interface system 2102 carries out bi-directional communications with information sources and action targets 2104-2109 within an IaaS system. The control-interface system 2102 additionally carries out bi-directional communications with an IaaS-client manager's or administrator's computer 2110 and/or an IaaS-client distributed application 2112. The control-interface system 2102 includes a source-discovery module 2120 that automatically identifies client infrastructure components using client-infrastructure-configuration information obtained through an IaaS-client interface, deploys host agents, and stores source information 2122 for access by the metric collector (2006 in FIG. 20) and data collector (2016 in FIG. 20). As discussed above, the metric collector independently scrapes metric data from metric-data sources according to one or more specified scraping intervals and also receives metric data pushed from metric-data sources. The data collector independently harvests information from host agents, client agents, and third-party services at fixed intervals, generally larger than the scraping intervals used by the metric collector. Continuous loop 2124 is shown for the metric-data collector, and a similar continuous loop, not shown in FIG. 20, would represent the data collector. The stored data is accessed by query engines 2126 in order to present both a management interface and a control interface to the IaaS client. The management interface provides for client registration, configuration of the control interface, and other management functions and features. The control interface is discussed further, below. The phrase "control interface" means a user interface that displays information to the client as well as control features, using which the client is able to control configuration and operation of the client's distributed applications and other computational entities running within the IaaS system in leased execution environments and employing leased computational resources. In certain implementations, additional data storage and an additional query engine may be provided by a relational database.

Figure 22:
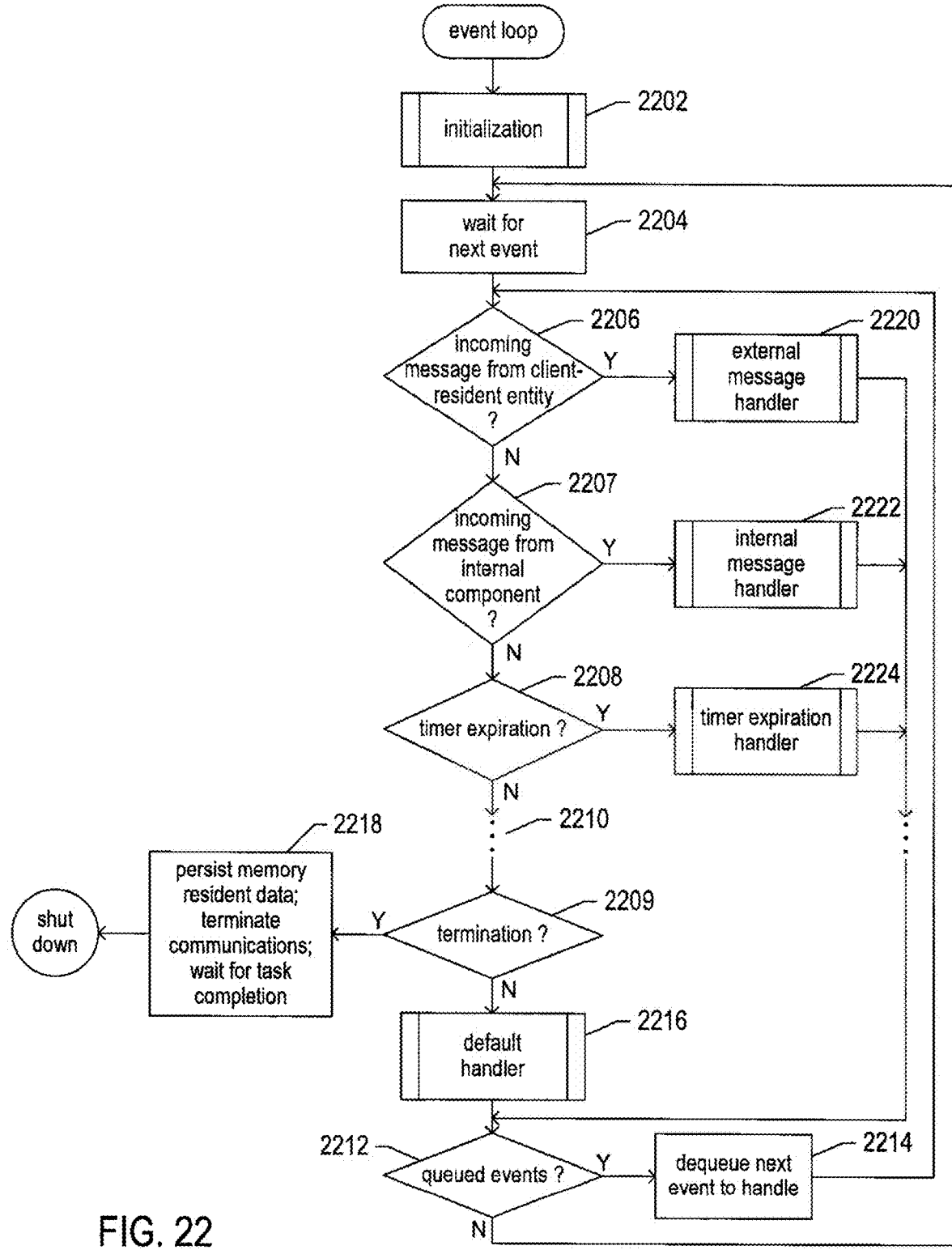
FIG. 22 illustrates a basis for implementation of the various components of the currently disclosed control-interface system.

FIG. 22 illustrates a basis for implementation of the various components of the currently disclosed control-interface system. At a fundamental level, these components are based on an event loop in which the component waits for the occurrence of component-related events and then calls an appropriate handler to respond to each of the events. In an initial step 2202, the component calls an initialization routine to initialize data structures, network connections, and other entities and resources used during operation of the component. In step 2204, the component waits for the occurrence of a next event. Upon occurrence of a next event, the component determines the type of event, in a series of conditional tests 2206-2209, with ellipsis 2210 indicating that many additional types of events are generally handled. A handler corresponding to the determined type of event is called, after which, in step 2212, the component determines whether or not there are additional events queued for handling. When so, a next event is dequeued, in step 2214, and control returns to step 2206, where the component determines the type of event and calls an appropriate handler. Otherwise, control returns to step 2204, where the component waits for the occurrence of a next event. A default handler 2216 is called to handle any rare or unexpected events. Upon the occurrence of a termination event, as determined in step 2209, the component persists memory-resident data, terminates communications connections, and handles other such termination tasks, including waiting for all currently pending task handling to complete, in step 2218. Some of the important types of events that are handled by the component include handling of received messages from external entities 2220, such as messages received from host agents by the data collector, handling messages received from internal control-interface-system components 2222, and handling of timer expirations in step 2224.

Figure 23:
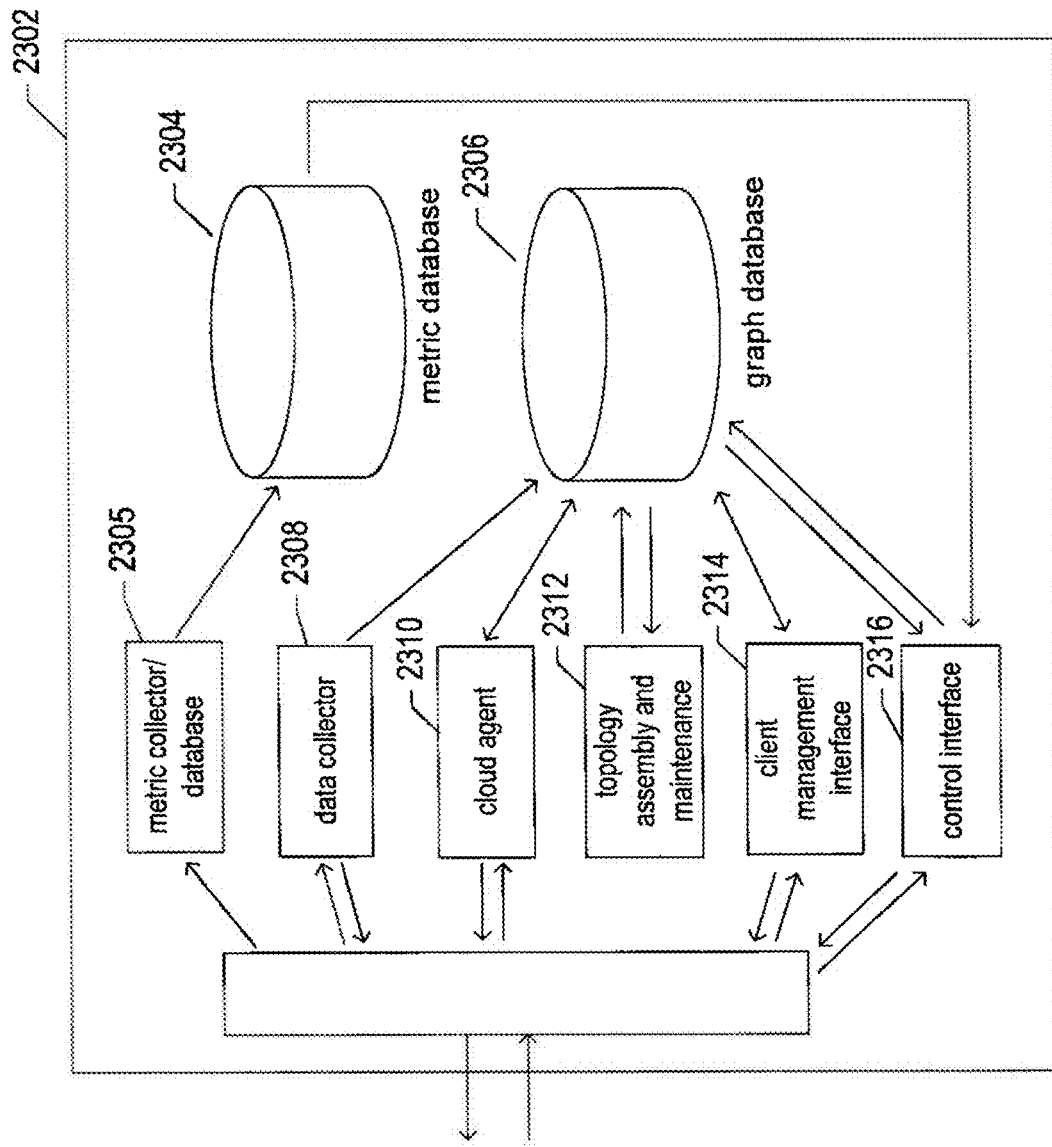
FIG. 23 provides a final overview of the currently disclosed control-interface system.

FIG. 23 provides a final overview of the currently disclosed control-interface system. The control-interface system 2302, as discussed above, includes a metric database 2304-2305 and a graph database 2306. The metric database includes a collector 2305 that scrapes metric data from metric-data sources in the IaaS system and from other third-party entities used by a client for running the client's distributed applications. The graph database 2306 stores various types of information related to the leased components in the IaaS system and other third-party entities used by the client for running the client's distributed applications, information related to distributed-application components, and other information. In addition, the graph database or another type of database, not shown in FIG. 23, stores client-configuration data that includes authorization information that allows the control-interface system to access client information through an IaaS-client interface, various parameters that control display of information to the client by the control interface, and a variety of other types of management and configuration information. The data collector 2308 receives data from host agents and other sources and stores the received data in the graph database for periodic update of graph-based representation of the client's execution environment and distributed-application state. The cloud agent 2310 collects information for storage in the graph database through the IaaS-client interface provided by the IaaS system. The topology-assembly-and-maintenance component 2312 monitors information stored in the graph database in order to maintain a logically complete graph-based representation of the client's leased infrastructure and distributed applications. This involves creating and storing relationships between nodes, updating properties and labels of nodes and relationships, deleting stale nodes and relationships, and other such tasks involved in maintaining an updated graph-based representation that accurately reflects the current state of the client's leased infrastructure and distributed applications. The client-management-interface component 2314 provides a management interface to the client that allows a client to register with the control-interface system, provide authorization credentials and other information needed by the control-interface system, to specify various configuration parameters to manage display of information through the control interface, and other such management tasks. Finally, the control-interface controller 2316 provides a control interface to the client that allows a client to monitor and understand the client's infrastructure and distributed applications, the operational states of the infrastructure and distributed applications, and other information needed by the client to manage and optimize the distributed applications. In addition, the control interface provides control features that allow the client to direct various types of control actions to relevant infrastructure components and the distributed applications. It is thus both an information-displaying user interface as well as a control user interface.

The control-interface system is, in the described implementation, implemented as a set of distributed applications, services, and other executables running within a data center or cloud-computing facility. In certain implementations, the components of a discrete control-interface system are instantiated in virtual machines and other execution environments for each different client organization, so that each client organization is provided a control interface through a discrete and separate logical control-interface system. In other implementations, components of the control-interface system are shared among different client organizations. In all implementations, the security measures are incorporated into the control-interface system or systems to ensure that a client organization is unable to access another client organization's data and that a client organization is unable to issue control actions to infrastructure components that would deleteriously affect the operational states of another client organization's infrastructure. In addition, the control interface displayed to various different users within a client organization may differ according to access and authorization permissions granted by the client organization to individual users or groups of users. For example, a higher-level manager or administrator within a client organization may access a larger and more comprehensive set of control actions then can be accessed by lower-level developers and users. A control-interface system may, in certain implementations, provide a unified control interface for leased infrastructure and distributed applications in multiple different IaaS systems.

Figure 24:
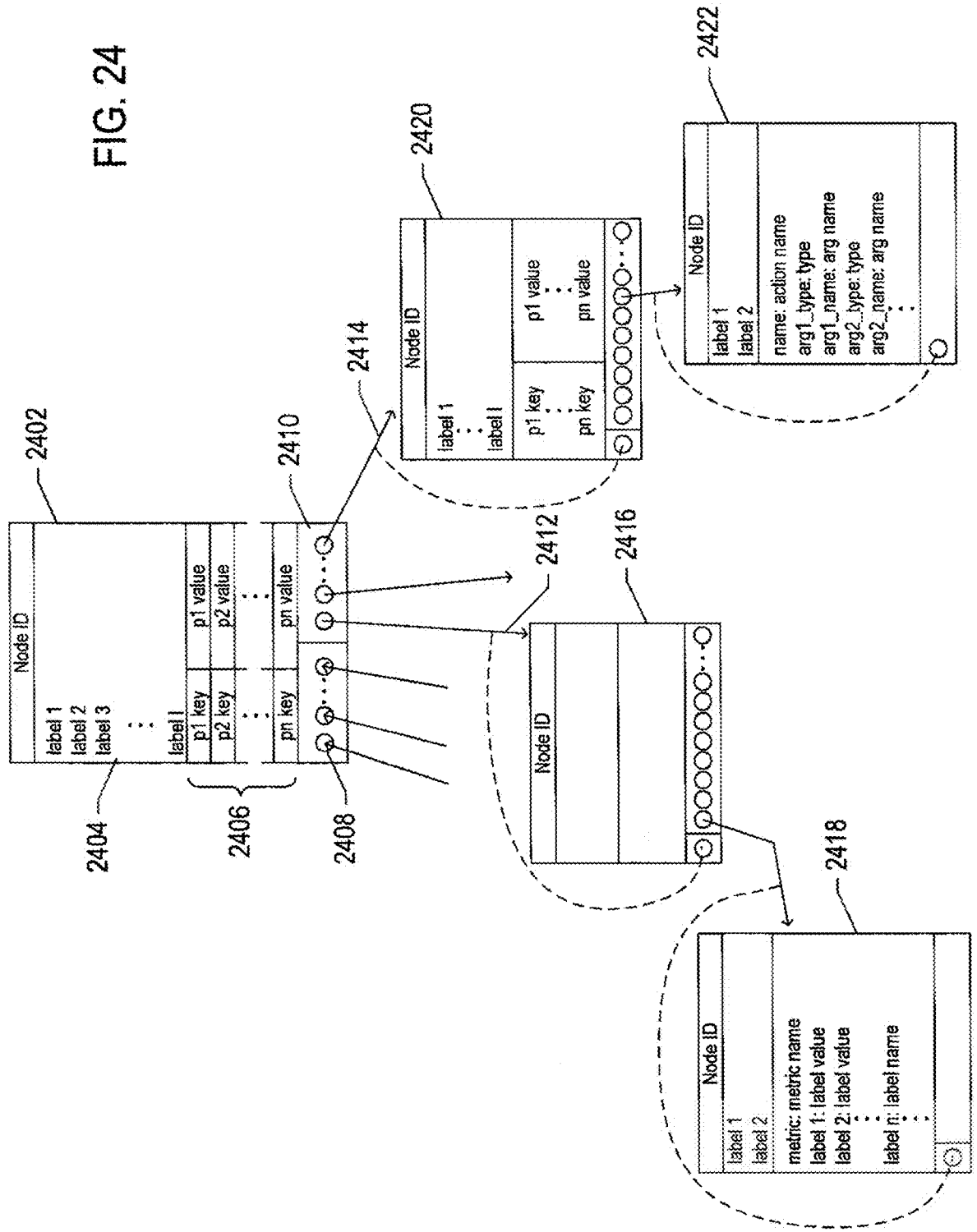
FIG. 24 illustrates a fundamental feature of graph-based representations of infrastructure and distributed-application components used by the currently disclosed control interface.

FIG. 24 illustrates a fundamental feature of graph-based representations of infrastructure and distributed-application components used by the currently disclosed control interface. Each infrastructure and distributed-application component, including external services accessed by a distributed application, is represented by a node 2402. As discussed above, a node typically includes multiple labels 2404, multiple key/value-pair properties 2406, incoming links or relationships 2408, and outgoing links or relationships 2410. In general, each component-representing node includes an outgoing link, or relationship 2412 to a set of metrics associated with the component and an outgoing link, or relationship, 2414 to a set of actions that can be applied or directed to the component through the control interface. In one implementation, the set of metrics is represented by an aggregation node 2416 with links to a set of child nodes that each represents a different metric 2418. Similarly, the actions are represented by an aggregation node 2420 that includes multiple links to action-representing nodes that each represents an action that can be applied or directed to the component 2422. A node representing a metric, such as node 2418, includes information such as the name of the metric, the type of values included in metric data points, information about the source for the metric, the scraping interval for the metric, and other such information. A node representing an action, such as node 2422, includes information such as the name of the action, the names and types of arguments associated with the action, and other such information. Thus, the graph-based representation of a client's infrastructure and distributed applications includes nodes for each logical component, and each node is hierarchically linked to a set of metrics and a set of actions that can be applied to the node.

Figure 25A:
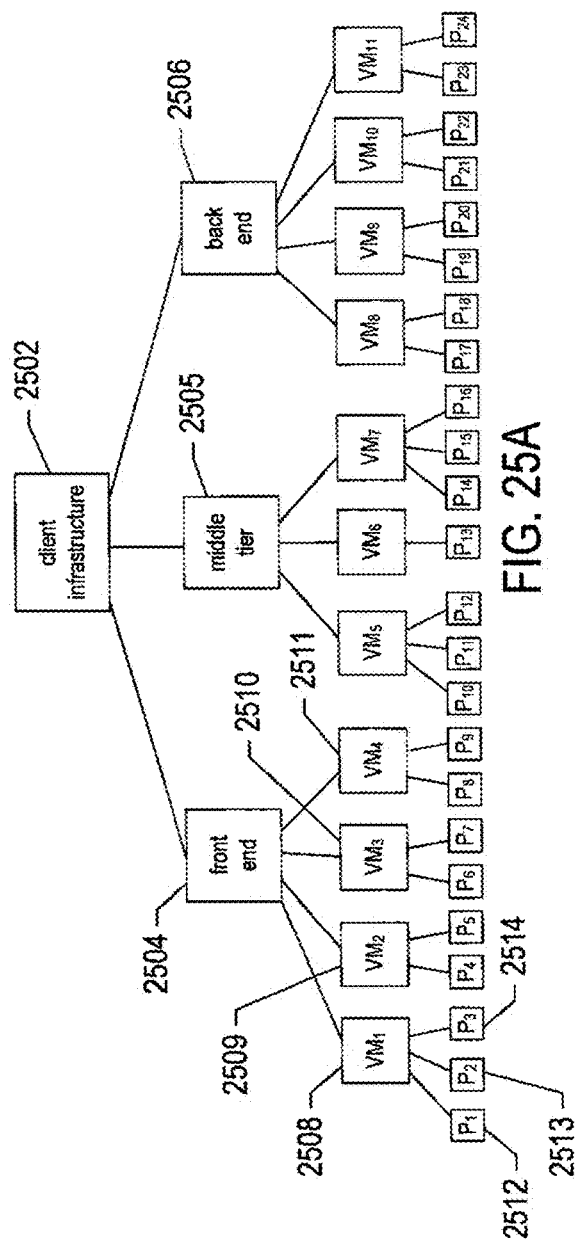
FIGS. 25A-B illustrates simple examples of a graph-based representation of an IaaS client's infrastructure.
Figure 25B:
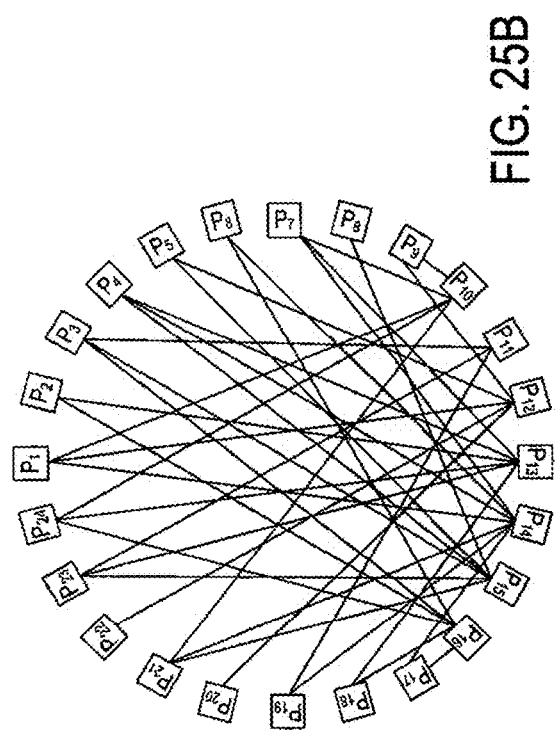

FIGS. 25A-B illustrates simple examples of a graph-based representation of an IaaS client's infrastructure. FIG. 25A shows a hierarchical representation of the client's infrastructure. A root node 2502 represents the entire infrastructure. Three child nodes of the root node 2504-2506 represent three tiers or layers of the implementation of a distributed application. Each tier or layer, in turn, is linked to multiple child nodes representing virtual machines, such as virtual machines 2508-2511 included in the front-end tier or layer 2504. Finally, each virtual machine is linked to multiple child nodes representing processes running within the execution environment provided by the virtual machine, such as processes 2512-2514 running in the execution environment provided by virtual machine 2508. The links or relationships in the graph shown in FIG. 25 represent inclusion. However, there may be many additional types of relationships included in the representation of the infrastructure. The control interface generally displays only small portions of the total representation of infrastructure and only a small subset of the different links or relationships included in the graph-based representation of the infrastructure. This is, of course, a very simple example. In many real-world cases, the graph-based representation may not have a simple topology, but may include many discrete, complex portions that are not necessarily connected by links or relationships to other portion of the graph-based representation. The portions may also not be describable as trees or other simply topological forms, but may instead be complex network like graphs that include both hierarchical and non-hierarchical sub-portions. A client organization may be running multiple distributed applications on hundreds or thousands of virtual machines at a given point in time. Furthermore, there are many additional types of infrastructure components and distributed-application components that a client may choose to monitor through the control interface, as a result of which the infrastructure graph may be far more complex. Nodes, for example, may represent, in addition to virtual machines and containers in IaaS systems, various types of logical entities, aggregations of entities, and logical concepts, such as the three tiers represented by nodes in the current example. Nodes may also represent host agents, the client agent, and other control-interface-system components installed in, or communicating with, the IaaS systems as well as third-party services and third-party-service components. The simple example shown in FIG. 25A provides a useful model for discussing the control interface, below, but is not intended, in any way, to represent the scopes and variety of graph-based representations generated and maintained in the graph database by the control-interface system.

FIG. 25B shows a different visual presentation of a portion of the infrastructure discussed above with reference to FIG. 25A. In the visual presentation shown in FIG. 25B, only process nodes are displayed and the links or relationships represent communications between pairs of processes. The control interface can display any arbitrary selection of nodes, node types, relationships, and relationship types in any of many different possible visual-presentation organizations. The visual presentation of the infrastructure hierarchy in FIG. 25A is treelike, for example, while the visual presentation in FIG. 25B is non-hierarchical and circular. As can be seen in FIG. 25B, front-end processes communicate with middle-tier processes and middle-tier processes communicate with backend processes, but front-end processes and backend processes do not directly communicate with one another. Of course, the graph-based representation of the infrastructure underlying the various different visual presentations includes, as discussed above with reference to FIG. 24, action sets and metric sets for each of the components represented by nodes.

The remaining discussion of the currently disclosed control-interface system and control interface, in this document, focuses on the control interface and process-automation features included in the control interface. This discussion uses the infrastructure hierarchy shown in FIG. 25A as an example.

Figure 26:
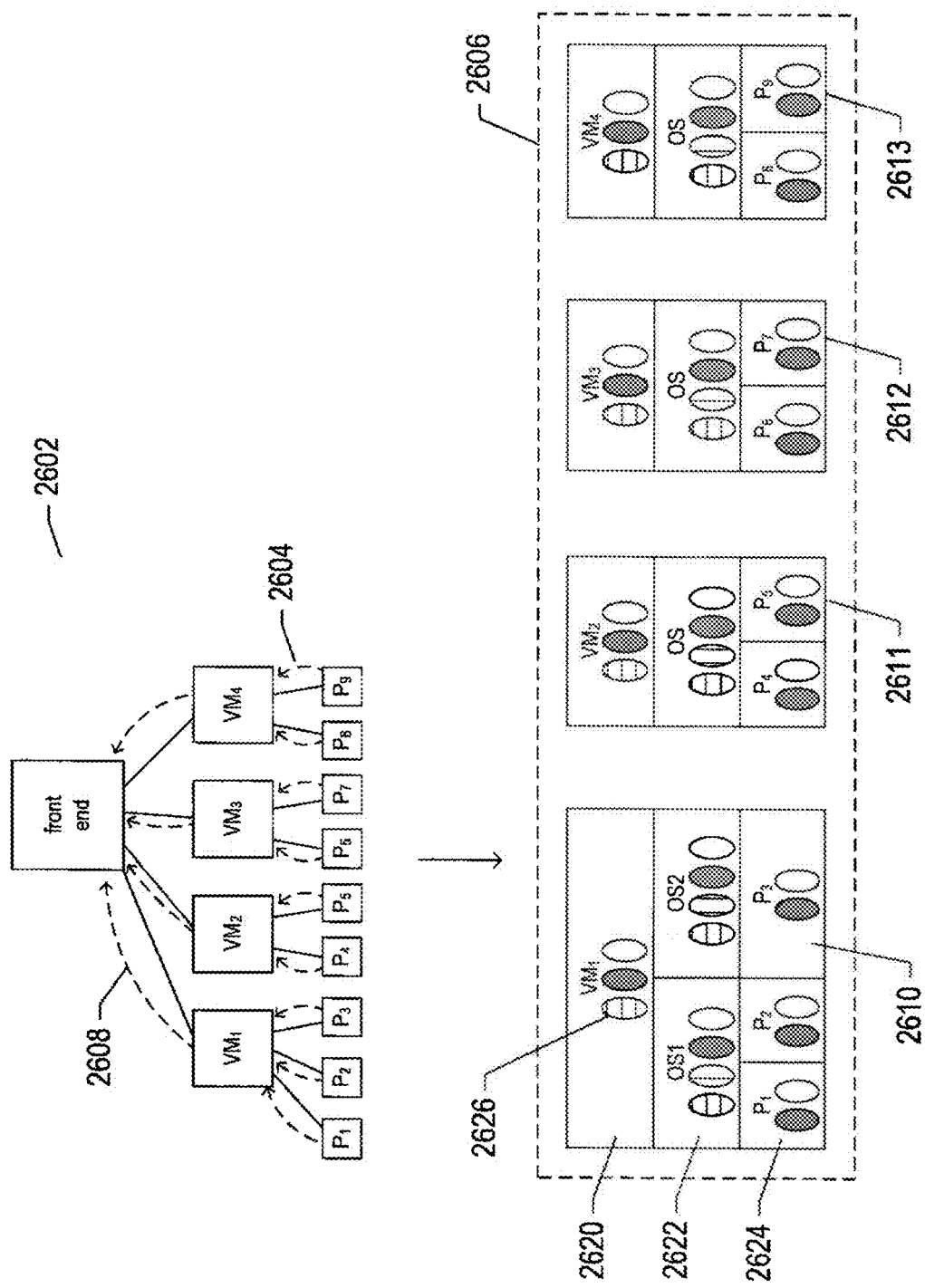
FIG. 26 illustrates a display convention used in the following discussion of the control interface.

FIG. 26 illustrates a display convention used in the following discussion of the control interface. The control interface is configured to display icons corresponding to virtual machines in three different levels corresponding to the three different tiers 2504-2506 of the infrastructure. The portion of the displayed hierarchy corresponding to the front-end tier 2602 is shown at the top of FIG. 26. In the display convention used by the control interface in following examples, the processes executing in the execution environment provided by each virtual machine are essentially folded up into the representation of the virtual machine, as indicated by dashed arrows, such as dashed arrow 2604. Similarly, the virtual machines within the front-end tier are folded up into a representation of the front-end tier 2606, as represented by dashed arrows, such as dashed arrow 2608. The visual representation of the front-end tier 2606 includes icons representing the four virtual machines 2610-2613. Icon 2610 includes a first layer 2620 representing the virtual machine, a second layer 2622 representing the guest operating systems currently supported by the virtual machine, and a third layer 2624 representing processes running in the execution environment provided by each guest operating system. In this example, a virtual machine may include multiple component virtual sub-machines, each with a different guest operating system. This is a different type of virtualization than normally encountered, but is used as an example of nested components in a hierarchy for the current discussion. Normally, a virtual machine includes a single guest operating system, but the virtual machines discussed in this example can be thought of more as virtual servers, perhaps. The features shown at each level, such as feature 2626, are indicators. In the current visualization example, each indicator represents a metric associated with the object represented by the level. The metric represented by indicator 2626, for example, may be a CPU-usage metric indicating the number of instructions/second executed by the virtual machine or the fraction of the total available CPU bandwidth currently in use by the virtual machine. The guest operating systems and associated virtual sub-machines within virtual machines are also represented by nodes in the graph database, but these nodes are not shown in the visual presentation of FIG. 25A. Of course, there are many different alternative possible visual presentations of the front-end tier and the components associated with the front-end tier. The processes could be shown as separate icons, as in the visual presentation of FIG. 25A, as one example. The currently disclosed control interface supports many possible visual presentations of portions of a graph-like representation of infrastructure and distributed applications, including a standard set of visual presentations as well as visual presentations designed by clients.

Figure 27A:
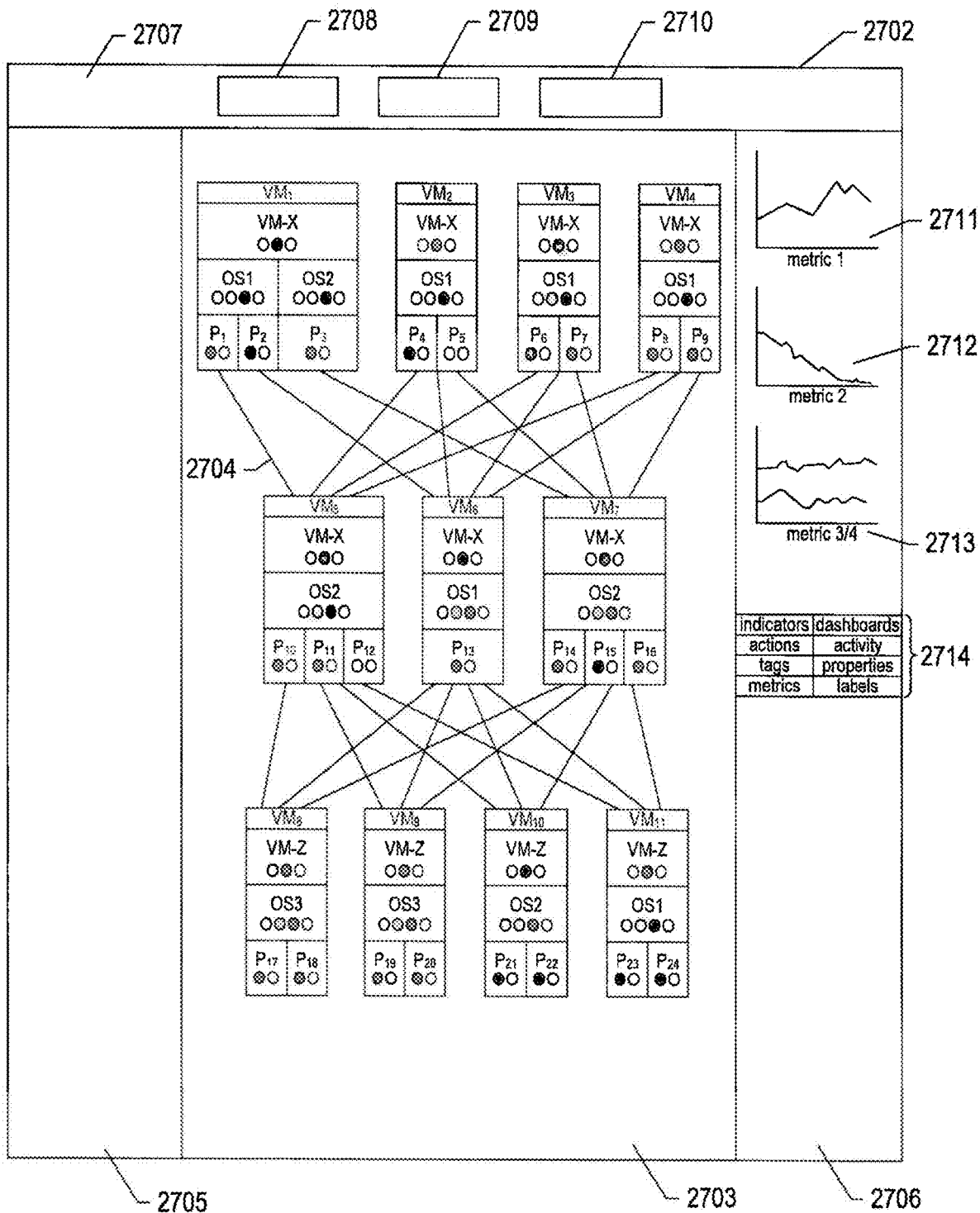
FIGS. 27A-N illustrate features and operations of an example control interface provided to a control-interface-system client.
Figure 27B:
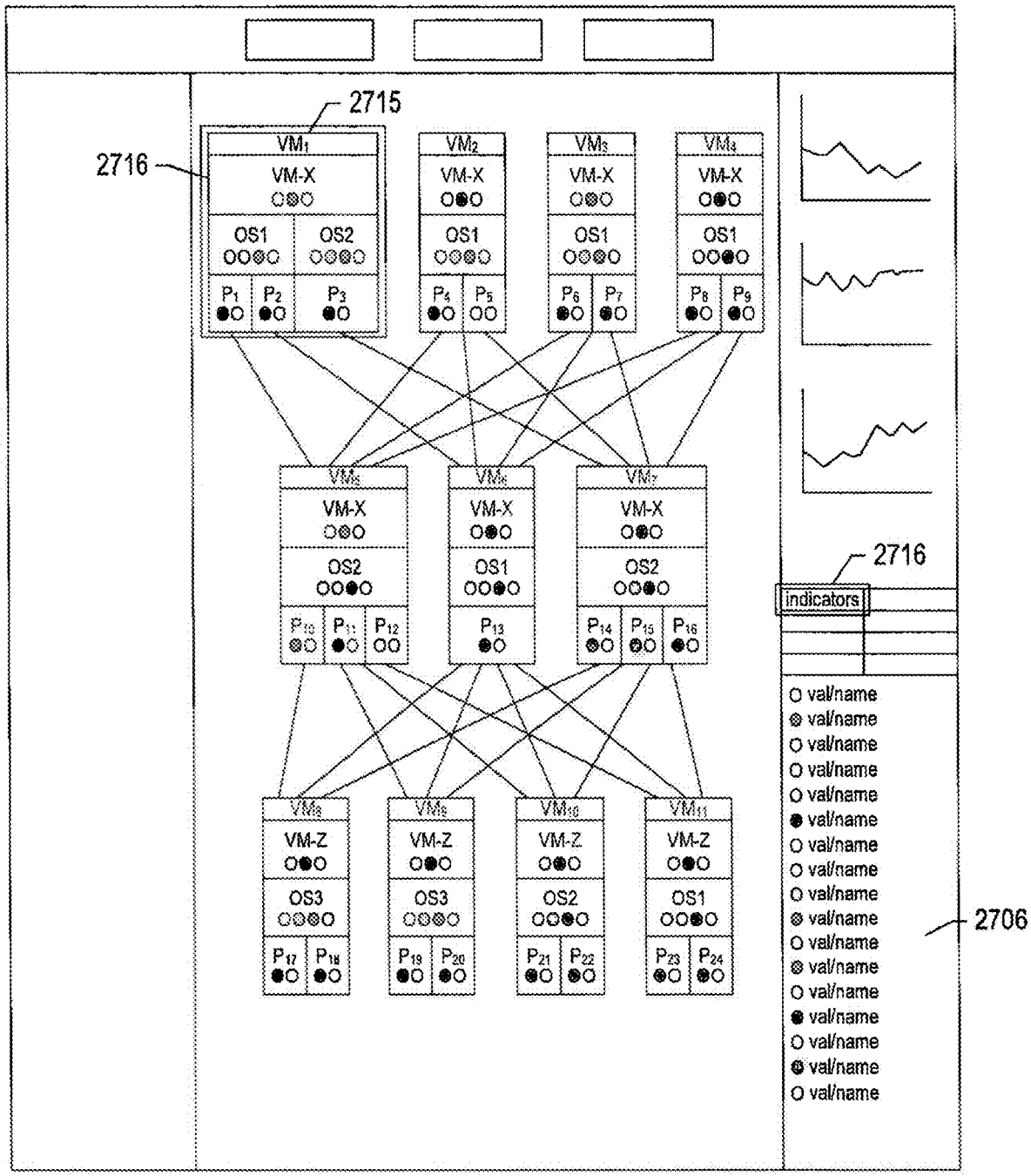
Figure 27C:
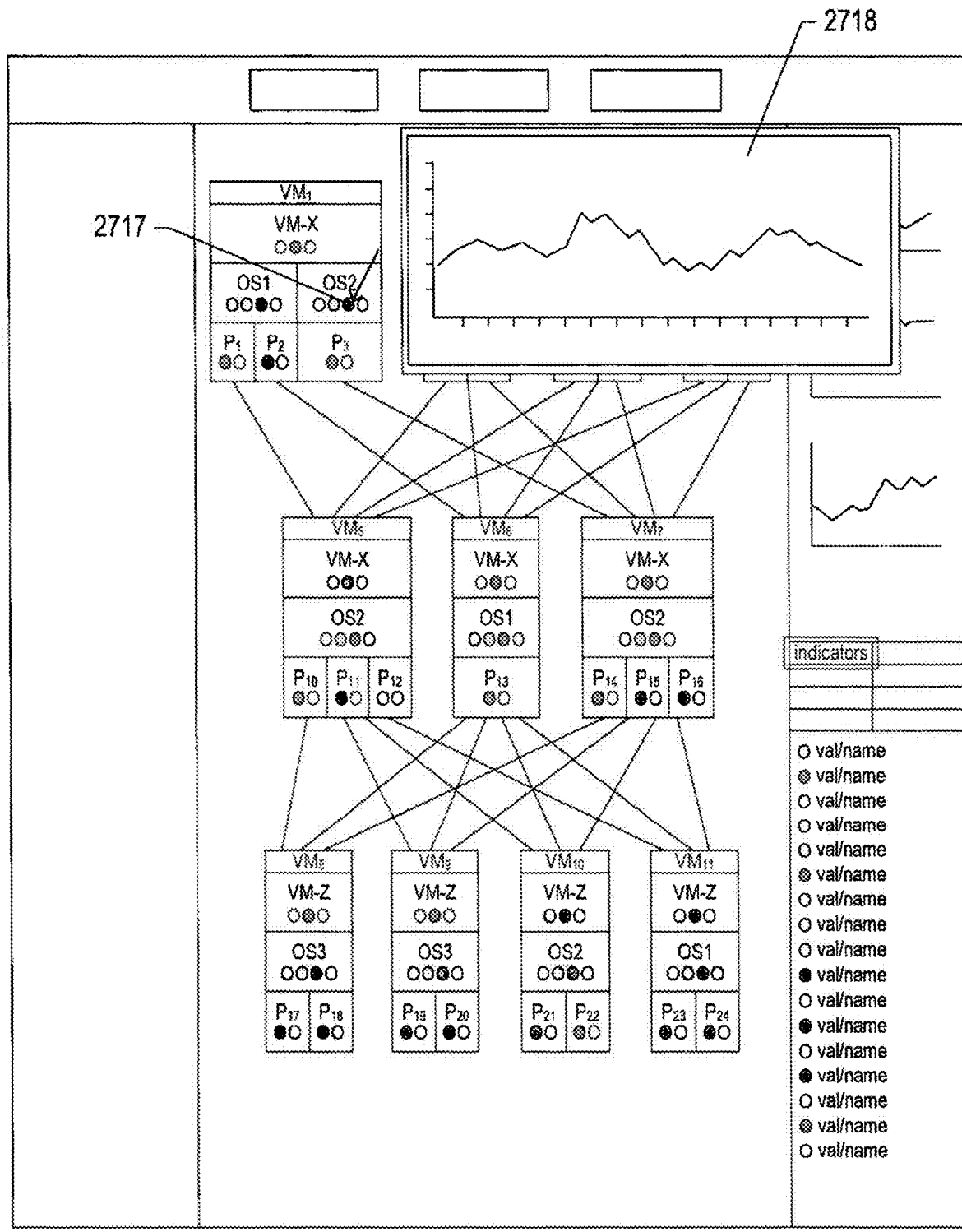
Figure 27D:
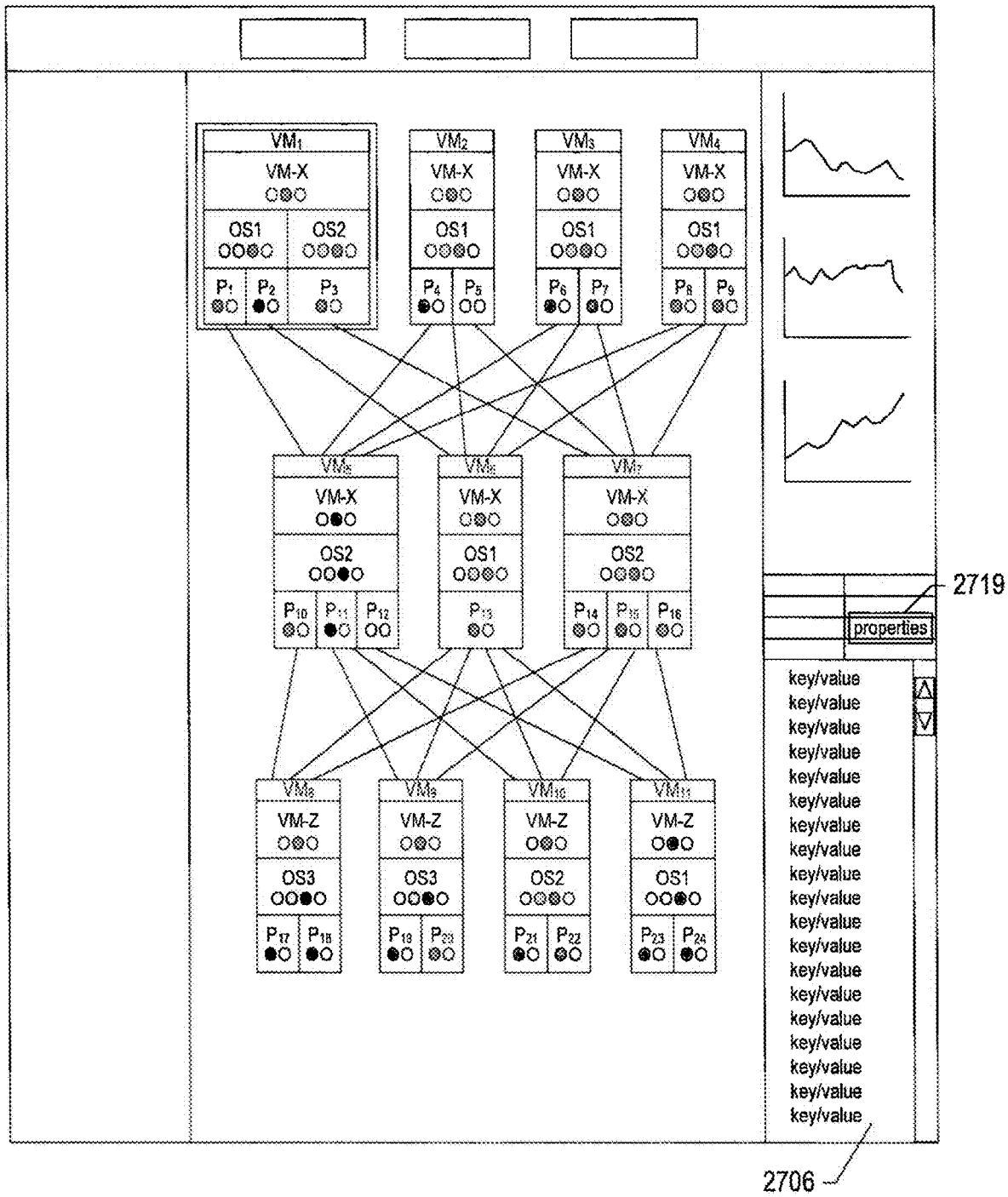
Figure 27E:
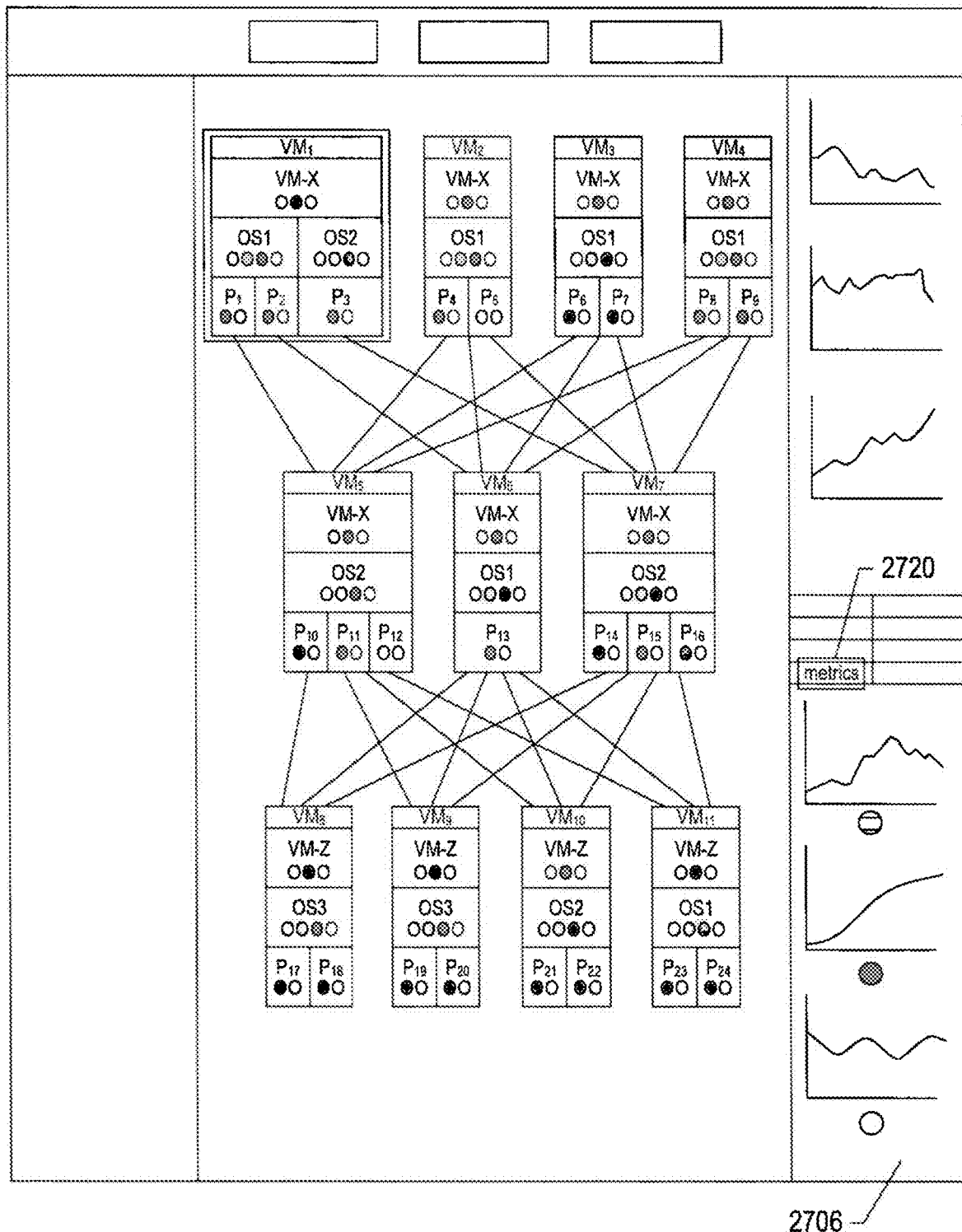
Figure 27F:
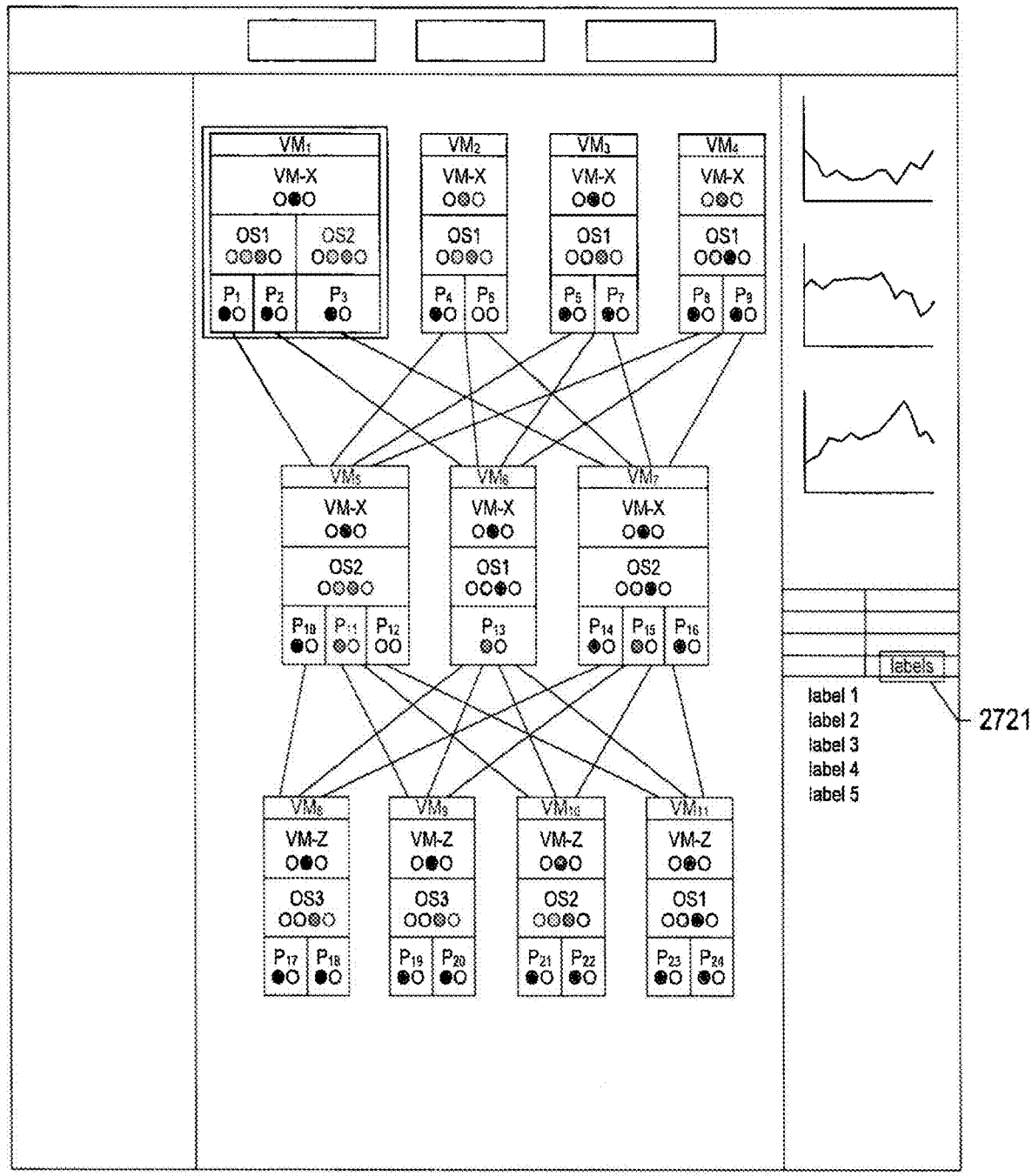
Figure 27G:
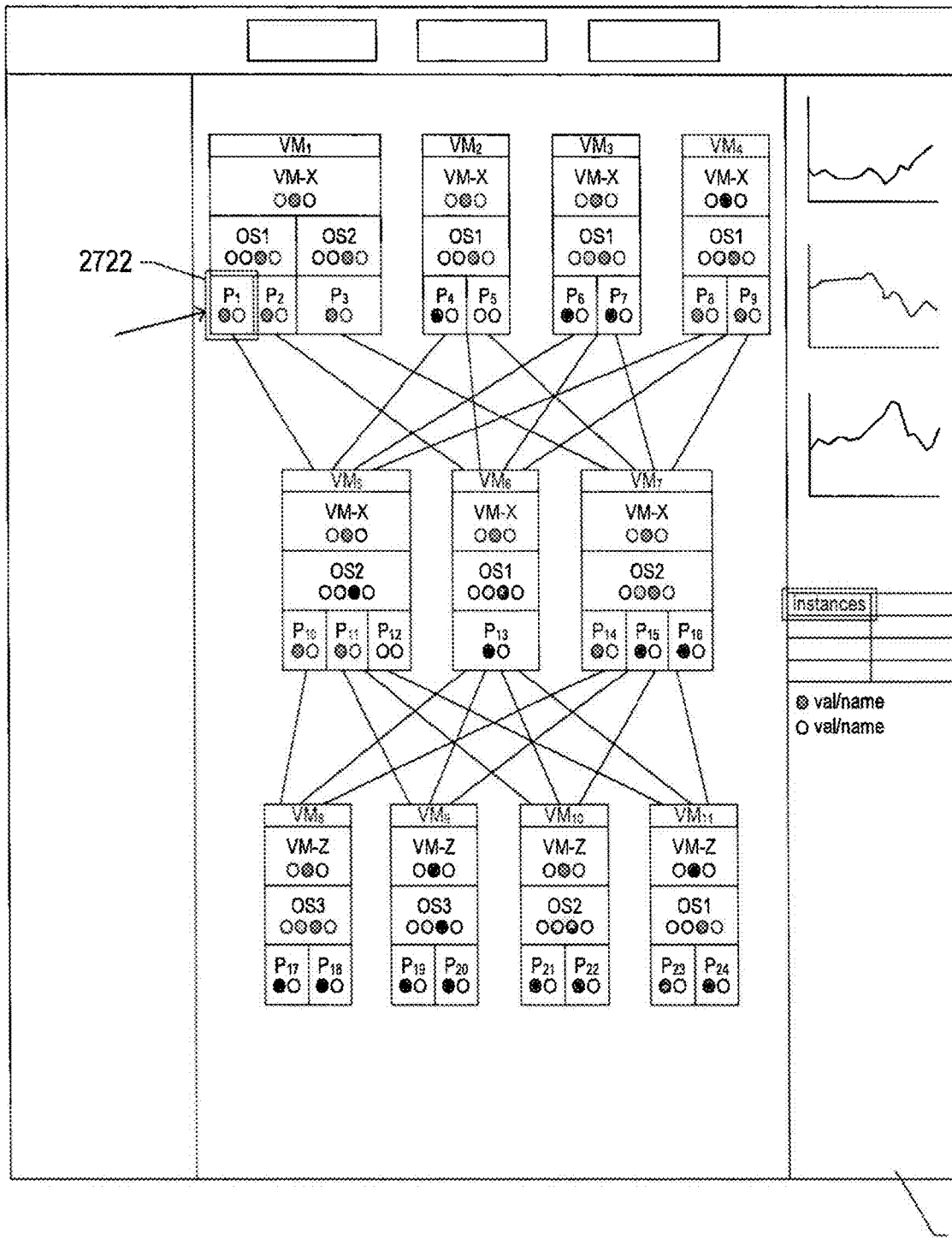
Figure 27H:
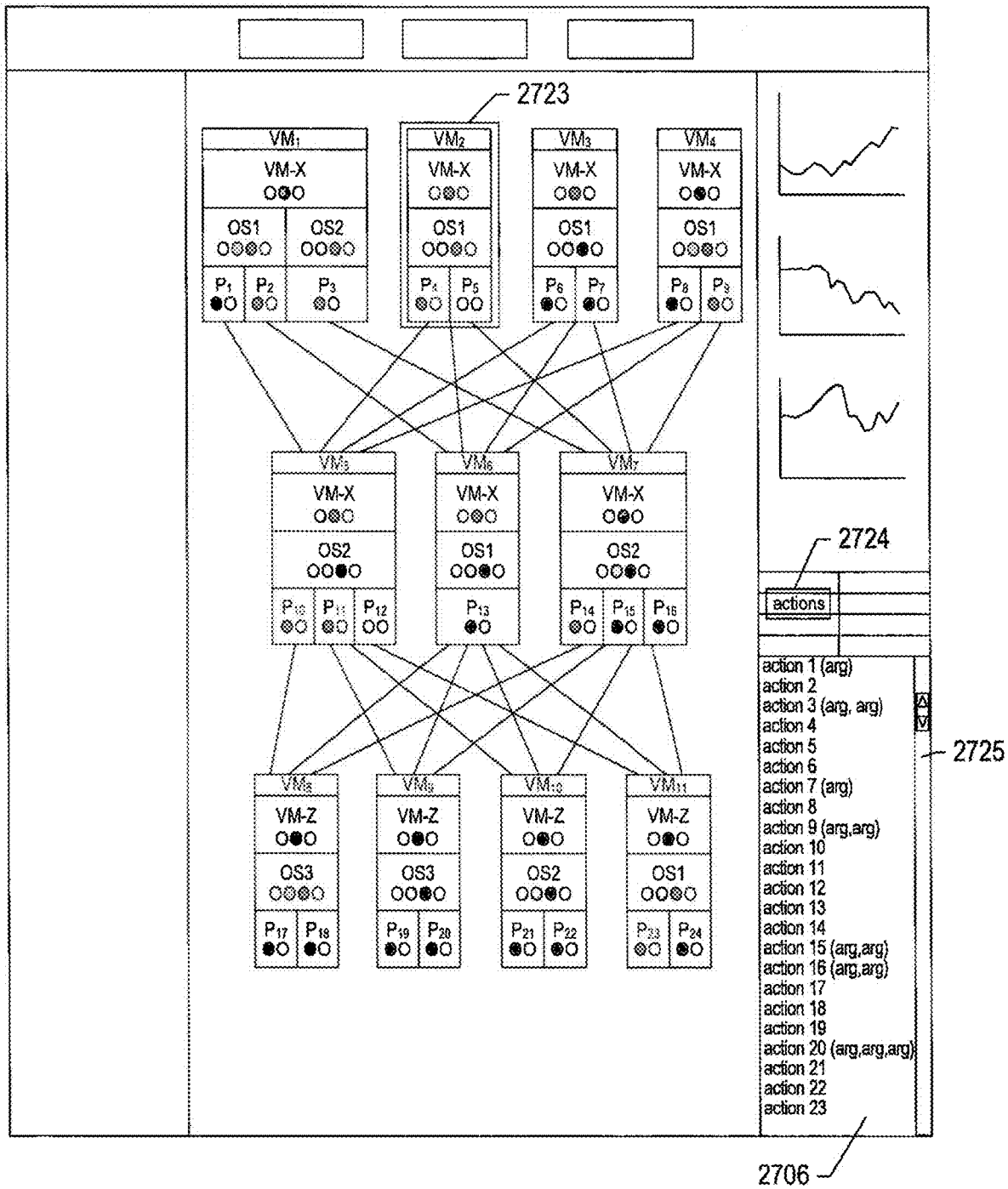
Figure 27I:
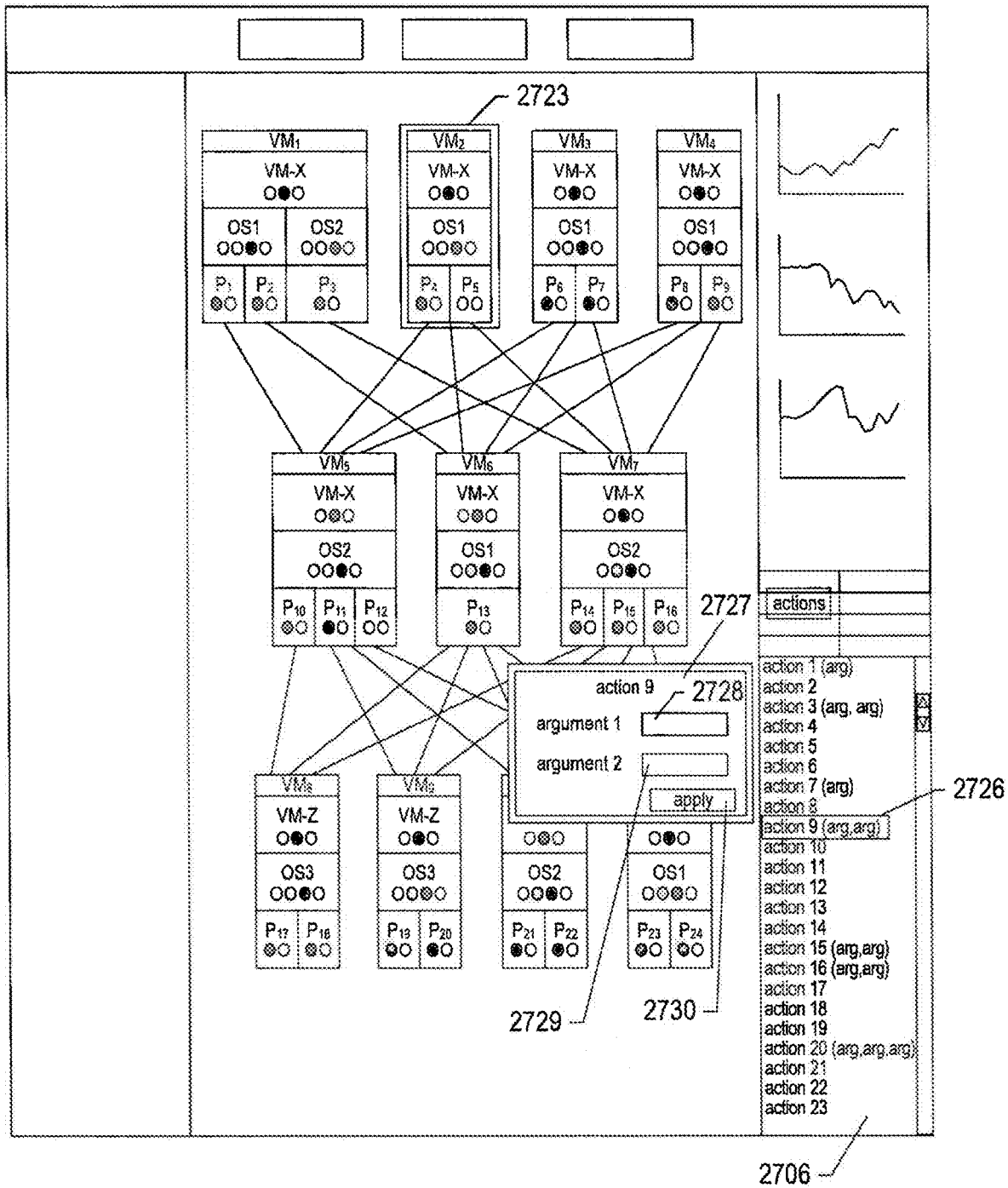
Figure 27J:
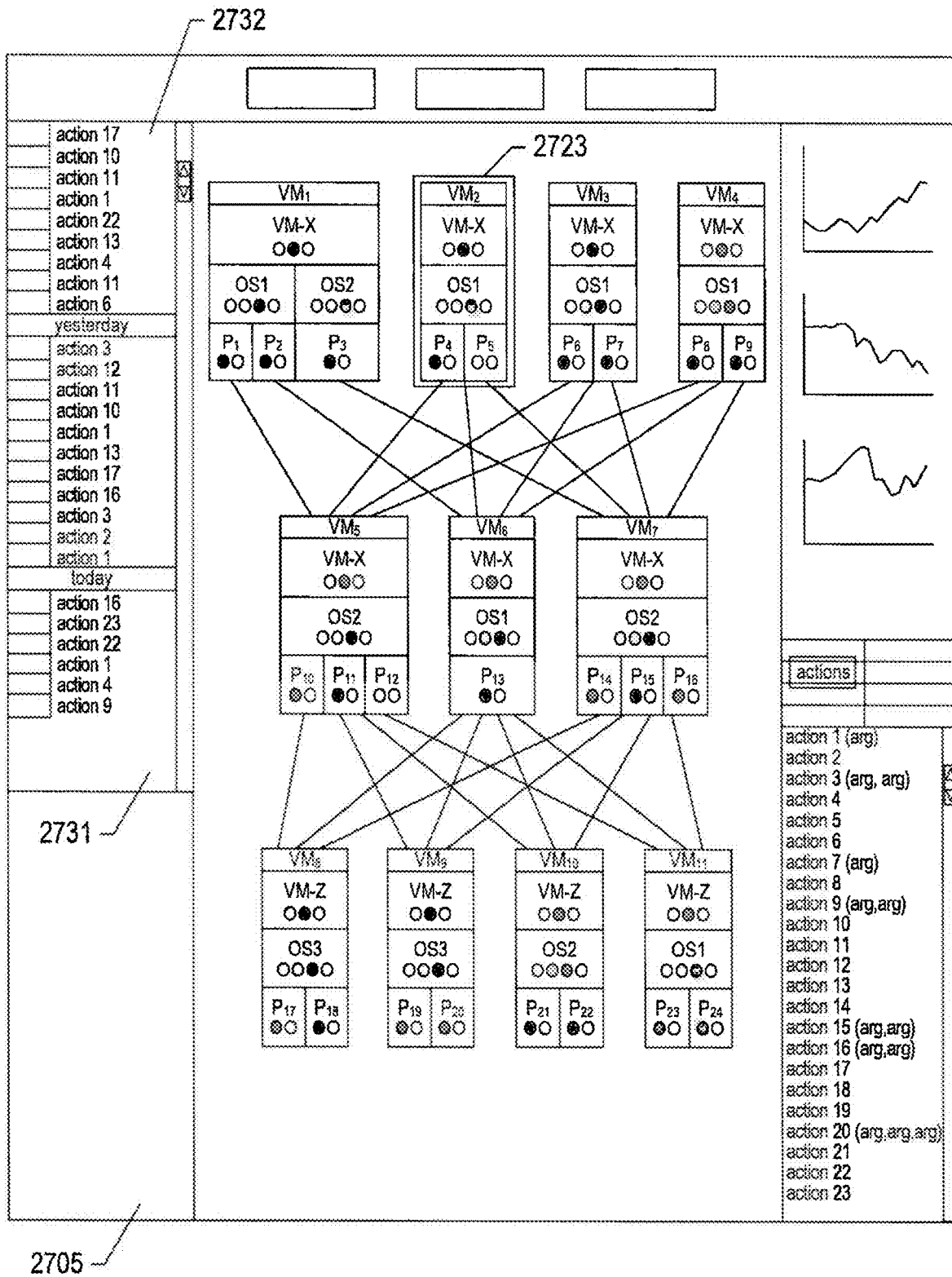
Figure 27K:
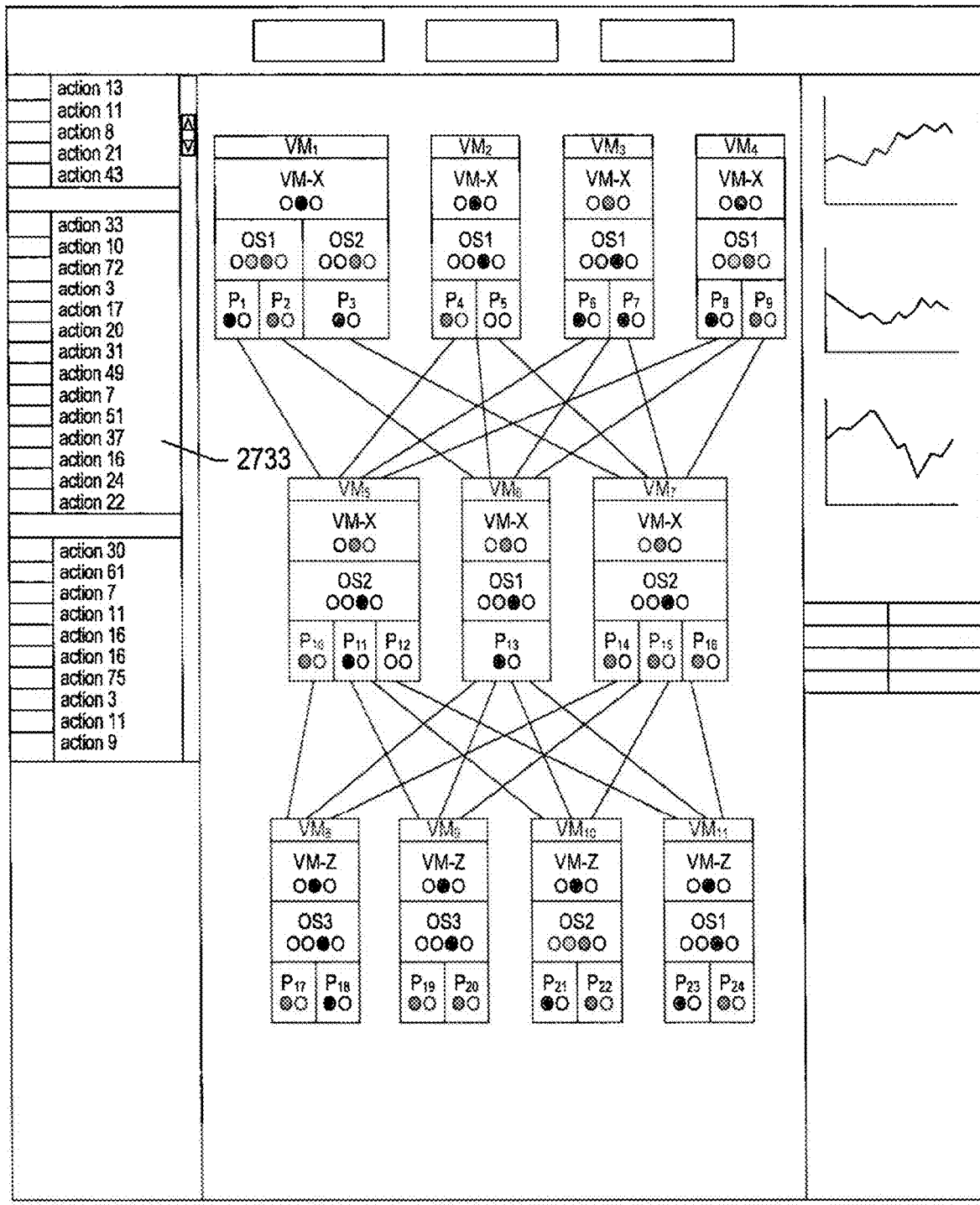
Figure 27L:
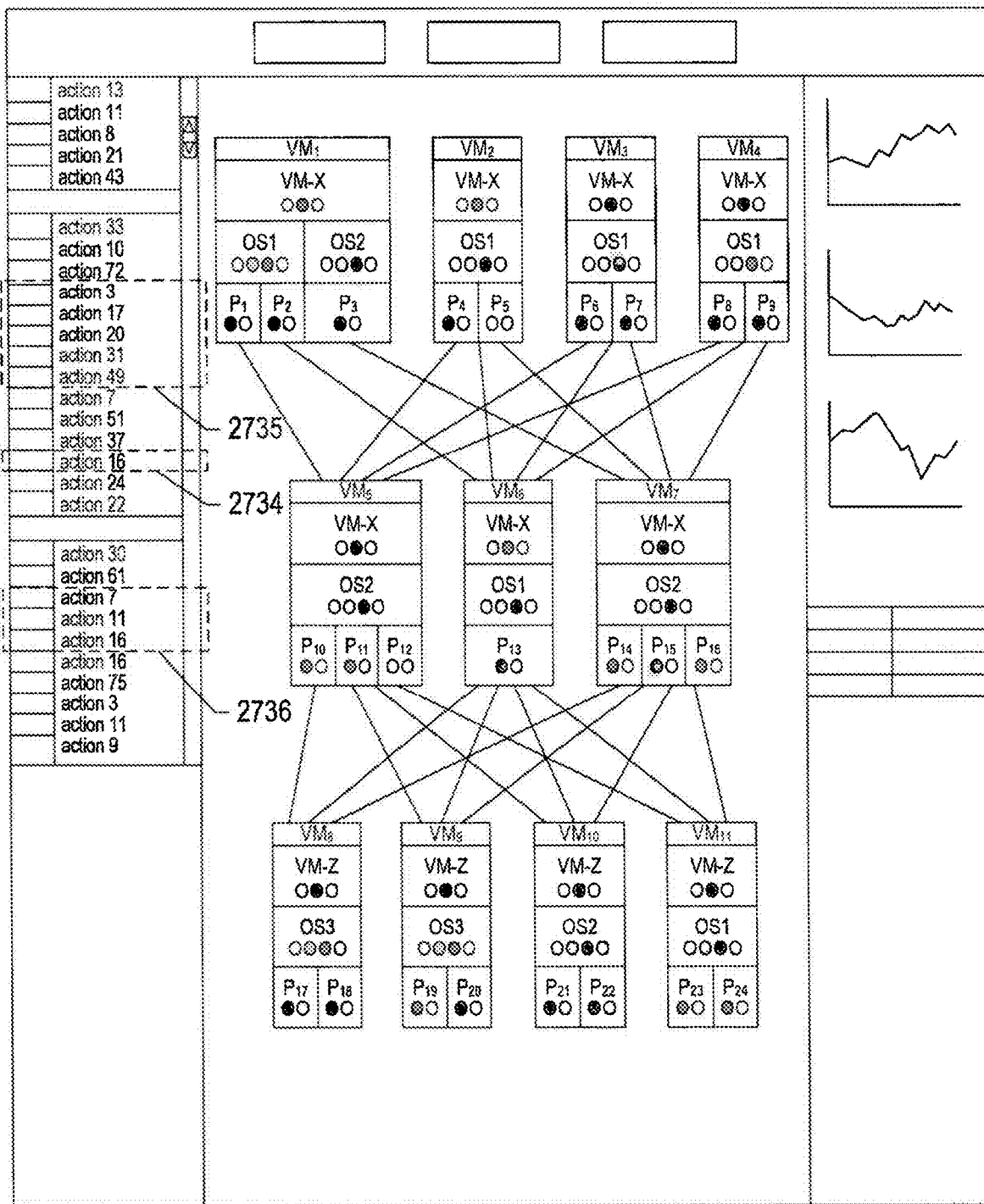
Figure 27M:
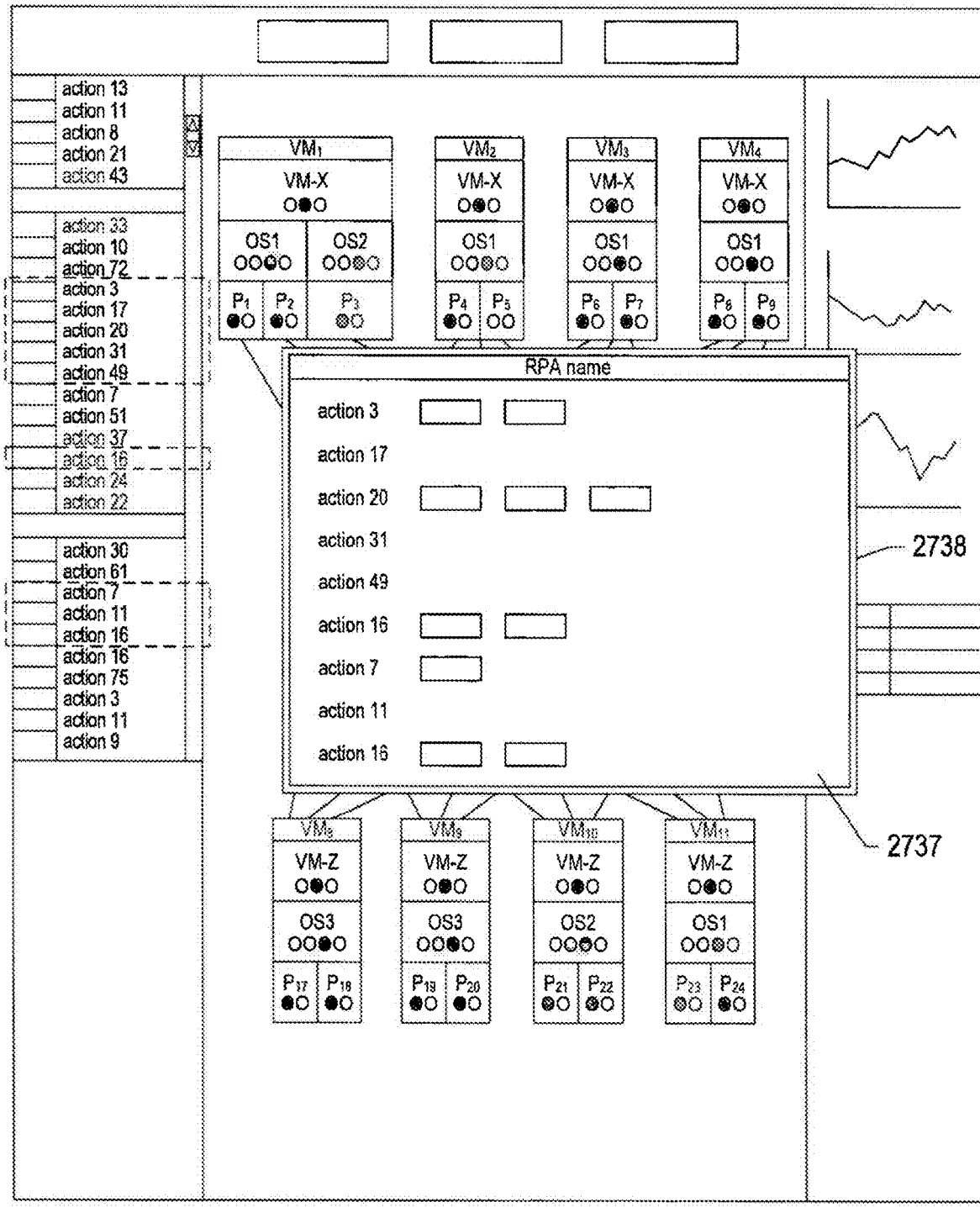
Figure 27N:
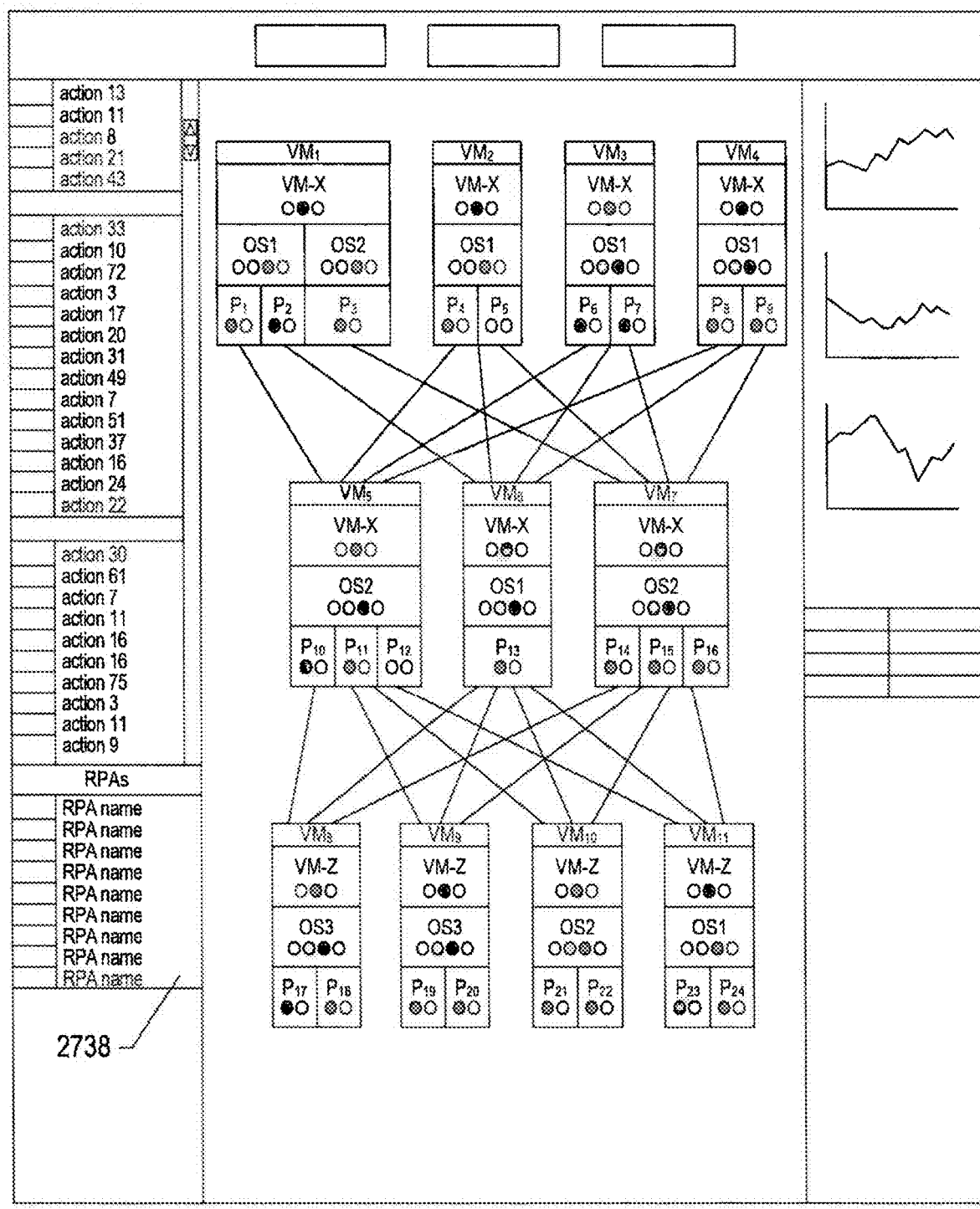

FIGS. 27A-N illustrate features and operations of an example control interface provided to a control-interface-system client. FIG. 27A shows the example control interface as displayed to a user on a user's computer system or other processor-controlled device. The displayed control interface 2702 includes a central section 2703 that displays the tiers and virtual machines of the example infrastructure shown in FIG. 25A using the illustration conventions discussed above with reference to FIG. 26. In this example, the edges in the graph-like representation, such as edge 2704, represents communications between the virtual machines. Vertical spaces 2705 and 2706 display various different types of information, as further discussed below. A top horizontal space 2707 displays multiple control features 2708-2710. In this initial visual presentation, the entire infrastructure representation in central portion 2703 is selected or, in other words, the current scope of the control-interface display is the entire infrastructure. At the top of the right-hand vertical space 2706, numerous metrics 2711-2713 are displayed for the current scope or, in other words, for the entire infrastructure. The lower portion of the right-hand vertical space 2706 displays information selected by a set of tabs 2714. The information contained in the central portion 2703 is retrieved from the graph database of the control-interface system, while the data for the displayed metrics 2711-2713 is retrieved from the metric database.

FIG. 27B illustrates selection of the first virtual machine. The user has input a mouse click or other user input to the icon representing the first virtual machine, as a result of which that icon is highlighted by border 2715. The scope of the visual presentation is now the first virtual machine. In this example control interface, the indicators tab 2716 is automatically selected and current values for each of the metrics represented by indicators in the icon 2716 for the first virtual machine are shown in the lower portion of vertical space 2706. In this example, an aggregate scalar value for each metric, such as the current average metric value, is displayed following an icon for the metric. As shown in FIG. 27C, a user can input a mouse click or other user input to the indicator for a particular metric 2717, resulting in display of a plot of the metric 2718. This plot can be positioned, scaled, time shifted, zoomed into, and zoomed out from by the user by inputs to additional control features. As discussed above, the data refresh for the graph database is generally slower than the data refresh for the metric database. The plot 2718 is based on the most recent metric data, allowing a user to examine metric-value trends in near real time.

As shown in FIG. 27D, selection of the properties tag 2719 by a user results in display, in the lower portion of vertical space 2706, of the properties associated with the graph node representing the currently selected scope, which continues to be the first virtual machine in the current example. Similarly, as shown in FIG. 27E, selection of the metrics tab 2720 results in display, in the lower portion of vertical space 2706, of plots of the metrics associated with the current scope, which continues to be the first virtual machine in the current example. As shown in FIG. 27F, selection of the labels tag 2721 results in display of the labels associated with the first virtual machine. As shown in FIG. 27G, a user can input a mouse click or other type of input to the icon corresponding to the first process 2722 executing in the first virtual sub-machine of the first virtual machine in order to select that process for the current scope of the control interface. This results in display of values for the metrics for that process in the lower portion of vertical space 2706. Similarly, in FIG. 27H, a user has selected the second virtual machine 2723, which is now the current scope for the control interface, and has additionally selected the actions tag 2724, resulting in display of the various different actions that can be applied to the second virtual machine in the lower portion of the vertical space 2706. Because there are more actions than can be displayed at one time in the lower portion of vertical space 2706, a scroll bar 2725 is included to allow a user to scroll through all of the actions. As shown in FIG. 27I, input of a mouse click or other input to a particular action 2726 displayed in the lower portion of vertical space 2706 results in display of an action-application window 2727. The action-application window includes text-entry features 2728 and 2729 that allow the user to input argument values and further includes an apply feature 2730, input to which results in application of the action to the component that is the current scope of the control interface, in this case the second virtual machine 2723. The control-interface system may automatically fill in certain of the text-entry features based on an understanding of the infrastructure from the representation of the infrastructure stored in the graph database. Thus, the control interface allows a user to apply various different actions to infrastructure components. The displayed actions are retrieved from the graph database, and were entered into the graph database as a result of information obtained through one or more of the host agents and the client agent via the IaaS-client interface. Thus, as discussed above, the control interface is a user interface that both displays information and provides control features to allow the user to control infrastructure components.

As shown in FIG. 27J, a user can use control features of the control interface to display, in the left-hand vertical space 2705, an ordered list of actions 2731 applied to the component representing the current scope of the control interface. Each entry in the list, such as the first entry 2732, indicates the user who applied the action, additional information about application of the action, and the name of the action. As shown in FIG. 27K, a list of actions applied to the infrastructure as a whole 2733 is displayed when the current scope of the control interfaces the entire infrastructure. As shown in FIG. 27L, a user can select individual actions 2734 and groups of actions 2735 and 2736 and include them, as shown in FIG. 27M, in a complex command 2737 that can be edited, named, and stored for subsequent execution. The complex-command-generation window 2738 displays the selected actions, and arguments associated with the selected actions, in a script or routine that implements the complex command. Any of numerous different scripting languages, programming languages, or executable flows can be used, in different implementations of the control-interface system, for creation of complex commands. As further discussed below, automated generation of complex commands from selected actions involves various types of generalization and automated enhancements in order to create complex commands that are generally applicable to many different scenarios and infrastructure states and configurations. The generated complex commands are examples of robotic process automations ("RPAs") generated by the process-automation features of the control interface. As shown in FIG. 27N, input to certain control features of the control interface results in display 2738 of the current set of RPAs available for display, editing, and execution. Thus, over time, users of the control interface are able to customize the control interface to offer a large set of customized complex commands in order to automate many of the administration and management tasks performed by human users. Process automation provides a higher-level of optimization to IaaS clients with respect to monitoring and controlling distributed applications and leased infrastructure.

FIGS. 28A-J provide an example of generation of a complex command from a set of actions, as introduced above with reference to FIGS. 27K-N. FIG. 28A shows a set of actions recorded for the example infrastructure discussed above. Each action, such as action 2802, includes a date and timestamp 2804, an encoding of the action in a script or programming language 2805, and, for actions that return values, the return value 2806. This is, of course, only an example. In different implementations of the control-interface system, recorded actions may contain fewer, more, and/or different information fields and encodings. Furthermore, a hypothetical script-language syntax is used in this example, and is not meant to accurately reflect any particular script language. The selected actions are listed in date and time order from top to bottom. In a first set of actions, the graph database is repeatedly queried for a current average CPU usage and a maximum available CPU bandwidth for the backend tier of the example infrastructure shown in FIG. 25A. Then a graph query 2807 is executed to obtain the virtual machine nodes that are children of the node representing the backend tier. In a next set of actions, queries are issued to the graph database to obtain the average CPU usage and maximum CPU bandwidth for each of the virtual machines associated with the backend tier. Then, a query is issued to the graph database to obtain the node representing a terminate action for a particular operating system associated with virtual machine VM11. Next, three queries 2809 are issued to the graph database to obtain the host-agent address for virtual machine VM11 as well as an identifier for the virtual machine VM11. A next action 2010 is a command issued to the host agent for virtual machine VM11 directing the virtual machine to shut down. A next set of actions 2811 repeatedly query the graph database to determine the number of active processes currently supported by virtual machine VM11. In a next action 2812, the graph database is queried to obtain the node identifier for a terminate action associated with the client infrastructure, or root node in the hierarchy shown in FIG. 25A. Action 2013 is a query to the graph database to obtain the client-interface address for the client infrastructure, action 2814 is a query to the graph database to retrieve the name of the terminate action for the client infrastructure and, finally, action 2815 is a command sent through the IaaS-client interface to terminate virtual machine VM11.

FIG. 28B shows rectangles demarcating the different sections of the selected actions shown in FIG. 28A. The first section 2816 is a set of related, repeated queries to the graph database. A single query 2017 to the graph database follows the first subsection. A second section 2818 includes a set of related, repeated queries to the graph database. The second section 2818 is followed by numerous individual graph-database queries 2819 and a command 2820 issued to a host agent. A third subsection of repeated-related graph queries follows 2821. After the third subsection, a command to the IaaS-client interface 2822 follows a number of graph-database queries 2823. FIG. 28C shows rectangles used to indicate subsections of related commands within each section.

In a first step in generating a complex command from a selected set of actions, the control-interface system generates three script subroutines 2824-2826 for each of the repeated subsections identified in FIG. 28C. The subroutines are given names based on queried properties. FIG. 28E shows the set of selected actions with the action subsections replaced by calls to the script subroutines shown in FIG. 28D. FIG. 28F illustrates replacement of a series of calls to subroutines with generated script portions. Analysis of the first set of subroutine calls 2027 shown in FIG. 28E reveals that the same queries were repeated at around 8:30 AM and 4:30 PM on three successive days prior to query 2807. This would appear to be repeated checking for a value by a user until the value has some property or characteristic. Moreover, the value seems to be some function of the average CPU usage and the maximum CPU bandwidth for the backend tier. Subroutine 2024, shown in FIG. 28D, includes a placeholder for this function. Thus, script portion 2828, shown in FIG. 28F, repeatedly queries the database, twice each day, to determine a value that is some function of the average CPU usage and maximum available CPU bandwidth, and when the value is at or below some threshold level, continues on with the other actions. Similarly, the script portion 2829, shown in FIG. 28F, generalizes the block of actions 2821 in FIG. 28B to continue to determine the number of processes, at two-minute intervals, until the number of processes falls to 0, a generalization of the actions in block 2821 of FIG. 28B. In both cases, the generated script portions are more general than the actual selected actions that they replace, but the generality is straightforwardly obtained by considering the repetitive nature of the selected actions, the conditions at the points that the repetitive actions terminated, and the dates and times of the actions. Next, as shown in FIG. 28G, a third script portion 2830 replaces action 2817 and the block of actions 2818 shown in FIG. 28B. Action 2817 is a query that requests the child nodes of the backend node, and then, in the block of actions 2818, the graph database is queried for the average CPU use and maximum CPU bandwidths of these child nodes. It then appears that the child node representing the virtual machine with the smallest CPU usage is shut down, in action 2820. To generalize this group of actions, the script portion 2830 replacing the actions uses a for-loop construct to iterate through the virtual-machine child nodes of the backend node and selects the virtual machine for which the function of the CPU usage and maximum CPU bandwidth is lowest.

Next, as shown in FIG. 28H, script portions 2831 and 2832 are generated in order to store query results in local variables for use in subsequent queries and in, ultimately, commands directed to host agents in the IaaS system. Then, as shown in FIG. 28I, the first two subroutines previously shown in FIG. 28D are modified to include an explicit function rather than a function template to generate the return values. An educated guess is made for this function in view of the termination conditions for the repetitive blocks of selected actions 2816 and 2818 shown in FIG. 28B, namely that the value used to terminate the repetitive actions in the first block and to select a virtual machine based on the repetitive actions in the second block is the average CPU usage divided by the maximum CPU bandwidth. Finally, as shown in FIG. 28J, the threshold value 2833 in FIG. 28H is replaced by an actual numeric value 2834 and action 2808 shown in FIG. 28A is further generalized 2836. Of course, once the control-interface system has generated a script-based complex command, the user can edit the script-based complex command to further refine and generalize the command, correct errors, and include additional steps and actions. As one example, a user may wish to replace the time 16:27 (3837) with the time 16:30. As another example, a user may wish to add termination conditions to the do-while and while loops.

In general, many types of logic, including the types of logic included in optimizing compilers, artificial-intelligence and machine-learning components, and other functionalities can be used to attempt to transform a set of selected actions into a generalized, accurate, and useful complex command. The example of FIGS. 28A-J are intended simply to show various types of generalizations and generated script portions of the many different generalizations that can be carried out to generate scripts or programs that accurately reflect the intent of the selected actions used for complex-command generation.

Figure 29A:
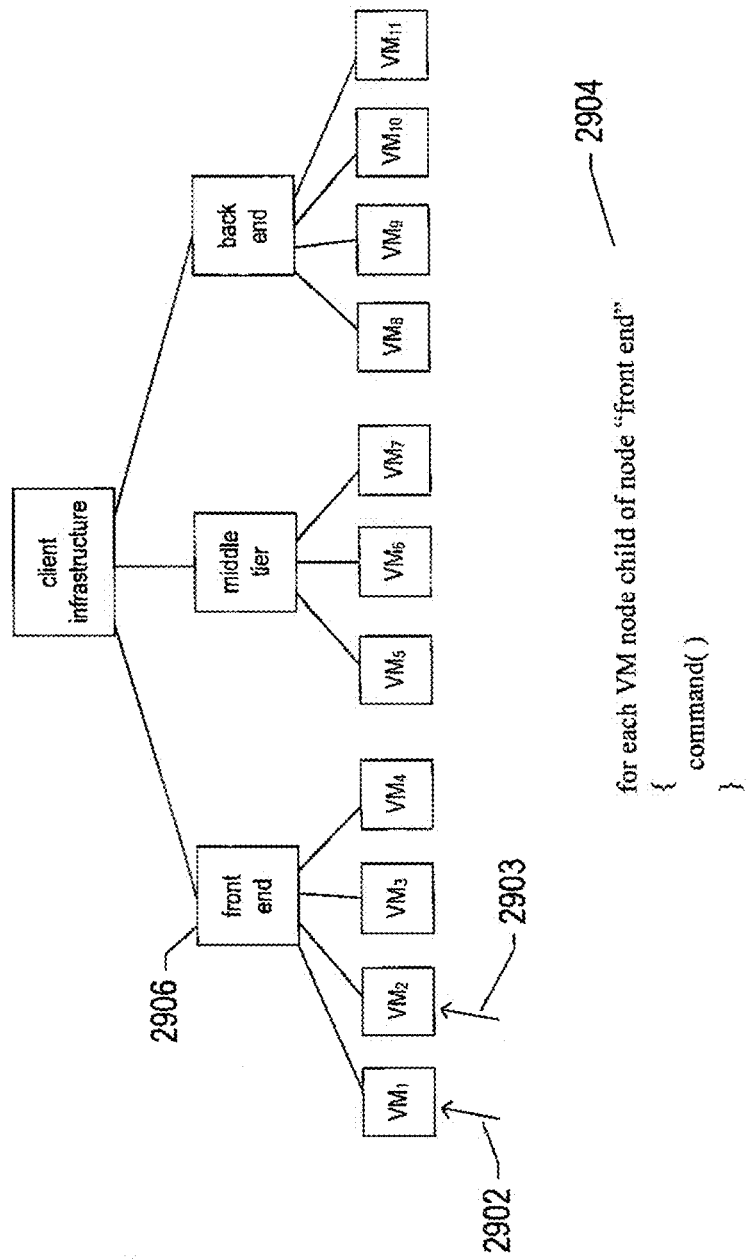
FIGS. 29A-B illustrates how the control-interface system uses graph-based representations of infrastructure to facilitate generalization of for-loops within script-based or programmed complex commands.
Figure 29B:
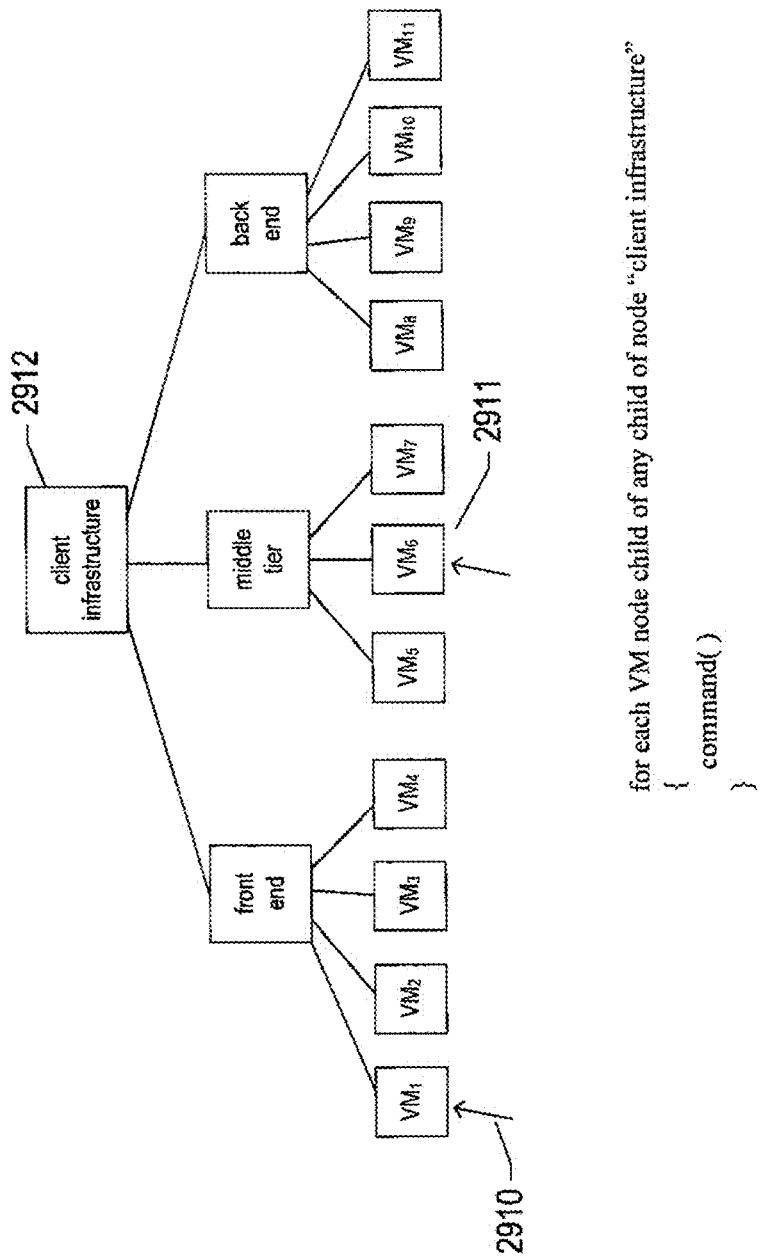

FIGS. 29A-B illustrates how the control-interface system uses graph-based representations of infrastructure to facilitate generalization of for-loops within script-based or programmed complex commands. In FIG. 29A, arrows 2902-2903 represent two selected, identical actions directed to the first and second virtual machines within the front-end tier. During generation of a complex command, these two actions might be incorporated into a more generic for-loop 2904 that directs the action to all of the virtual machines in the front-end tier. This is possible because the control-interface system can easily recognize that the first two virtual machines have a common parent node 2906 that includes additional child virtual machines. Of course, the generalization may prove undesired to the user, in which case a user can edit the script for the complex command to direct the particular action to only the first two virtual machines. FIG. 29B shows another example of for-loops generalization. In this case, identical actions are directed to the first virtual machine in the front-end tier 2910 into the second virtual machine in the middle tier 2911. In this case, the control-interface system can traverse the hierarchy upward to realize that these two virtual machines have a common grandparent node 2912 and therefore generalize the for-loops to iterate over all of the child virtual-machine nodes of the child tier nodes of the grandparent node. There is a large number of additional possible generalizations of this type, many based on the information about the logical structure of the client's infrastructure encapsulated in the graph-based representation stored in the graph database.

Although the present invention has been described in terms of particular embodiments, it is not intended that the invention be limited to these embodiments. Modifications within the spirit of the invention will be apparent to those skilled in the art. For example, any of a variety of different implementations of the control-interface system can be obtained by varying any of many different design and implementation parameters, including modular organization, programming language, underlying operating system, control structures, data structures, and other such design and implementation parameters. As discussed above, there are many different possible implementations of the control interface, with different types of visual presentations, different types of icons, different types of displayed information, and different types of control features, and different types of topological organizations of infrastructure subgraphs, and other such variations. Complex commands can be generated using any of many different scripting languages, programming languages, or hybrid languages that incorporate control features of programming languages as well as the querying capabilities of graph and metric databases.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A control-interface system comprising:
 a control-interface system, implemented within a distributed computer system, that includes a graph database, a metrics database, a graph-based representation of infrastructure leased by a client of an infrastructure-as-a-service ("IaaS") system stored in the graph database, host agents that access information sources in the IaaS system, and a client agent that accesses an IaaS-client interface on behalf of the client, the host agents and client agents returning information that is stored in the graph database and/or metrics database; a control-interface controller that controls display of a control interface on a client computer system or other client processor-controlled device; and the control interface that includes a visual presentation of a portion of the graph-based representation of infrastructure, including nodes representing infrastructure components and edges representing relationships between pairs of infrastructure components, a visual presentation of a node representing an infrastructure component including a metric feature to which user input is directed to display a plot of a metric-data timeseries, or portion of a metric-data timeseries, scraped from the node and stored in the metrics database, database, nodes representing logical entities and aggregations of logical entities, infrastructure components, and both logical entities and infrastructure components, control-interface-system components, including host agents and client agents, installed in the IaaS system or in communication with IaaS-system components, and third-party services and systems and components of third-party services and systems, a visual presentation of actions that can be applied, by user input to the visual presentation of actions, to the infrastructure components, and process-automation features that generate complex commands from selected actions applied to infrastructure components.

2. The control-interface system of claim 1 wherein the displayed plot is resized, rescaled, shifted in time, displayed with increased magnification, and displayed with decreased magnification in response to additional user input.

3. The control-interface system of claim 1 wherein a node representing an infrastructure component includes, or is linked to, a set of actions that can be applied to the infrastructure component and a set of metrics collected from the infrastructure component.

4. The control-interface system of claim 1 wherein the control interface displays an indication of a user-selectable current scope of the visual presentation of a portion of the graph-based representation of infrastructure.

5. The control-interface system of claim 4 wherein the user-selectable current scope of the visual presentation of the portion of the graph-based representation of infrastructure may correspond to one of:
   the entire portion of the graph-based representation of infrastructure;
   a graph-based subset of the portion of the graph-based representation of infrastructure;
   an infrastructure component represented by a node in the portion of the graph-based representation of infrastructure; and
   a relationship between two infrastructure components represented by two different nodes in the portion of the graph-based representation of infrastructure.

6. The control-interface system of claim 4 wherein a metric-data timeseries, or portion of a metric-data timeseries, associated with the current scope is plotted in a display region in response to user input to a control feature for the display region.

7. The control-interface system of claim 4
   wherein a node corresponding to the current scope includes a set of key/value pairs; and
   wherein one or more of the key/value pairs are displayed in a display region in response to user input to a control feature for the display region.

8. The control-interface system of claim 4 wherein a set of actions is associated with a node corresponding to the current scope; and
   wherein one or more of the actions of the set of actions are displayed in a display region in response to user input to a control feature for the display region.

9. The control-interface system of claim 8 wherein use input directed to a displayed action results in display of an action-application display window that includes a text-entry feature into which a user can enter an argument for the action and an application feature to which user input is directed to apply the action to the infrastructure component represented by the node.

10. The control-interface system of claim 4 wherein a node corresponding to the current scope includes a set labels; and
   wherein one or more of the labels are displayed in a display region in response to user input to a control feature for the display region.

11. The control-interface system of claim 1 further including a second display region that displays a date-and-time ordered list of actions applied to infrastructure components.

12. The control-interface system of claim 11 wherein user input to actions in the date-and-time ordered list of actions selects the actions for inclusion in a complex-command-generation display window.

13. The control-interface system of claim 12 wherein the control-interface system automatically generates an editable script, program, or executable flow that implements a complex command based on the selected actions.

14. The control-interface system of claim 12 wherein the control-interface system, in automatically generating an editable script, program, or executable flow that implements a complex command based on the selected actions, generalizes the complex command using the graph-based representation of the infrastructure by one or more of:
   generalizing for-loops to iterate over logical sets of infrastructure components;
   generating subroutines for repeated actions or sets of actions; and
   generalizing repeated actions followed by a command sent to a host agent of the client agent using loops and waits.

15. The control-interface system of claim 1 wherein the metrics database includes a metric-collector-and-database controller that periodically scrapes metric data from metric-data sources within the infrastructure leased by the client of an infrastructure-as-a-service ("IaaS") system, receives metric-data pushed by metric-data sources, and stores the scraped metric data in a metric-data store.

16. The control interface of claim 1 wherein the host agents are executables that are included in infrastructure components leased by the client that access information and actions associated with the infrastructure components.

17. The control interface of claim 1 wherein infrastructure components include:
   virtual machines;
   containers;
   data-storage appliances;
   virtual networks;
   virtual routers; and logical components.

18. The control interface of claim 1 wherein the graph-based representation of the infrastructure leased by a client includes a unified representations of infrastructure leased from multiple IaaS systems.

* * * * *